US008031941B2

(12) United States Patent
Suino

(10) Patent No.: US 8,031,941 B2
(45) Date of Patent: Oct. 4, 2011

(54) IMAGE DISPLAY APPARATUS, IMAGE DISPLAY METHOD, AND IMAGE DISPLAY PROGRAM

(75) Inventor: Tooru Suino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1106 days.

(21) Appl. No.: 11/878,223

(22) Filed: Jul. 23, 2007

(65) Prior Publication Data
US 2008/0025605 A1   Jan. 31, 2008

(30) Foreign Application Priority Data

Jul. 31, 2006 (JP) ................................ 2006-209264

(51) Int. Cl.
*G06K 9/34* (2006.01)
(52) U.S. Cl. ........ 382/176; 382/289; 382/232; 382/233; 382/240; 382/260; 385/516; 385/538; 385/1.2; 385/1.9; 385/1.15
(58) Field of Classification Search .................. 382/232, 382/233, 240, 268; 358/516, 518, 1.2, 1.18
See application file for complete search history.

(56) References Cited

U.S. PATENT DOCUMENTS

| | | | | |
|---|---|---|---|---|
| 6,084,988 A * | 7/2000 | Kanno et al. | ................... | 382/289 |
| 6,263,118 B1 * | 7/2001 | Kanno et al. | ................... | 382/289 |
| 7,646,517 B2 * | 1/2010 | Maki et al. | ...................... | 358/538 |
| 2003/0007186 A1 | 1/2003 | Suino et al. | | |
| 2003/0138154 A1 | 7/2003 | Suino | | |
| 2003/0218776 A1 | 11/2003 | Morimoto et al. | | |
| 2003/0218781 A1 | 11/2003 | Suino | | |
| 2004/0013310 A1 | 1/2004 | Suino et al. | | |
| 2004/0126020 A1 | 7/2004 | Sakuyama et al. | | |
| 2004/0136596 A1 | 7/2004 | Oneda et al. | | |
| 2004/0146209 A1 | 7/2004 | Kadowaki et al. | | |
| 2004/0151385 A1 | 8/2004 | Oneda et al. | | |
| 2004/0163038 A1 | 8/2004 | Yano et al. | | |
| 2004/0264785 A1 | 12/2004 | Suino et al. | | |

(Continued)

FOREIGN PATENT DOCUMENTS

JP          11-282641          10/1999

(Continued)

OTHER PUBLICATIONS

Pierre D. Wellner "Adaptive Thresholding for the DigitalDesk", published in Jul. 1993, pp. 1-19.*

(Continued)

*Primary Examiner* — Brian Q Le
*Assistant Examiner* — Mek Bekele
(74) *Attorney, Agent, or Firm* — Dickstein Shapiro LLP

(57) ABSTRACT

An image display apparatus is disclosed that includes an image projecting unit that projects a projection image on a projection screen, a written image capturing unit that captures a written image of a writing screen that is arranged opposite the projection screen, a written image area extracting unit that extracts a written image area from the captured written image captured by the written image capturing unit, an image compositing unit that composites the written image area extracted by the written image area extracting unit and the projection image projected by the image projecting unit. The written image area extracting unit includes an external light value detecting unit that detects an external light value and an image processing unit that performs an image correction process on the captured written image based on the external light value detected by the external light detecting unit.

19 Claims, 44 Drawing Sheets

U.S. PATENT DOCUMENTS

| | | | |
|---|---|---|---|
| 2005/0015247 A1 | 1/2005 | Sakuyama et al. | |
| 2005/0031212 A1 | 2/2005 | Suino | |
| 2005/0088669 A1 | 4/2005 | Suino et al. | |
| 2005/0105807 A1 | 5/2005 | Suino et al. | |
| 2005/0265608 A1 | 12/2005 | Suino | |
| 2006/0056509 A1* | 3/2006 | Suino et al. | 375/240.11 |
| 2006/0170968 A1* | 8/2006 | Maki et al. | 358/1.15 |
| 2006/0187477 A1* | 8/2006 | Maki et al. | 358/1.9 |
| 2007/0146810 A1* | 6/2007 | Kubo et al. | 358/448 |

FOREIGN PATENT DOCUMENTS

| | | | |
|---|---|---|---|
| JP | 2005-71192 | | 3/2005 |
| JP | 2005071192 A | * | 3/2005 |
| JP | 2005-354171 | | 12/2005 |
| JP | 2005354171 A | * | 12/2005 |

OTHER PUBLICATIONS

"Opening Operator", tutorial, http://www.dca.fee.unicamp.br/projects/khoros/mmach/tutor/toolbox/firstl/opening/opening.html, p. 1-2.*

"Closing operator" tutorial http://www.dca.fee.unicamp.br/projects/khoros/mmach/tutor/toolbox/firstl/closing/closing.html, p. 1-2.*

Opening Operator, http://www.dca.fee.unicamp.br/projects/~oros/mmach/tutor/toolbox.., p. 1-2, date May 29, 2008.*

Closing Operator, http://www.dca.fee.unicamp.br/projects/~oros/mmach/tutor/toolbox.., p. 1-2, date May 29, 2008.*

Pierre Wellner: "Adaptive Thresholding on the DigitalDesk," Europarc Technical Report, No. 93-110, 1993, pp. 7-14.

University of Edinburgh, Department of Artificial Intelligence: "Adaptive Thresholding," Online Tutorial: Hypermedia Image Processing Reference, Apr. 2004.

European Search Report (14 pages), Jun. 12, 2008.

"Tutorial: Closing Operator," Jan. 2002, XP002482156 (1 page).

"Tutorial: Opening Operator," Jul. 2001, XP002482156 (1 page).

B. Likar. et al., Retrospective Shading Correction Based on Entropy Minimization, Journal of Microscopy Blackwell Science UK, vol. 197, Mar. 2000, XP-002482153, pp. 285-295.

Ian T. Young, Shading Correction: Compensation for Illumination and Sensor Inhomogeneities, Jul. 19, 200 (internet) XP002482154, pp. 1-14.

* cited by examiner

| 1 | 2 | 3 |
|---|---|---|
| 4 | 9 | 5 |
| 6 | 7 | 8 |

$$g\_ave = \left(\sum g_i\right)/N^2$$

g_ave : G COMPONENT AVERAGE CONCENTRATION VALUE
g : G COMPONENT CONCENTRATION VALUE
N : NUMBER OF PIXELS ON ONE SIDE OF COMPUTATION RANGE TARGET PIXEL ( i,j )

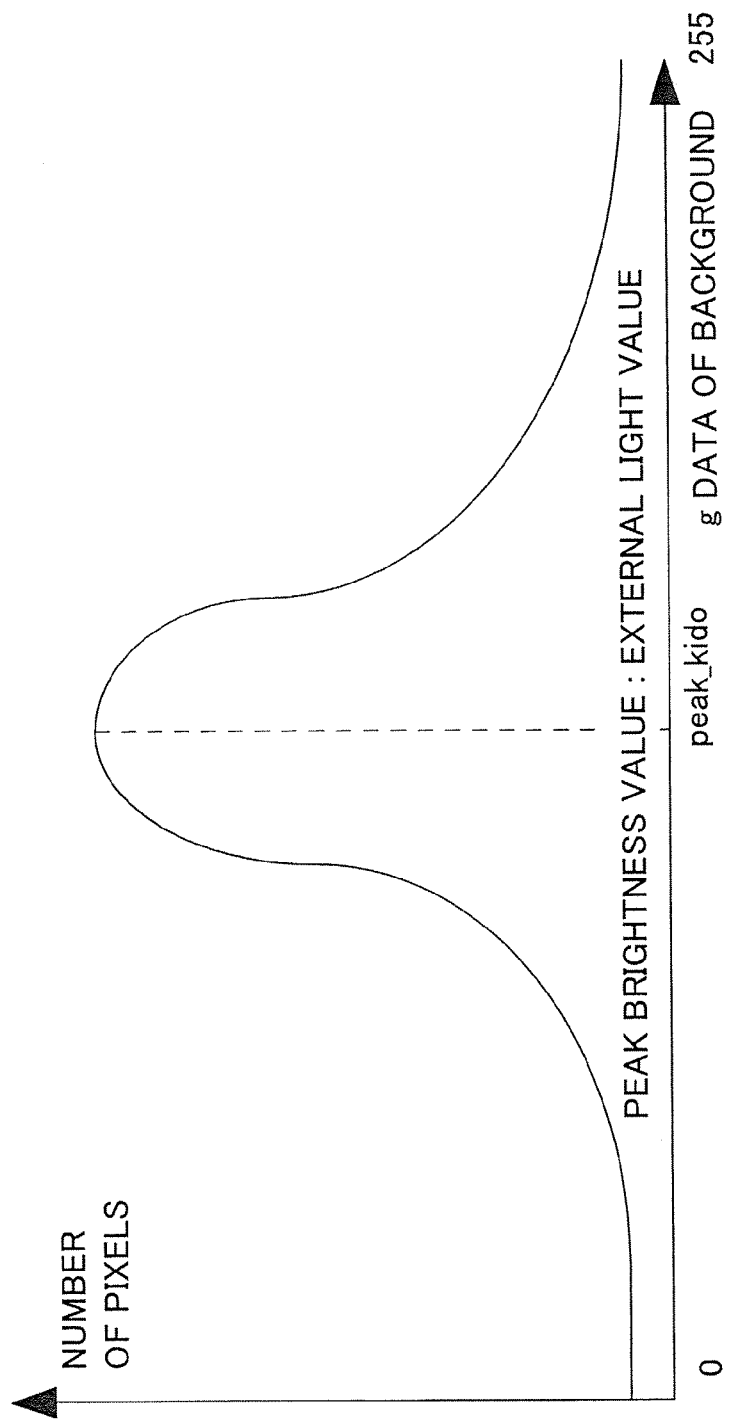

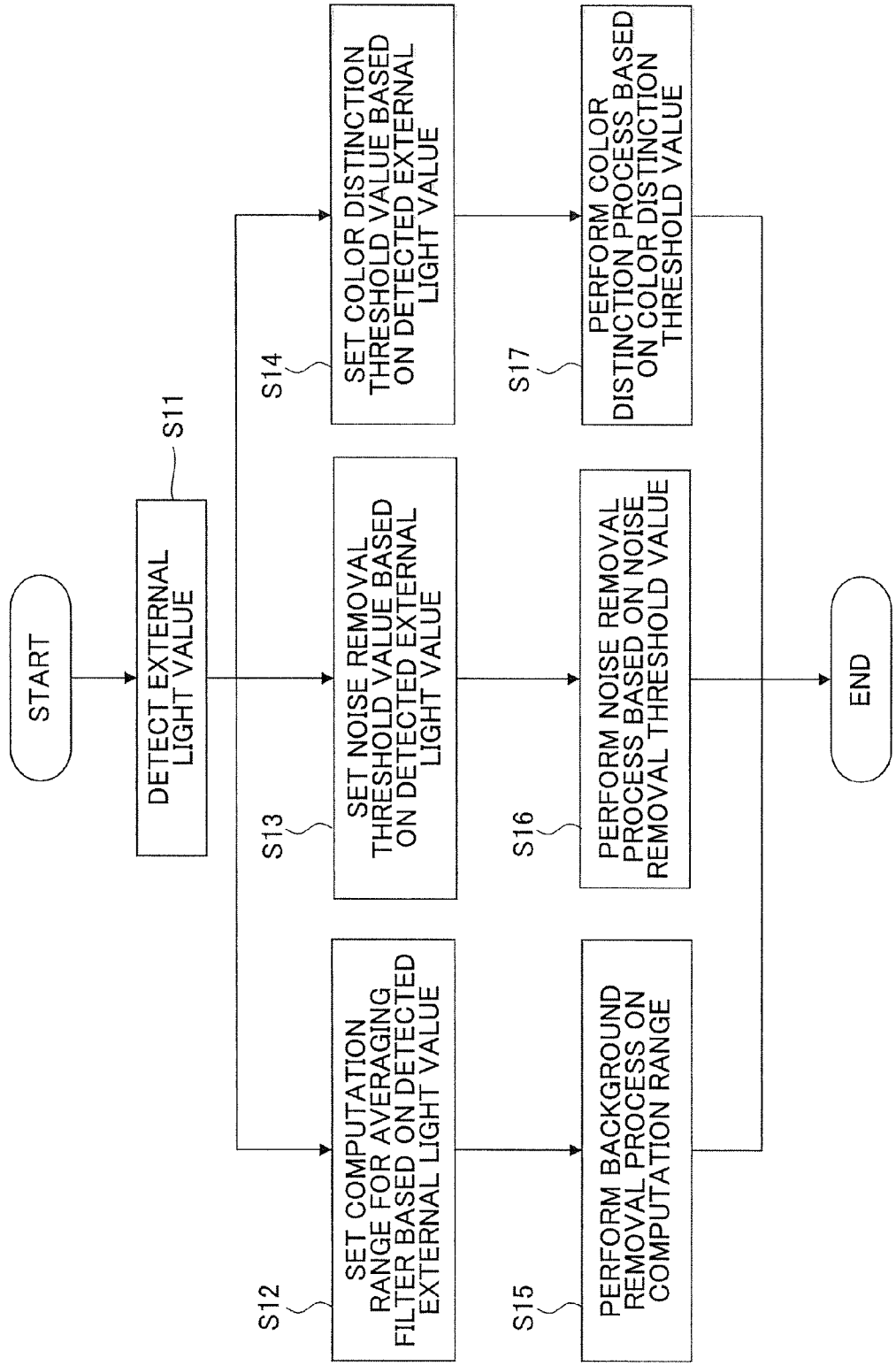

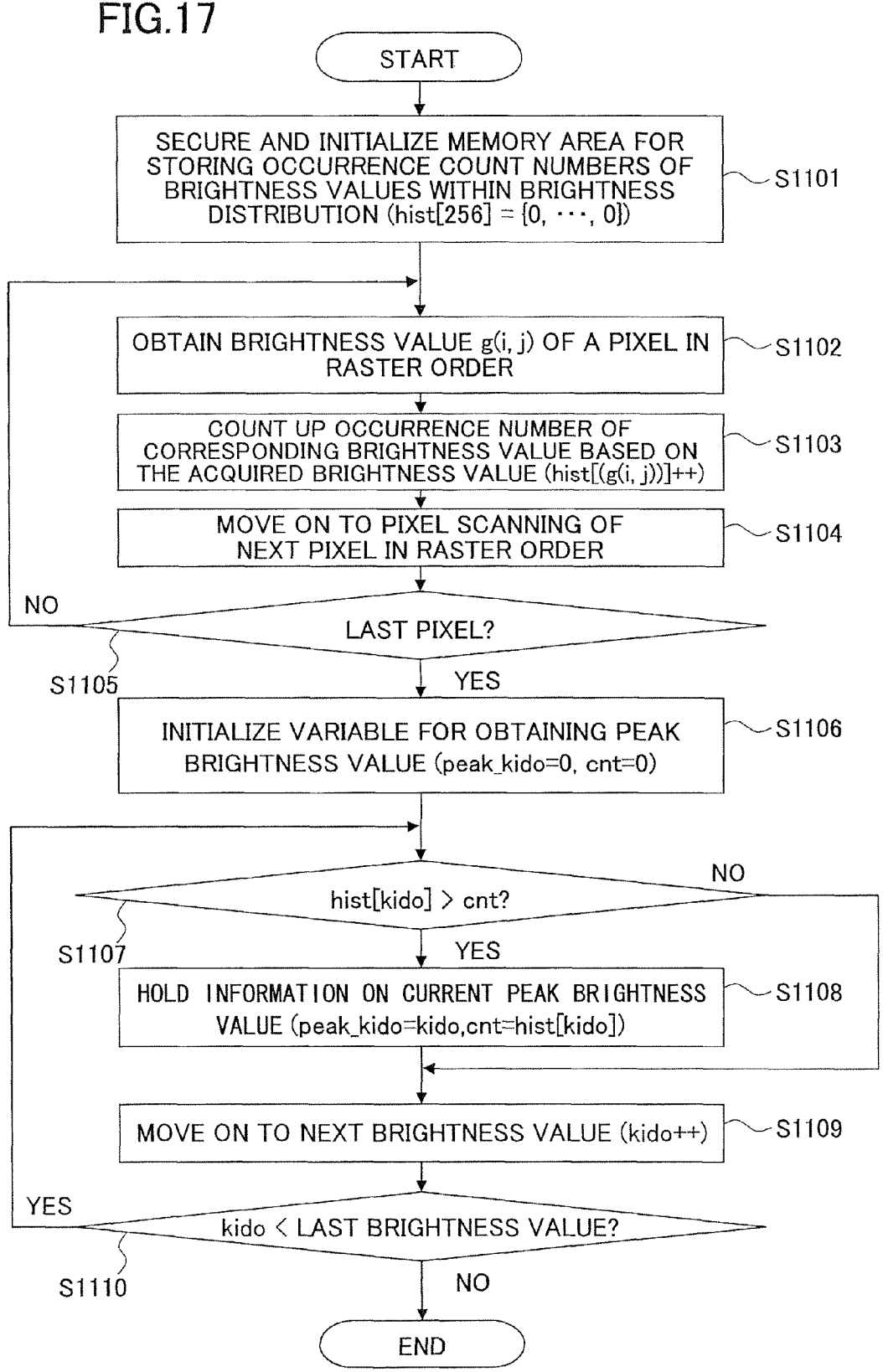

FIG.18A

TARGET PIXEL(ij)

$b\_ave = \left(\sum b_i\right)/9$ $g\_ave = \left(\sum g_i\right)/9$ $r\_ave = \left(\sum r_i\right)/9$

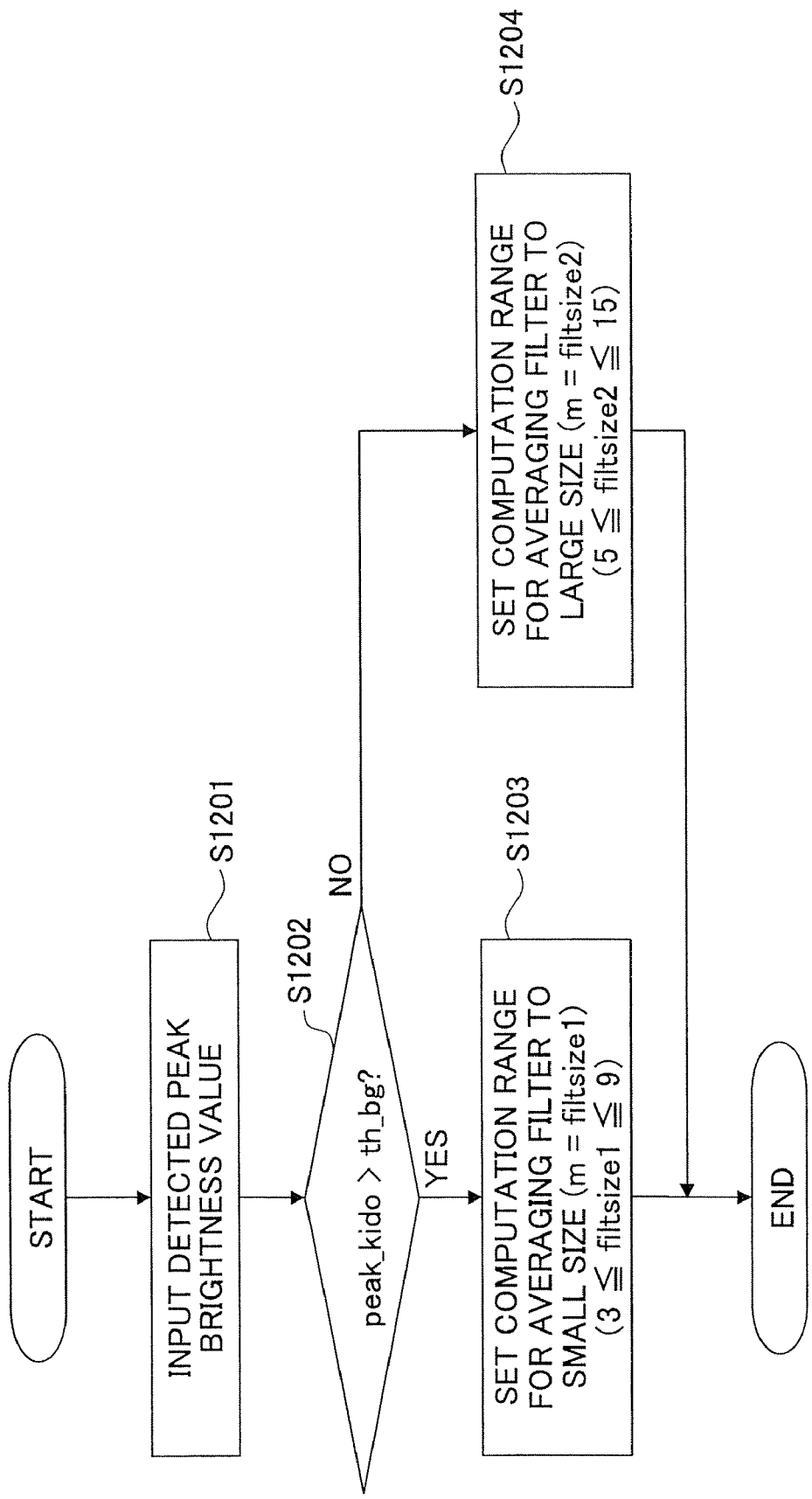

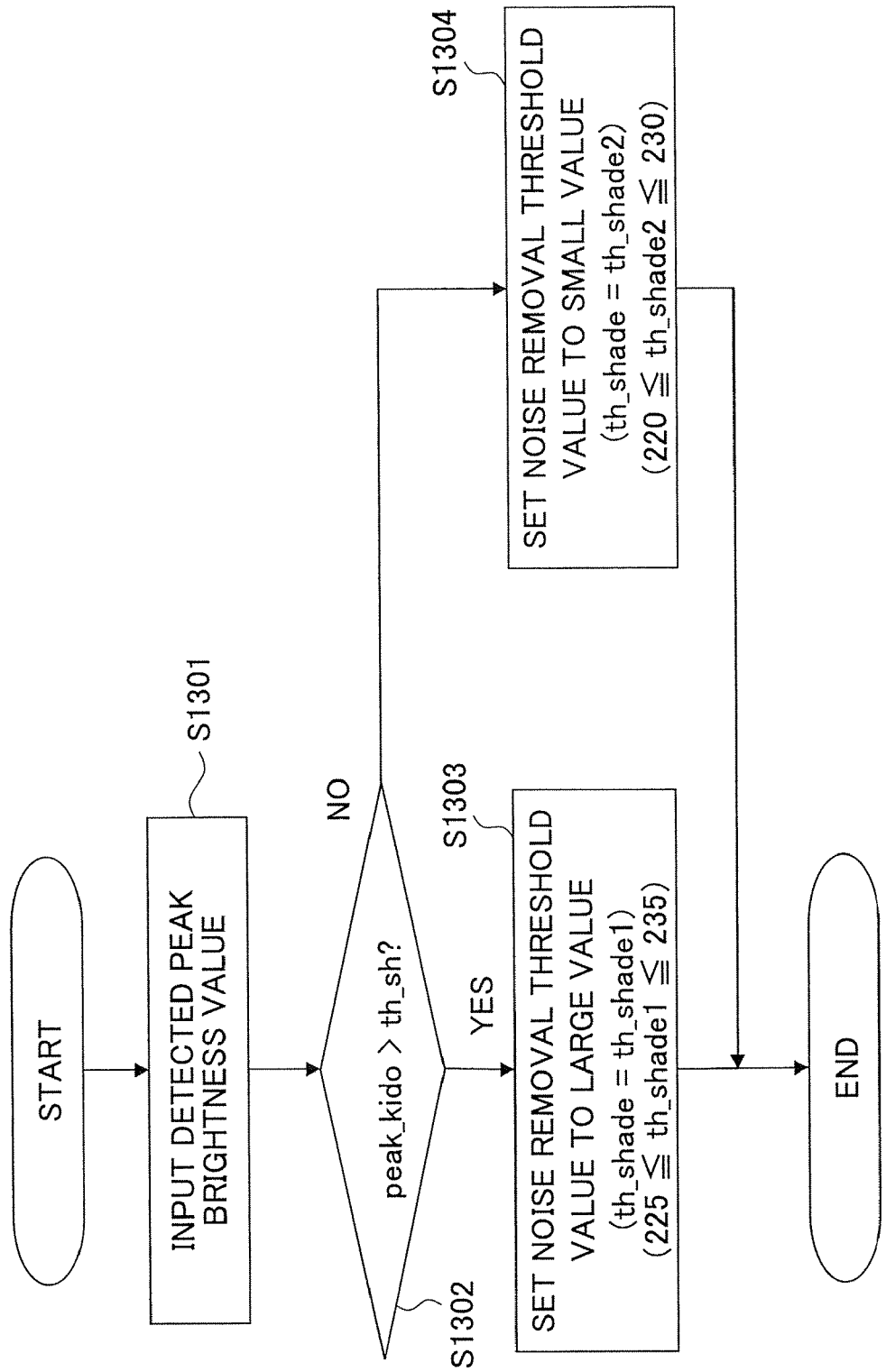

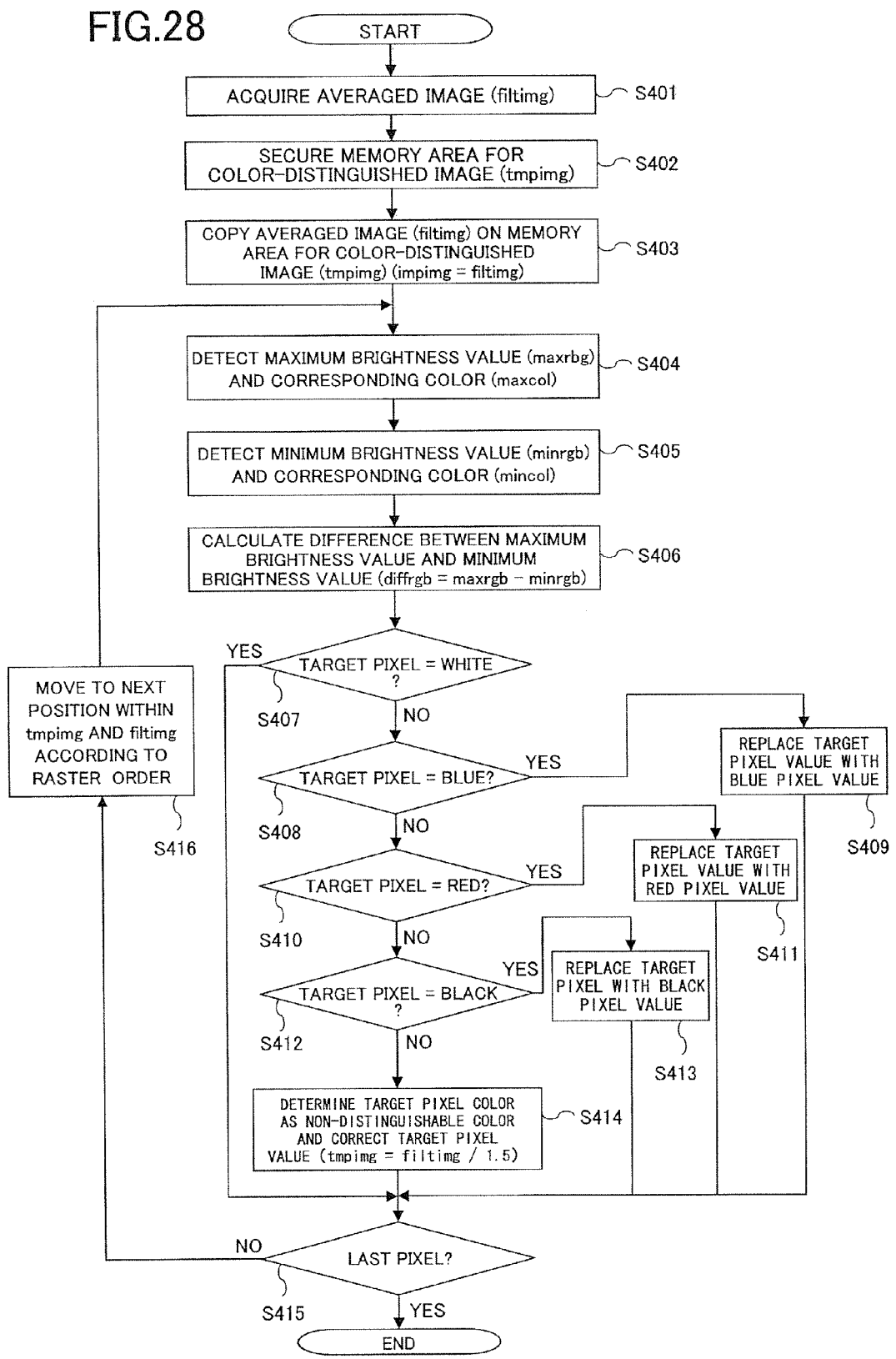

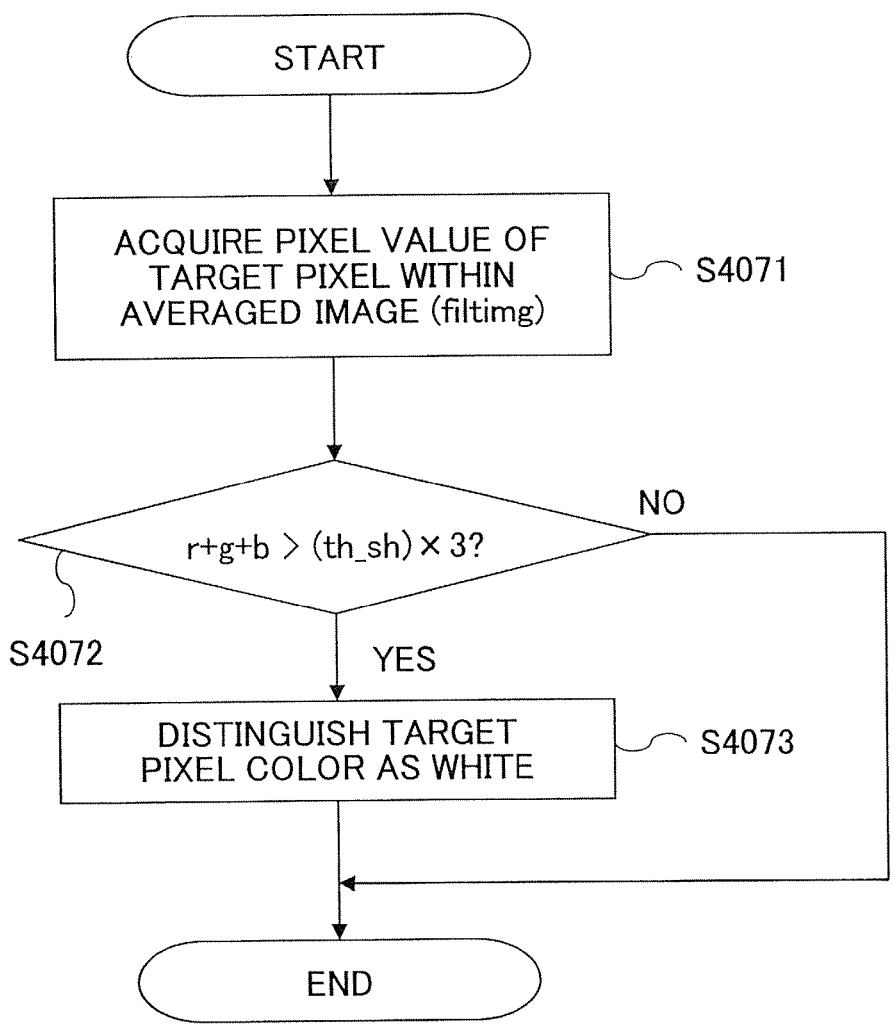

IMAGE DISPLAY APPARATUS, IMAGE DISPLAY METHOD, AND IMAGE DISPLAY PROGRAM

BACKGROUND OF THE INVENTION

1. Field of the Invention

The present invention relates to an image display apparatus, an image display method, and an image display program adapted for compositing a projection image projected on a projection screen and a written image written on a writing screen, extracting the written image as electronic information, and processing the written image.

2. Description of the Related Art

In addition to having basic functions for displaying visual information such as characters, figures, and images on a display screen, an image display apparatus is starting to have interactive functions for enabling the apparatus to work closely with a user.

Such functions may have developed in view of the recent technological advancements in information processing apparatuses such as the computer which is used to configure the system of the image display apparatus. Also, the fact that the image display apparatus is often used in situations demanding efficient execution of complicated processes involving interactive operations by the user may have created incentives for developing such functions.

For example, in a situation where the image display apparatus is used in a conference or a seminar in which participants discuss the contents of the image information displayed on the display screen, the image display apparatus may desirably have a function for inputting information describing matters discussed during the course of the conference/seminar as electronic information in a personal computer which function may enable a participant to write information over the image information displayed on the display screen as is necessary in leading the discussion.

In view of such circumstances, image display apparatuses have been developed that are adapted to realize image display and image writing on the same screen and extract the written image as electronic information.

For example, Japanese Laid-Open Patent Publication No. 2005-71192 discloses an image display apparatus that uses an image capturing device such as a CCD camera to capture images of written characters and figures as electronic image information, determines a representative color based on the RGB value of the written image information, and performs color conversion of the written image information into the determined representative color to extract the written image information. Japanese Laid-Open Patent Publication No. 2005-354171 discloses an image display apparatus that measures the external light in the used environment, switches the color of a projected image of an image projecting apparatus such as a projector to black or white according to the measured external light, and changes the color of a written image in order to obtain a composite image including a high quality written image that is not influenced by external light.

However, the technique disclosed in Japanese Laid-Open Patent Publication No. 2005-71192 does not take into account variations in external light so that when the image display apparatus is used in a very dark environment (e.g., inside a room with the lights turned off) or a very bright environment (e.g., environment in which sunlight seeps through the display screen), the accuracy of color distinction involving determining a representative color based on the RGB value of a written image and distinguishing the written color may be degraded.

Also, although the technique disclosed in Japanese Laid-Open Patent Publication No. 2005-354171 takes into account the variations in external light in adjusting the color of a written image to thereby achieve advantageous effects in improving the quality of the composite image from which a written image is extracted (i.e., an image suitable for having written information extracted therefrom may be stably obtained under any usage environment), with regard to image processes for extracting the written image from the composite image (e.g., background removal, shading correction, color conversion), effective measures that take into account such variations in external light to accurately extract the written image are not proposed so that the accuracy of written image extraction may be degraded in such image processes including color distinction and recognition of the written image, for example.

As can be appreciated, prior art techniques as described above have problems with regard to accurately extracting a written image from a composite image taking into account variations in external light conditions that may vary depending on the usage environment of the image display apparatus.

SUMMARY OF THE INVENTION

Embodiments of the present invention are directed to an image display apparatus, an image display method, and an image display program that are adapted for controlling image processes for extracting a written image from captured image data according to external light conditions that may vary depending on the usage environment of the image display apparatus.

According to one embodiment of the present invention, an image display apparatus is provided that includes:

an image projecting unit that projects a projection image on a projection screen;

a written image capturing unit that captures a written image of a writing screen that is arranged opposite the projection screen;

a written image area extracting unit that extracts a written image area from the captured written image captured by the written image capturing unit; and an image compositing unit that composites the written image area extracted by the written image area extracting unit and the projection image projected by the image projecting unit;

wherein the written image area extracting unit includes an external light value detecting unit that detects an external light value, and an image processing unit that performs an image correction process on the captured written image based on the external light value detected by the external light detecting unit.

According to another embodiment of the present invention, an image display method is provided that includes the steps of:

projecting a projection image on a projection screen;

capturing a written image of a writing screen that is arranged opposite the projection screen;

extracting a written image area from the captured written image; and compositing the extracted written image area and the projection image; wherein the written image area extracting step involves detecting an external light value and performing an image correction process on the captured written image based on the detected external light value.

According to another embodiment of the present invention, a computer-readable medium is provided that contains a computer-readable program for displaying an image, which programs is run on a computer and is executed by the computer to perform the steps of:

projecting a projection image on a projection screen;

capturing a written image of a writing screen that is arranged opposite the projection screen;

extracting a written image area from the captured written image; and compositing the extracted written image area and the projection image; wherein the written image area extracting step involves detecting an external light value and performing an image correction process on the captured written image based on the detected external light value.

BRIEF DESCRIPTION OF THE DRAWINGS

FIG. 15 is a diagram illustrating a brightness distribution of external light that is detected by an external light value detecting unit of the image display apparatus according to the first embodiment;

FIG. 16 is a flowchart illustrating process steps for controlling the computation processes of an image processing unit according to variations in external light conditions;

FIG. 17 is a flowchart illustrating process steps performed by the external light value detecting unit of the image display apparatus according to the first embodiment;

FIG. 18A is a diagram illustrating a background removal process performed on a computation range of 3×3 pixels by the background removal unit using an averaging filter;

FIG. 19 is a flowchart illustrating process steps performed by the background removal unit for controlling the computation range for the averaging filter according to variation in external light conditions;

FIG. 22 is a flowchart illustrating process steps performed by the shading correction unit for setting a noise removal threshold value according to variations in external light conditions;

FIG. 28 is a flowchart illustrating process steps a color distinction process performed by the color conversion unit;

FIG. 29A is flowchart illustrating process steps of the color distinction process for distinguishing white;

DESCRIPTION OF THE PREFERRED EMBODIMENTS

In the following, preferred embodiments of the present invention are described with reference to the accompanying drawings.

Embodiment 1

Figure 1A:
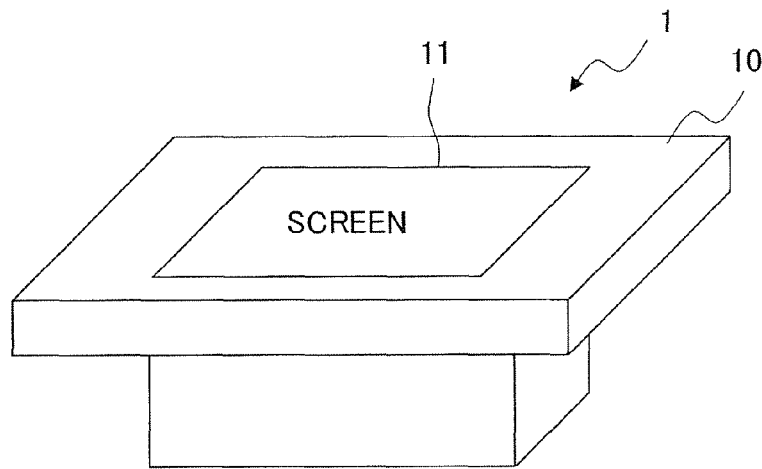
FIG. 1A is an external perspective view of an image display apparatus according to a first embodiment of the present invention.
Figure 1B:
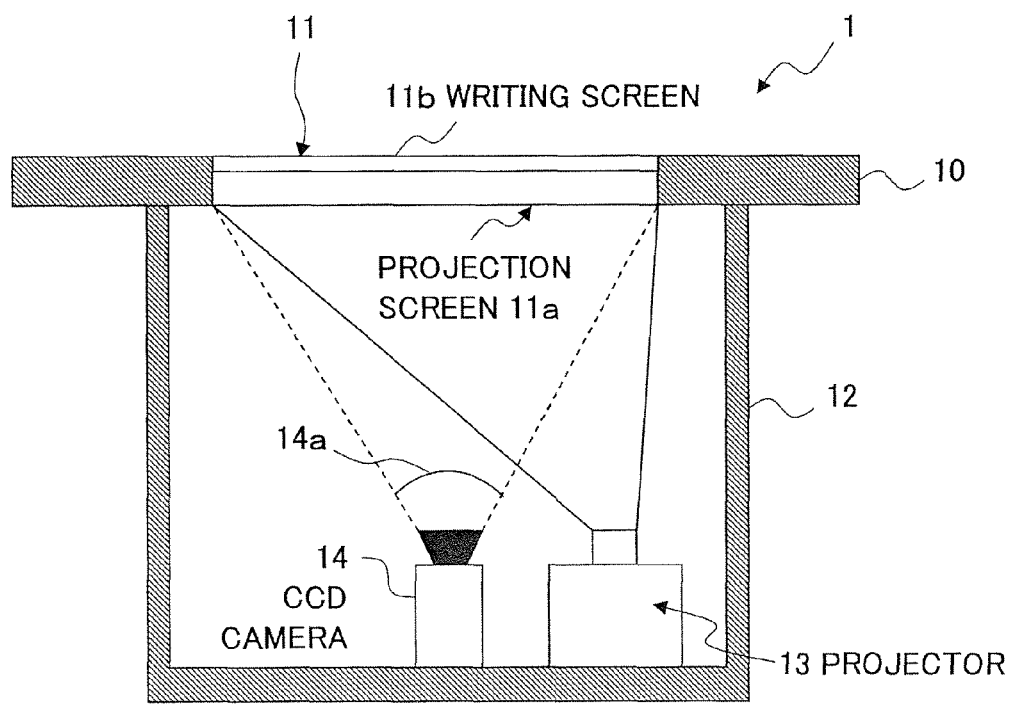
FIG. 1B is a cross-sectional view of the image display apparatus according to the first embodiment.

FIGS. 1A and 1B are respectively an external perspective view and a cross-sectional view of a display unit of an image display apparatus according to a first embodiment of the present invention.

Figure 1C:
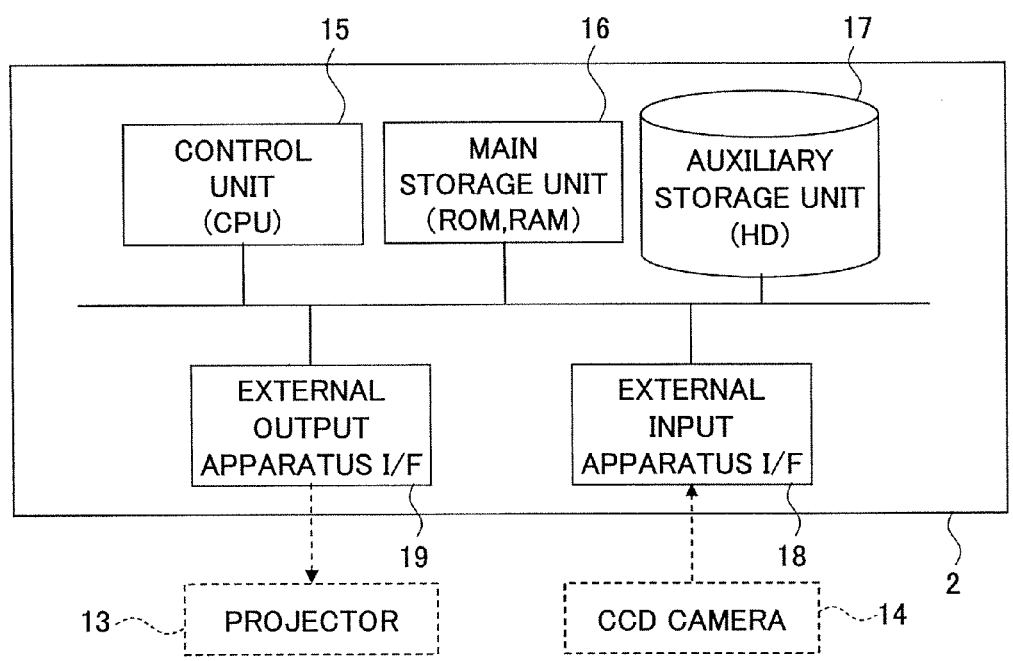
FIG. 1C is a block diagram showing an exemplary hardware configuration of a mainframe unit of the image display apparatus according to the first embodiment.

The image display apparatus according to the present embodiment includes the display unit 1 as is shown in FIGS. 1A and 1B and a mainframe unit (projection image generating unit) 2 as is shown in FIG. 1C.

The display unit 1 includes a rectangular plane unit 10 having a rectangular screen (display screen) 11 arranged at its center portion on which an image projected from the interior of the apparatus is displayed.

As is shown in FIG. 1B, the display unit 1 includes the plane unit 10 with the screen 11 arranged at its center portion, a box 12 that supports the plane unit 10, a projector 13 that projects an image on the screen 11, and a CCD (Charge Coupled Devices) camera (image capturing unit) 14 that is positioned such that its angle of view 14a covers the entire rear face of the screen 11 and is configured to capture an image of the screen 11 from its rear face.

The projector 13 and the CCD camera 14 are accommodated inside the box 12. The CCD camera 14 is connected to the mainframe unit 2 by a cord, and the projector 13 is optically coupled to the mainframe unit 2.

The screen 11 has a dual-layer structure including a projection screen 11a on which a projection image may be projected that is arranged on the rear side of the screen 11 and a writing screen 11b on which images may be written using a water base pen or a white board marker (referred to as "marker" hereinafter) that is arranged on the surface side of the screen 11. The projection screen 11a and the writing screen 11b face each other and are bound together into an integrated structure.

In the present embodiment, the projection screen 11a and the writing screen 11b are both transparent, and the face of the projection screen 11a that comes into bonding contact with the writing screen 11b is arranged into a fine indented surface so that when an image is projected on the projection screen 11a, the image light may be slightly scattered and transmitted to enable the projected image to be viewed from various angles.

The surface of the writing screen 11b may be covered by a transparent protective sheet or a transparent coating, for example, so that it may be protected from damage such as scratches.

The projector 13 is optically coupled to a display of the mainframe unit 2 by an optical system including a reflection mirror and a beam splitter, for example, and is configured to project a desired image generated at the mainframe unit 2 on the projection screen 11a of the screen 11.

The CCD camera 14 is connected to the mainframe unit 2 via a USB (Universal Serial Bus) interface and a cord, for example. The CCD camera 14 successively captures images of characters and figures written on the surface of the screen 11 (i.e., the writing screen 11b) at predetermined time intervals from the rear face of the screen 11 (i.e., projection screen 11a) to acquire captured images (referred to as "captured image data" hereinafter).

It is noted that the CCD camera 14 may be any type of image capturing device that is capable of acquiring an image as digital image data including an industrial CCD camera and a generally used digital camera, for example. Also, it is noted that the interface used for establishing connection between the mainframe unit 2 and the CCD camera 14 does not necessarily have to be a USB interface, and other types of interfaces preferably having a relatively high transmission speed may be used as well.

FIG. 1C is a block diagram showing a hardware configuration of the mainframe unit 2 of the image display apparatus according to the first embodiment.

The illustrated mainframe unit 2 includes a control unit 15 having a CPU (Central Processing Unit); a main storage unit 16 having a RAM (Random Access Memory) and a ROM (Read Only Memory), for example; an auxiliary storage unit 17 having a HD (Hard Disk), for example; external input/output I/Fs (interfaces) 18 and 19 for establishing connection with external units such as the CCD camera 14 and the projector 13. The control unit 15 executes an image display control program according to an embodiment of the present invention.

For example, in a case where a user wishes to write characters and figures directly onto the writing screen 11b using a marker while viewing the projected image of the projection screen 11a and store the written information along with the projected image as electronic information, the control unit 15 may execute a relevant control program according to a control command signal that is issued in response to a corresponding trigger such as the user clicking a dialog button or pressing a hard key switch.

By executing such a control program, image information of characters and figures written on the writing screen 11b may be captured by the CCD camera 14 and the written image may be extracted from the captured image data. Then, the extracted written image and the projection image projected on the projection screen 11a from the projector 13 may be composited, and the resulting composite image data may be projected on the projection screen 11a.

As can be appreciated from the above descriptions, in the present embodiment, written characters and figures may be captured as electronic information to thereby enable effective usage of the written information such as projecting the information on the projection screen 11a or storing the information in the auxiliary storage unit 17 of the mainframe unit 2.

It is noted that the mainframe unit 2 does not necessarily have to be a dedicated unit for the image display apparatus according to the present embodiment, and may alternatively be a PC (personal computer) that includes at least the essential components of the mainframe unit 2 and has relevant programs and data installed therein for executing image display processes according to an embodiment of the present invention, for example. In this case, the PC being used as the mainframe unit 2 may be arranged outside the box 12.

As can be appreciated, in the image display apparatus according to the present embodiment, a desired image generated by the mainframe unit 2 may be projected on the projection screen 11a of the screen 11 by the projector 13, and characters and figures written on the writing screen 11b of the screen 11 may be captured from the rear face of the screen 11 by the CCD camera 14 to acquired captured image data.

Figure 2:
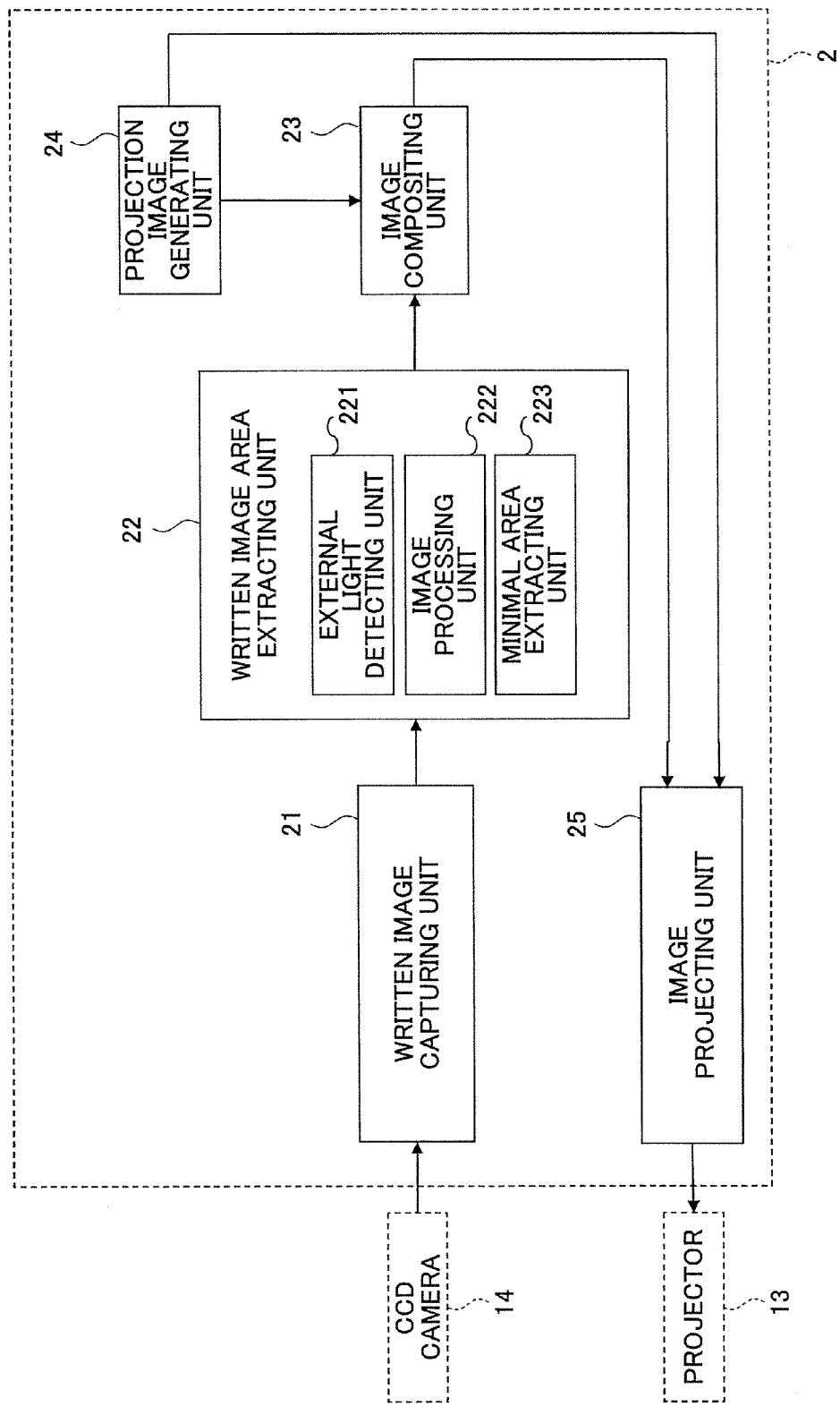
FIG. 2 is a block diagram showing an exemplary functional configuration of the image display apparatus according to the first embodiment.
Figure 3:
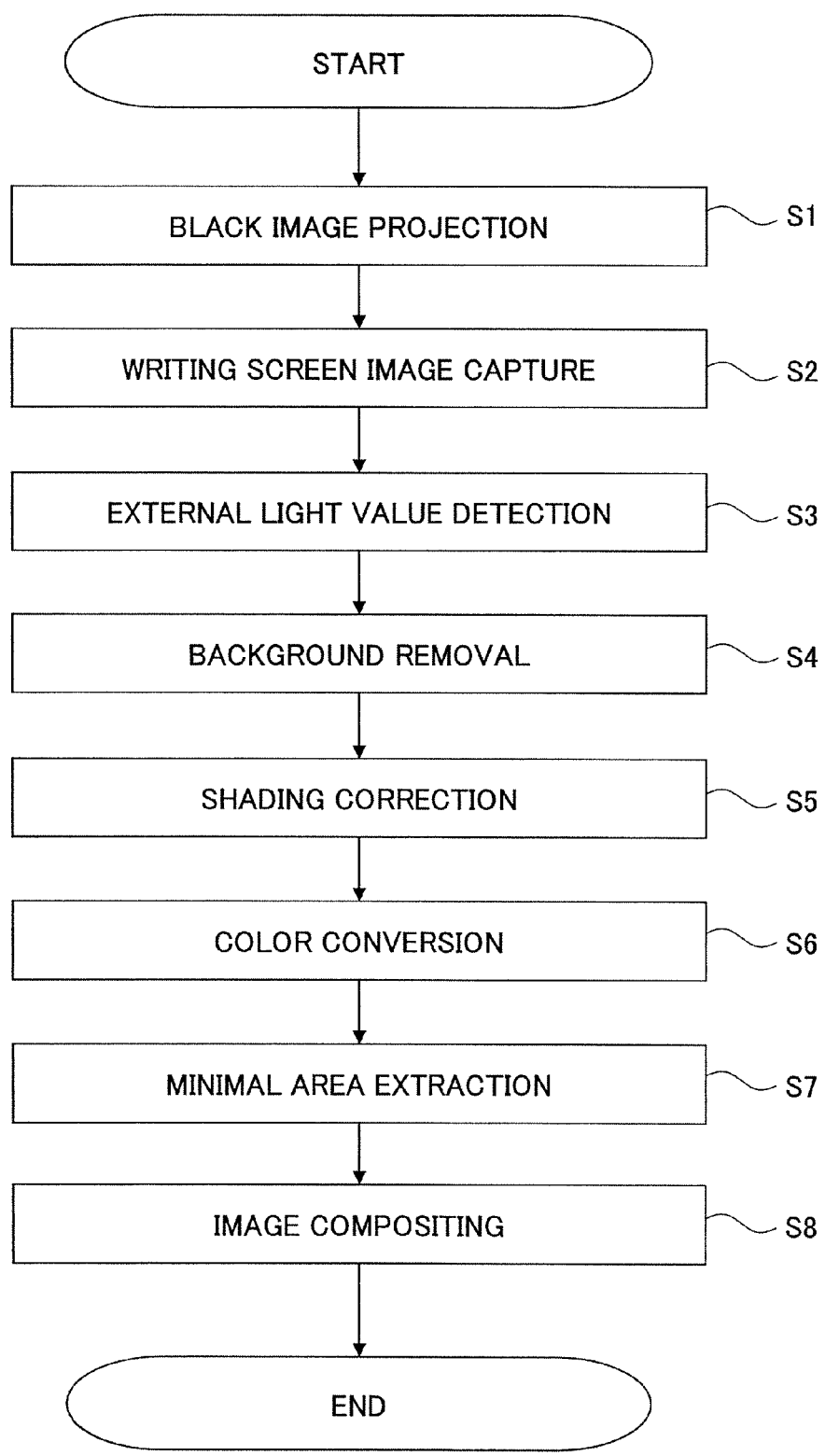
FIG. 3 is a flowchart illustrating overall process steps performed by the image display apparatus according to the first embodiment.

FIG. 2 is a block diagram showing an exemplary configuration of a main functional part of the image display apparatus according to the first embodiment. FIG. 3 is a flowchart illustrating process steps executed by the image display apparatus according to the first embodiment.

As is shown in FIG. 2, the mainframe unit 2 includes a written image capturing unit 21, a written image area extracting unit 22, an image compositing unit 23, a projection image generating unit 24, and an image projecting unit 25.

The written image capturing unit 21 captures an image of the writing screen 11b of the screen 11 with the CCD camera 14 and acquires captured image data including image information of characters and figures written on the writing screen 11b.

The written image area extracting unit 22 extracts image data of a minimal image area including the image information of the characters and figures written on the writing screen 11b (referred to as "written image" hereinafter) from the captured image data acquired by the written image capturing unit 21.

The written image area extracting unit 22 includes an external light value detecting unit 221, an image processing unit 222, and a minimal area extracting unit 223 for accurately extracting a written image without being influenced by external light conditions that may vary depending on the usage environment of the image display apparatus.

The image compositing unit 23 composites the written image extracted by the written image area extracting unit 21 and the projection image projected on the projection screen 11a.

The projection image generating unit 24 includes an interface with the projector 13 and generates an image to be projected on the projection screen 11a by the projector 13 according to a predetermined application program.

The image projecting unit 25 projects the projection image generated by the projection image generating unit 24 and the composite image generated by the image compositing unit 23 (i.e., composite image of the written image and the projection image) on the projection screen 11a.

When a control program according to an embodiment of the present invention that is run on the control unit 15 is executed, a command signal for the projector 13 to project a black image may be issued from the control unit 15 according to the control program so that the projector 13 may be controlled to project such a black image according to the issued command signal.

In capturing an image of the writing screen 11b with the CCD camera 14, since a projection image is projected on the screen 11, the captured image data acquired by capturing the image of the writing screen 11b after information is written thereon include information of characters and figures written on the writing screen 11b by a marker as well as information of the projection image projected by the projector 13.

The captured image data as described above merely include color information so that it is quite difficult to distinguish and extract the written image from the captured image data.

Accordingly, in the present embodiment, the projector 13 is shielded by the image projecting unit 25 in order to avoid transfer of unnecessary information into the captured image data.

In another embodiment, if the projector 13 has a mute function, such a function may be used to shield the projector 13.

Figure 5:
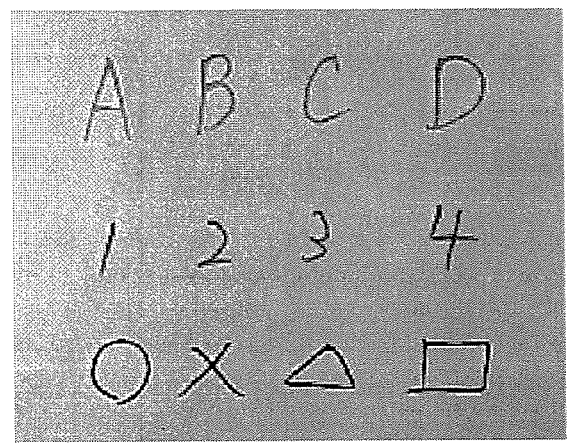
FIG. 5 is a diagram illustrating exemplary captured image data that are captured by a written image capturing unit of the image display apparatus according to the first embodiment.

FIG. 5 is a diagram showing exemplary captured image data that are captured by the written image capturing unit 21 included in the image display apparatus according to the first embodiment.

The written image capturing unit 21 captures an image of the writing screen 11b when the projector 13 is shielded by the image capturing unit 25 to acquire captured image data as is shown in FIG. 5, for example.

In the process flow of the image display apparatus as is shown in FIG. 3, a black image is projected on the projection screen 11a from the projector 13 by the image projecting unit 25 according to a command signal from the control unit 15 (S1), and information of characters and figures written on the writing screen 11b as captured image data are acquired by the written image capturing unit 21 from the CCD camera 14 (S2).

Then, the captured image data acquired by the written image capturing unit 21 are transferred to the written image area extracting unit 22.

The written image area extracting unit 22 controls the external light value detecting unit 221 to detect an external light value under the current usage environment of the image display apparatus based on captured image data of the writing screen 11b that does not include written characters and figures (referred to as "blank image" hereinafter) (S3).

Then, based on the external light value detected by the external light value detecting unit 221, the image processing unit 222 performs a background removal process (S4), and image correction process (shading correction process) (S5), and a color conversion process (S6).

Then, the minimal area extracting unit 223 extracts a minimal written image area (written image) from the processed image data (S7).

Then, the written image extracted by the written image area extracting unit 22 are transferred to the image compositing unit 23 at which the written image is composited with a projection image generated by the projection image generating unit 24 so that the resulting composite image may be stored in the auxiliary storage unit 17 of the image display apparatus or projected on the projection screen 11a by the image projecting unit 25, for example.

As can be appreciated from the above descriptions, in the present embodiment, image processing is performed on image data subject to written image extraction according to external light conditions based on the external light value detected by the external light value detecting unit 221 so that influences of the external light on the captured image data may be properly corrected and information of written characters and figures may be accurately acquired.

In the following, image processes performed by the written image area extracting unit 22 according to external light conditions are described with reference to FIGS. 4-14.

As is described above, the written image area extracting unit 22 includes the external light value detecting unit 221, the image processing unit 222, and the minimal area extracting unit 223.

Captured image data captured by the written image capturing unit 21 are input to the written image extracting unit 22 at which the image processing unit 222 performs image correction processes on the input captured image data and the minimal area extracting unit 223 extracts the written image.

In this case, functional units included in the image processing unit 222 are controlled according to the external light conditions in the usage environment of the image display apparatus based on the external light value detected by the external light detecting unit 221.

Figure 9:
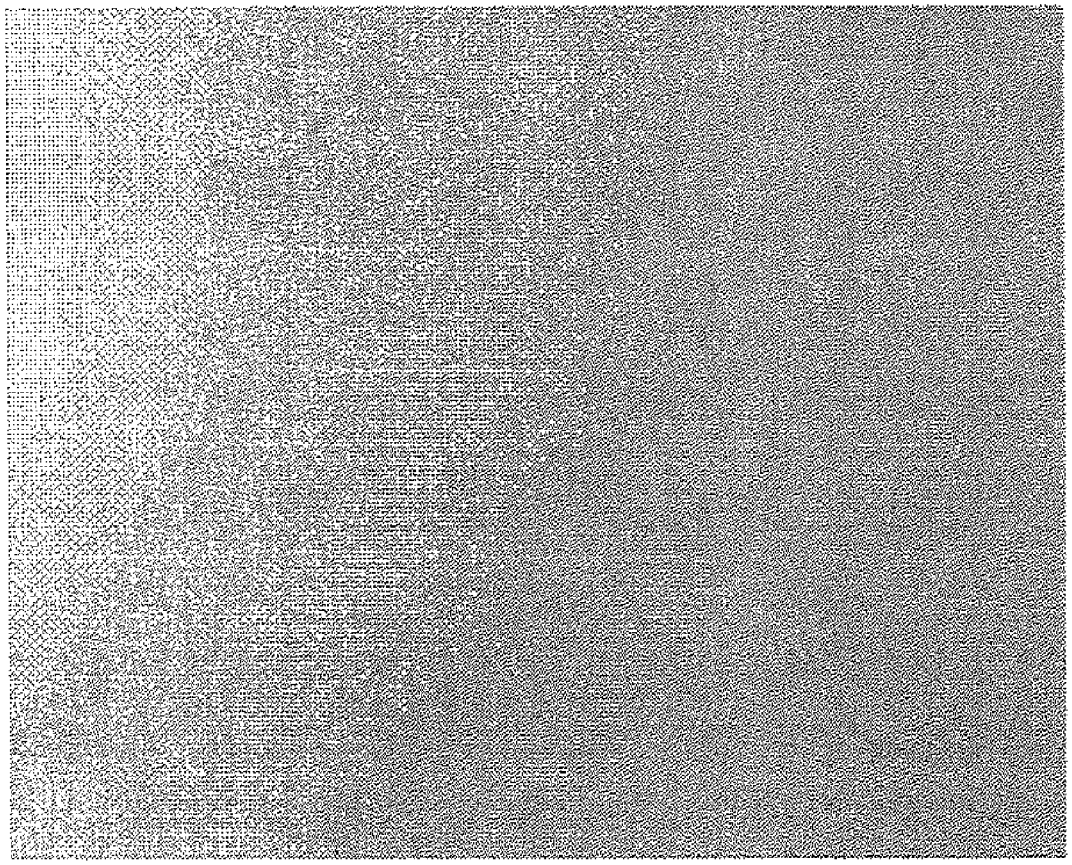
FIG. 9 is a diagram illustrating a blank image corresponding to an image of a writing screen of the image display apparatus that is captured when no objects are written thereon.

The external light detecting unit 221 includes external light value detection means 51 for detecting the external light value to be used upon performing image correction on the captured image data at the image processing unit 222. According to one embodiment, the external light value detecting unit 221 may detect the external light value for image correction by calculating the brightness distribution (histogram) from the blank image as is shown in FIG. 9, and determining the most frequently occurring brightness value of the calculated brightness distribution (histogram) as the external light value for image correction.

The image processing unit 222 has image processing means for correcting the captured image data captured and acquired by the written image capturing unit 21 so that information of written characters and figures may be accurately obtained. Specifically, the image processing unit 222 includes a background removal unit 2221, a shading correction unit 2222, and a color conversion unit 2223.

The background removal unit 2221 includes background removal means 52 for calculating a background removal threshold value for a target pixel using an averaging filter and performing a binarization process on the captured image data captured by the written image capturing unit 21 and removing a background area corresponding to an image area other than the written image area containing written characters and figures. It is noted that the averaging filter range (averaging computational range) for the target pixel may be adjustably set according to the variations in the external light conditions.

Figure 6:
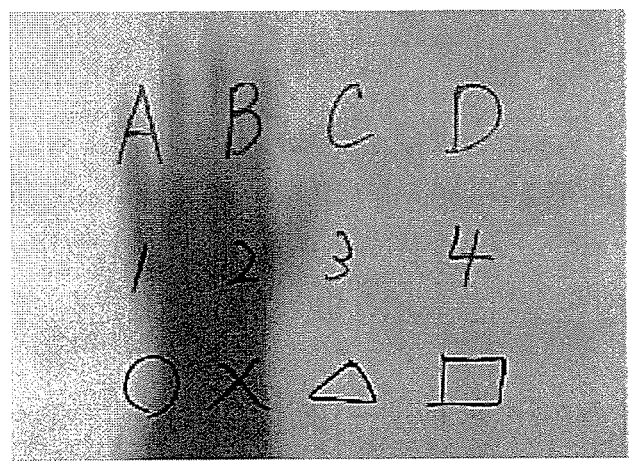
FIG. 6 is a diagram illustrating exemplary captured image data including a shadow of a human hand that are captured by a written image capturing unit of the image display apparatus according to the first embodiment.

FIG. 6 is a diagram showing exemplary captured image data including a shadow of a hand that is captured by the written image capturing unit 21 of the image display apparatus according to the first embodiment.

The background removal unit 2221 uses the background removal means 52 to remove a background area including noise such as shadows as is shown in FIG. 6 to extract only the written image area containing characters and figures written on the writing screen 11b.

The characters and figures that are written with a marker are in contact with the writing screen 11b. Such characters and figures have clear outlines and internal portions with high density (low gray scale value). On the other hand, backgrounds areas and shadows have lower densities compared to the characters and figures so that the written characters and figures may be distinguished from the rest of the captured image data by performing a binarization process.

Generally, a clipping process is performed upon removing a background area from a processing image and extracting a target image portion from the processing image. The clipping process involves dividing areas into two according formulae (1) and (2) described below, where 'f(x, y)' denotes a color component density value and 't' denotes a threshold value:

$$f_t(x,y) = f(x,y) \text{ when } f(x,y) \leq t \quad (1)$$

$$f_t(x,y) = 0 \text{ when } f(x,y) > t \quad (2)$$

In this process, a background area and a written area containing written characters and figures are divided based on the threshold value t.

It is noted that thresholding methods such as the mode method, the p-tile method, and the differential histogram method are known for determining a threshold value; however, the threshold value is maintained at a constant value according to such methods. In the present embodiment, as is shown in FIG. 6, since the manner in which shadows and noise occur in a captured image may vary depending on the movement of persons and objects at the time the image is captured, a variable threshold value is used. Such a variable threshold value may be determined by a method involving scanning the pixels of the captured image data and varying the threshold value t for each target pixel. In this case, an average density value of each local area of N×N pixels including a target pixel and neighboring pixels may be determined as the threshold value t.

Figures 7, 8:
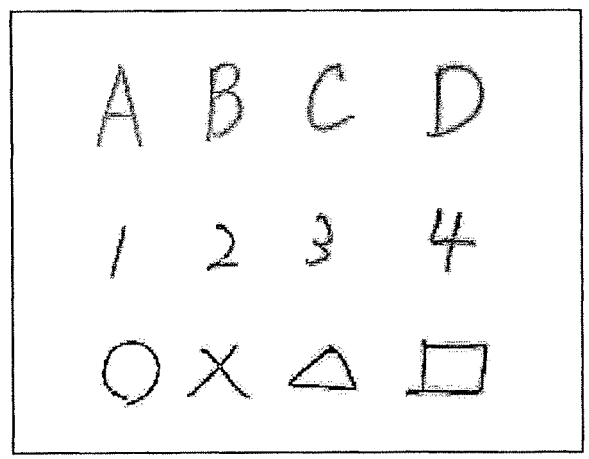
FIG. 7 is a diagram illustrating an exemplary variable threshold value calculation method used by a background removal unit of the image display apparatus according to the first embodiment.
FIG. 8 is a diagram illustrating exemplary image data resulting from the background removal unit performing a background removal process of removing a background image from captured image data.

FIG. 7 is a diagram illustrating an exemplary variable threshold calculating method that may be used by the background removal unit 2221 of the image display apparatus according to the first embodiment.

The background removal means 52 handles nine pixels including a target pixel (i, j) and neighboring pixels (i, j) as a computation area, divides a total value of green component (G component) density values g of the pixels by the number of pixels 9 to calculate an average value g_ave. That is, an averaging filter according to the computation range (i.e., 3×3 pixels in FIG. 7) is used to calculate the average density value.

In this case, the computation range for background removal on which the averaging filter is to be applied is adjusted based on the external light value detected by the external light value detecting unit 221. Specifically, the number of pixels m (filter size) of one side of the computation range of m×m pixels is determined according to the detected external light value.

In a preferred embodiment, based on the external light value, the computation range for background removal may be reduced in size when the background is bright (i.e., when the external light value is greater than a predetermined threshold value), and the computation range for background removal may be enlarged when the background is dark (i.e., when the external light value is less than the predetermined threshold value). In one specific embodiment, the pixel number m of one side of the m×m pixels defining the computation range for background removal may be adjusted to be within a value range of 3-9 when the background is bright (i.e., when the external light value is greater than a predetermined threshold value), and the pixel number m of one side of the m×m pixels may be adjusted to be within a value range of 5-15 when the background is dark (i.e., when the external light value is less than the predetermined threshold value) so that a suitable threshold value may be calculated for effectively removing a background area while leaving behind the lines of written characters and figures.

In the present embodiment, the average value g_ave calculated for the computation range of m×m pixels for background removal that is adjusted based on the external light value detected by the external light detecting unit 221 is used as the threshold value t in performing the clipping process as is described above.

When the density value g of a target pixel is less than the threshold value t (g<t), the background removal means 52 determines that the target pixel corresponds to a pixel of a written image area in which the characters and figures are written according to the formula (1) indicated above. When the density value g of a target pixel is greater than or equal to the threshold value t (g≧t), the background removal means 52 determines that the target pixel corresponds to a pixel of a background area containing shadows and noise, for example, and replaces the target pixel with a white pixel (255, 255, 255).

It is noted that FIG. 7 illustrates an example in which the density value of the green color component is referenced in performing background removal. However, in certain cases, written characters and figures may not be easily distinguished from a background area based on the average density values of the green color component depending on the marker used, for example. Accordingly, in a preferred embodiment, an averaging filter is used for every color component of the RGB color components to calculate an average density value (threshold value) of each color in each computation range, and the density value of a target pixel is compared with a corresponding threshold value for each color component to distinguish the written area with characters and figures from the background area based on the overall comparison results.

FIG. 8 is a diagram illustrating exemplary image data resulting from removing a background image portion from captured image data by the background removal unit 2221 of the image display apparatus according to the first embodiment.

In the illustrated example of FIG. 8, a background area is removed from the captured image data by the background removal means 52 as is described above so that the information of characters and figures written with a marker may be extracted.

The shading correction unit 2222 has brightness correction means 53 for planarizing a brightness gradient of the external light of the captured image data captured by the written image capturing unit 21.

Since external light incident on the screen 11 is used to capture an image with the CCD camera 14, there may be unevenness in the incident light caused by external light conditions depending on the usage environment of the image display apparatus.

Figure 10A:
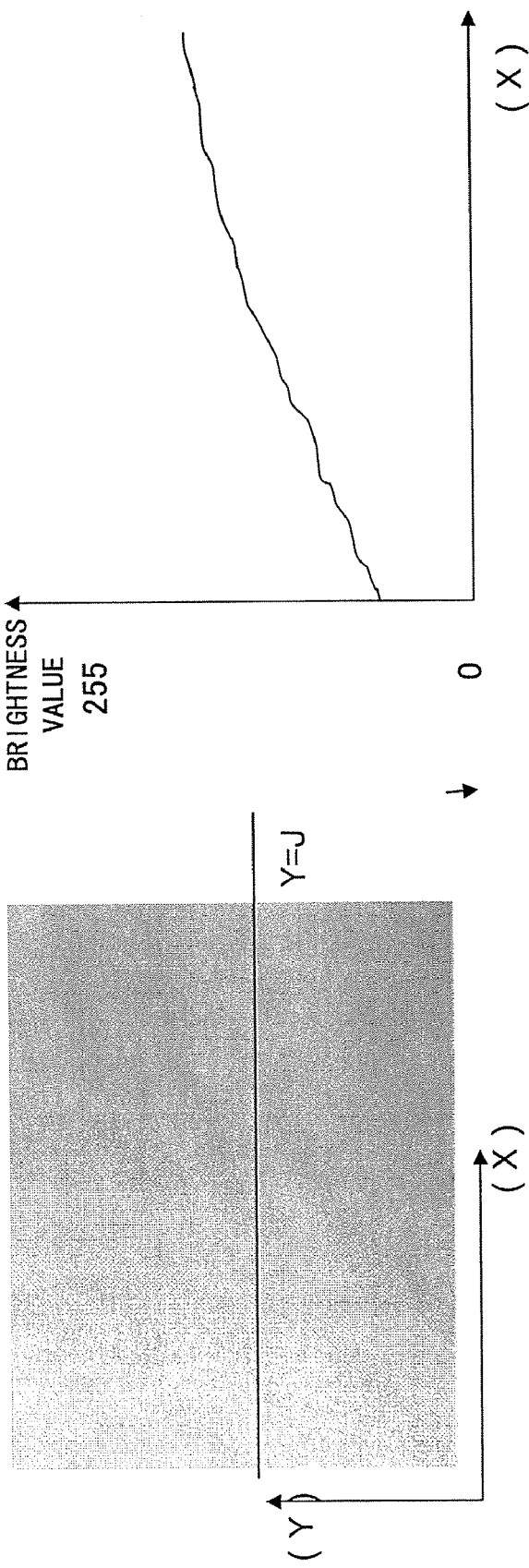
FIG. 10A is a diagram illustrating exemplary brightness gradient characteristics of captured image data of a blank image that are captured by the written image capturing unit in a case where unevenness in light distribution is created within the captured blank image data due to variations in external light conditions.

FIG. 10A shows a blank image and a graph illustrating a brightness gradient within the blank image captured by the written image capturing unit 21 of the image display apparatus according to the first embodiment (uneven distribution of light within the blank image caused by variations in external light).

In FIG. 10A, the illustrated blank image is brighter at the left side than the right side so that a brightness gradient is created within the captured blank image data. Due to such unevenness in the distribution of light in the image data, the threshold value for extracting a written image area including written characters and figures may vary depending on the pixel positions within the captured image data.

Figure 10B:
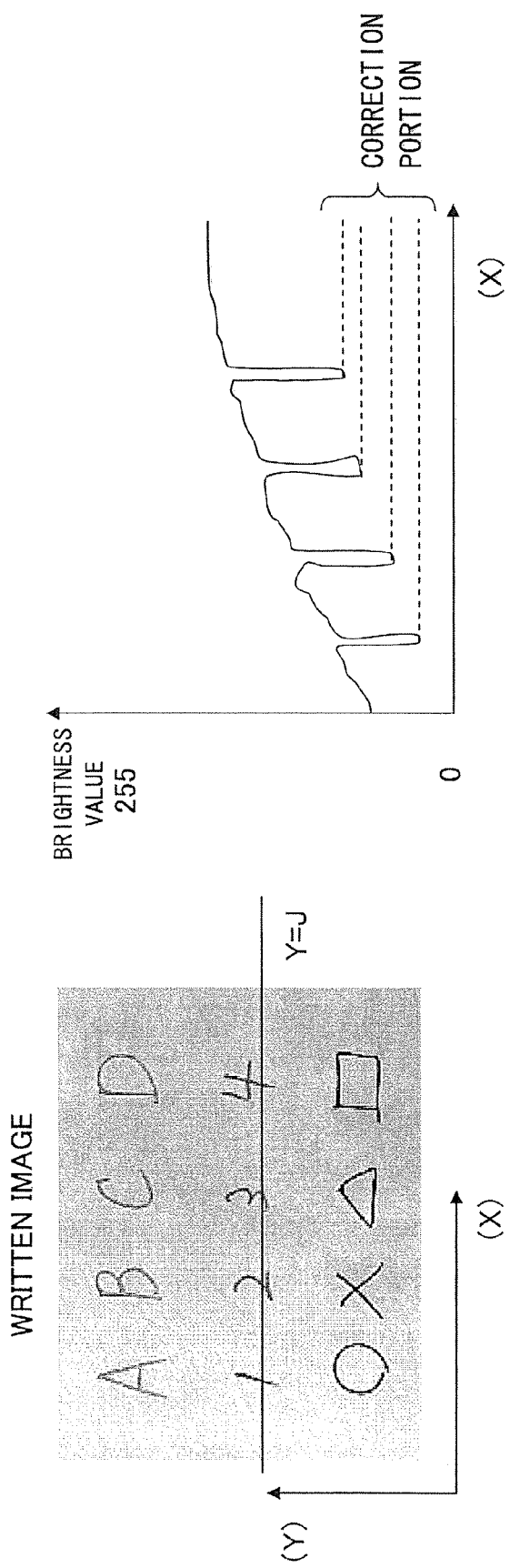
FIG. 10B is a diagram illustrating exemplary brightness gradient characteristics of captured image data of a written image that are captured by the written image capturing unit in a case where unevenness in light distribution is created within the captured written image data due to variations in external light conditions.

FIG. 10B shows a written image as captured image data and a graph illustrating a brightness gradient within the captured image data captured by the written image capturing unit 21 of the image display apparatus according to the first embodiment (uneven distribution of light within the captured written image caused by variations in external light).

Provided that a pixel line (Y=J) extending along the X axis direction within the blank image shown in FIG. 10A has a brightness gradient as is shown in the graph of FIG. 10A, when characters and figures are written on the writing screen 11b under such an environment, even when the same type of marker in the same color is used to write the characters and figures, the brightness values of the written characters and figures within the captured image data may not be uniform. Specifically, the characters and figures written in a brighter portion of the captured image data may be brighter than the characters and figures written in a darker portion of the captured image data as is shown in FIG. 10B. That is, the brightness values of the written lines of the characters and figures may vary depending on their positions within the captured image data, and differences are created in the RGB values of the color components of these lines as is shown in the graph of FIG. 10B (see "correction portion").

Accordingly, in order to planarize the brightness gradient within the captured image data, the brightness correction means 53 performs brightness correction (shading correction) on the captured image data using the blank image shown in FIG. 10A.

The brightness correction means 53 performs planarization of the brightness gradient by dividing pixel values of captured image data including written characters and figures by corresponding pixel values of a blank image, converting the pixel values of the captured image data into values representing a density level within a range of 0-255 (256 levels), and replacing the pixel values of the captured image data with the converted values.

It is noted that the blank image shown in FIG. 10A that is captured beforehand by the image display apparatus according to the usage environment and the captured image data including the written characters and figures as is shown in FIG. 10B have corresponding field angles so that a one-on-one correspondence is realized between coordinates (i, j) of the blank image and coordinates (i, j) of the captured image data. Provided that the pixel values of a given pixel of the captured image data are denoted as Rc, Gc, and Bc; the pixel values of a corresponding pixel of the blank image with the same coordinates as the given pixel are denoted as Rn, Gn, and Bn; and the number of density levels is denoted as D, brightness-corrected pixel values R, G, and B may be calculated from formulae (3)-(5) indicated below.

$$R=(Rc/Rn)*D \quad (3)$$

$$B=(Bc/Bn)*D \quad (4)$$

$$G=(Gc/Gn)*D \quad (5)$$

Figure 10C:
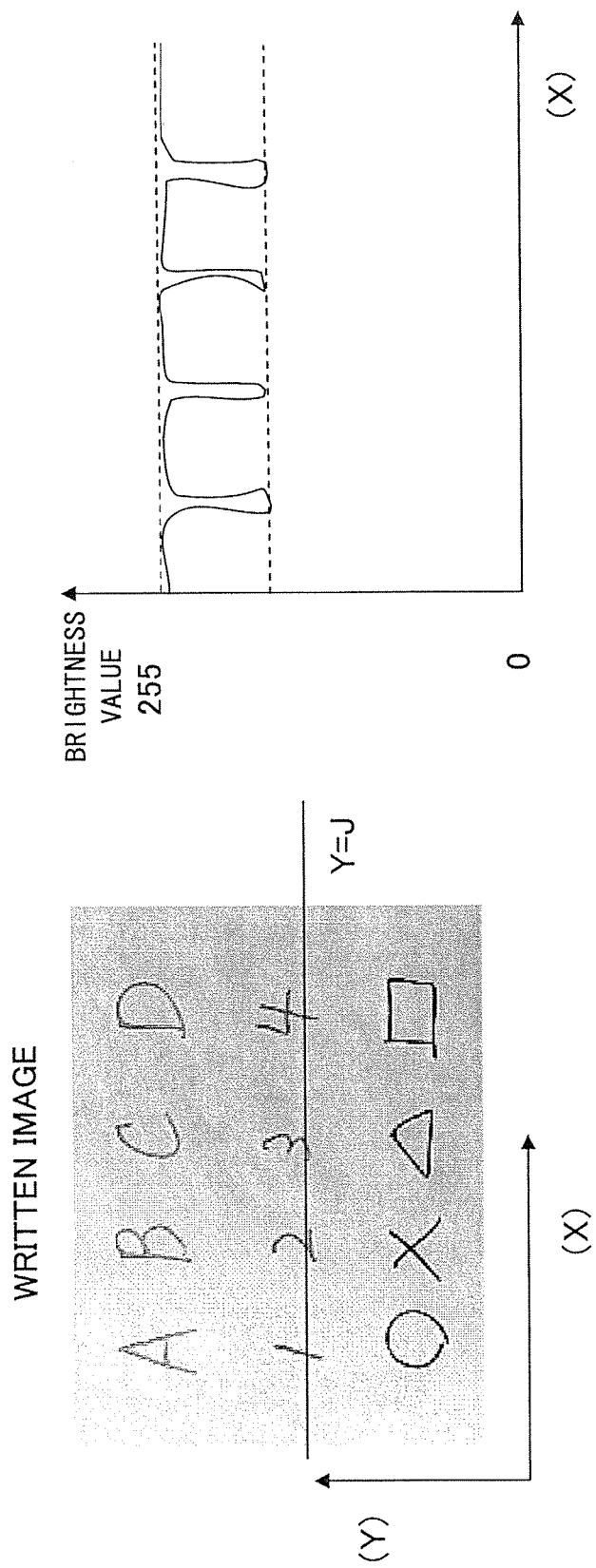
FIG. 10C is a diagram illustrating exemplary brightness gradient characteristics of corrected image data that are obtained by correcting the uneven light distribution of captured image data.

FIG. 10C shows a graph illustrating the brightness gradient of the captured image data captured by the written image capturing unit 21 of the image display apparatus according to the first embodiment in the case where the unevenness in the light distribution of the captured image due to variations in the external light is corrected.

In FIG. 10C, the brightness gradient characteristics within the captured image data are planarized by the brightness correction means 53 so that the differences in brightness of the lines written in the same color may be corrected and the captured image data may be corrected and converted into image data having distinct color shades.

Figure 11:
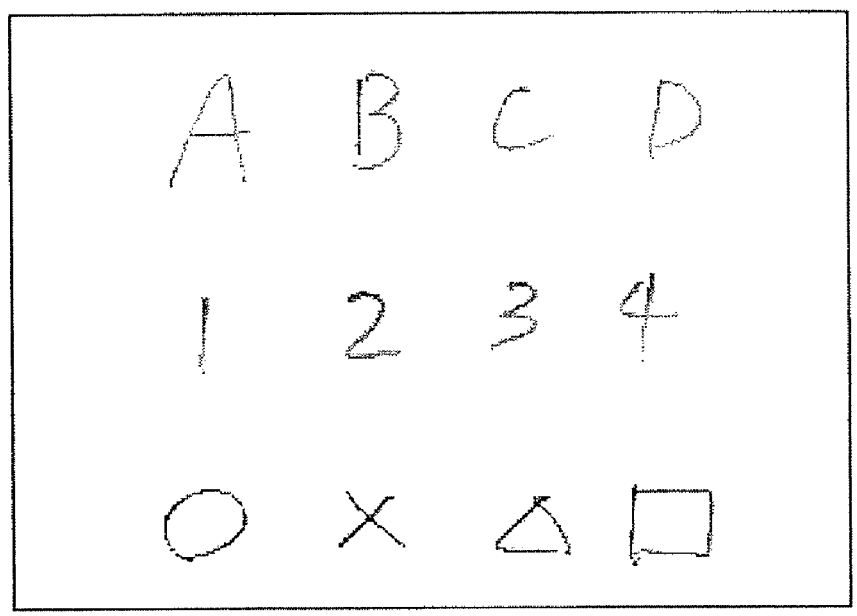
FIG. 11 is a diagram illustrating exemplary brightness-corrected image data obtained by a shading correction unit of the image display apparatus according to the first embodiment.

FIG. 11 is a diagram illustrating brightness-corrected image data having distinct color shades obtained by the shading correction unit 222 of the image display apparatus according to the first embodiment.

According to the present embodiment, a high-quality image as is shown in FIG. 11 may be obtained that is free of external light influences from which a written image may be accurately extracted.

It is noted that the blank image used by the brightness correction means 53 may be automatically captured by the image display apparatus upon its activation, or the blank image may be captured at a given time by the image display apparatus user, for example.

The shading correction unit 2222 has noise removal means 54 for performing a clipping process on the brightness-corrected image obtained by the brightness correction means 53 to remove noise of the background image area corresponding to image portions of the corrected image other than the written image area including the written characters and figures.

It is noted that the background image area of the captured image data corresponding to image portions other than the written image area including the written characters and figures is removed by the background removal means 52 as is described above, and noise such as shadows are also removed by the background removal means 52.

However, since the captured image data that is subject to background area removal by the background removal means 52 may have an uneven light distribution caused by external light influences, in some cases, noise may still remain in the image data even after the removal process by the background removal means 52 is performed.

Accordingly, the noise removal means 54 is used to remove noise that may be remaining in the brightness-corrected image obtained by the brightness correction means 53.

The noise removal means 54 performs a clipping process on a target pixel based on a noise removal threshold value that is set in accordance with external light conditions to remove noise within the background image area corresponding to image portions of the brightness-corrected image other than the written image area including the written characters and figures in a manner similar to the clipping process performed by the background removal means 52.

The noise removal threshold value used in the clipping process by the noise removal means 54 may be set based on the external light value detected by the external light value detecting unit 221; namely, the noise removal threshold value may be set high when the background is bright (i.e., when the external light value is greater than a predetermined threshold value) and the threshold value may be set low when the background is dark (i.e., when the external light value is less than a predetermined threshold value). In one preferred embodiment, the noise removal threshold value may be within a value range of 225-235 when the background is bright (i.e., when the external light value is greater than a predetermined threshold value), and the threshold value may be within a value range of 220-230 when the background is dark (i.e., when the external light value is less than a predetermined threshold value).

The noise removal means 54 performs a clipping process according to formulae (1) and (2) described above by comparing a pixel value of a target pixel with the corresponding noise removal threshold value and replacing the pixel value of the target pixel with the pixel value of a white pixel (255, 255, 255) when the pixel value of the target pixel is greater than the noise removal threshold value.

Also, the shading correction unit 2222 has outline correcting means 55 for performing outline correction on written lines of the characters and figures included in the noise-removed image obtained by the noise removal means 54.

The outline correction means 55 performs a smoothing process that involves detecting bumps or indentations in the pixel arrangement within the subject image data, adding a pixel to fill in a detected indentation of one pixel, and removing a pixel to remove a detected bump of one pixel, for example.

As can be appreciated from the above descriptions, in the present embodiment, noise that has not been removed by the background removal means 52 may be removed in the noise removal process performed on the brightness-corrected image by the noise removal means 54. Then, the outlines of the written characters and figures may be made more distinct by the outline correction process performed on the noise-removed image by the outline correction means 55.

The color conversion unit 2223 has averaging means 56 that uses an averaging filter to calculate an average density value of each color component (RGB component) for the pixels of the corrected image obtained by the shading correction unit 2222 (i.e., corrected image resulting from performing brightness correction, noise removal and outline correction on the captured image data). It is noted that the average density value calculation process performed by the averaging means 56 may be similar to the average density value calculation process performed by the background removal means 52 of the background removal unit 2221.

Also, the color conversion unit 2223 has color distinction means 57 for distinguishing the color of the written lines of the characters and figures included in the averaging-processed image obtained based on a relevant color distinction threshold value to thereby divide the image into a written image area including characters and figures and a background image area by dividing the image into a representative color image portion and a white portion, for example.

In the present embodiment, the color distinction threshold value may be set based on the external light value detected by the external light value detection means 51.

It is noted that image data of the writing screen 11b may be captured using external light, and the image display apparatus according to the present embodiment may normally be used in a conference, for example, where the lights in a room are turned on. In such a case, the background area corresponding to the image portions other than the written image area including the written characters and figures of the captured image data captured by the written image capturing unit 21 may be white or close to white so that the RGB values of color components of the background area may be relatively large.

Thus, based on the relative relationship between the R, G, and B color components, red, blue, and black color component information may be extracted and the remaining color components may be regarded as the background area. In this way, information of written characters and figures may be extracted.

Figure 12:
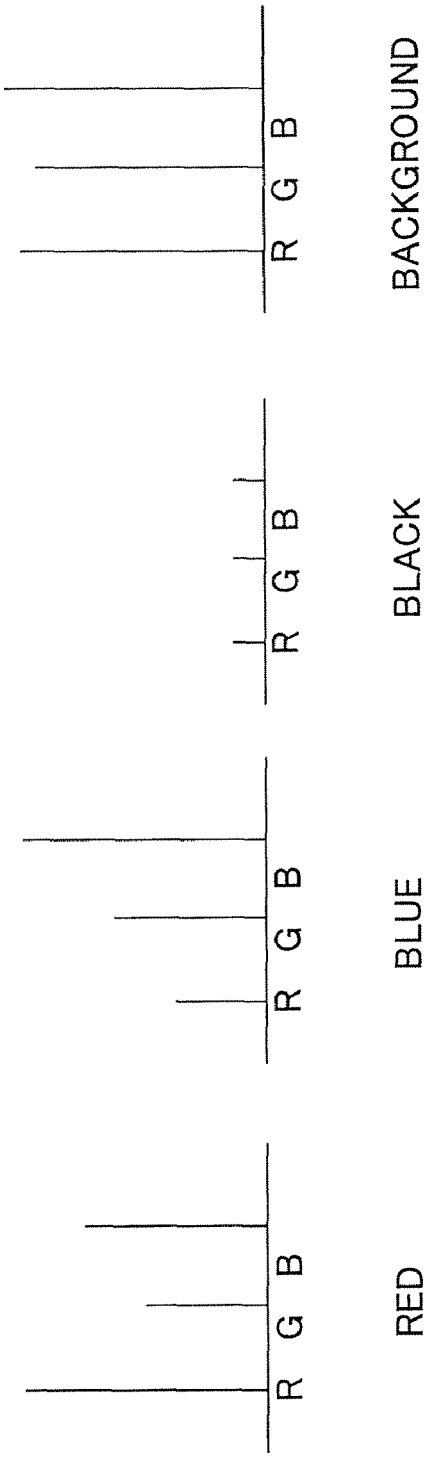
FIG. 12 is a diagram illustrating a relationship between the average color component (RGB component) characteristics of a red writing, a blue writing, a black writing, and a background.

FIG. 12 illustrates an exemplary relationship between average color components (RGB component) of "red writing", "blue writing", "black writing", and "background" of an image according to the first embodiment.

According to the illustrated example of FIG. 12, in the color distinction process, a pixel of the corrected image having RGB values satisfying the relationship R>B>G is identified as a red pixel, and a pixel satisfying the relationship B>G>R is identified as a blue pixel. In this way, information of characters and figures written with a red or blue marker may be extracted. Also, according to the present example, the three values representing the R, G, and B color components of a black pixel are all below a predetermined value so that a pixel having RGB values below a predetermined threshold value may be identified as a black pixel and characters. In this way, information of characters and figures written with a black marker may be extracted. According to the present example, information written with markers in three different colors may be identified and extracted.

Thus, the color distinction means 57 may distinguish a "red writing", a "blue writing", a "black writing", and a "background" based on corresponding color distinction threshold values.

The color distinction threshold values used in the color distinction process include a threshold value for distinguishing red, a threshold value for distinguishing blue, and a threshold value for distinguishing black that are determined based on the external light value detected by the external light detecting unit 221.

The threshold value for distinguishing blue may normally be within a value range of 150-190 under external light conditions in a normal usage environment for the image display apparatus. On the other hand, the threshold value for distinguishing blue may be within a value range of 160-200 when the background of the processing image is relatively dark (i.e., when the external light value is less than a predetermined threshold value).

The threshold value for distinguishing red may normally be within a value range of 180-200 under external light conditions of a normal usage environment for the image display apparatus.

The threshold value for distinguishing black is compared with a value representing the difference between the largest value and the smallest value of the three RGB color component values and may be set within a value range of 15-30 under normal external light conditions of a normal usage environment of the image display apparatus.

The color distinction means 57 distinguishes the color of a target pixel based on the color distinction threshold values that are set according to variations in the external light conditions and converts the pixel value of the target pixel to RGB (255, 0, 0) in the case where the target pixel is identified as red, RGB (0, 0, 255) in the case where the target pixel is identified as blue, and RGB (0, 0, 0) in the case where the target pixel is identified as black, for example.

Also, the color conversion unit 2223 has color distinction correction means 58 for calculating a rate at which the pixel values of predetermined pixels including a target pixel and its neighboring pixels represent black in a corrected image processed by the shading correction unit 2222, and replacing (converting) the pixel value of the target pixel with a pixel value of black (0, 0, 0) or a pixel value obtained from the color conversion process by the color distinction means 57 based on the calculated rate, and reflecting the color conversion in the corrected image.

The rate at which the pixel values represent black may be calculated by counting the number of pixels having a pixel value other than white (255, 255, 255) and the number of pixels having the pixel value of black (0, 0, 0) of the predetermined pixels including the target pixel and its neighboring pixels, and obtaining a ratio between the counted numbers to thereby calculate the rate at which neighboring pixels of the target pixel having pixel values other than white have the pixel value of black.

Figure 13:
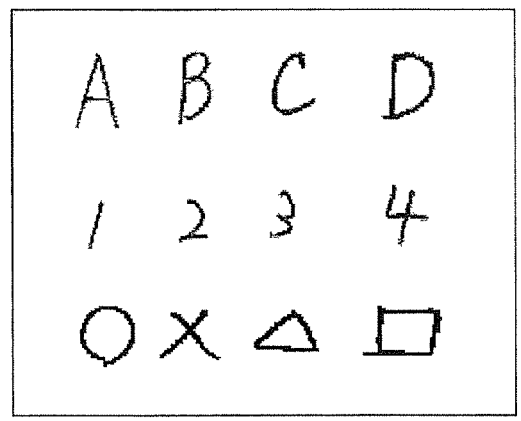
FIG. 13 is a diagram illustrating exemplary color-converted image data obtained by a color conversion unit of the image display apparatus according to the first embodiment.

FIG. 13 is a diagram illustrating exemplary image data having distinct color shades obtained by the color conversion process performed by the color conversion unit 2223 of the image display apparatus according to the first embodiment.

As is shown in FIG. 13, in the present embodiment, color conversion may be performed on the lines of written characters and figures without receiving influence of external light conditions, and distinct lines may be obtained for enabling accurate extraction of a written image, for example.

Figure 14:
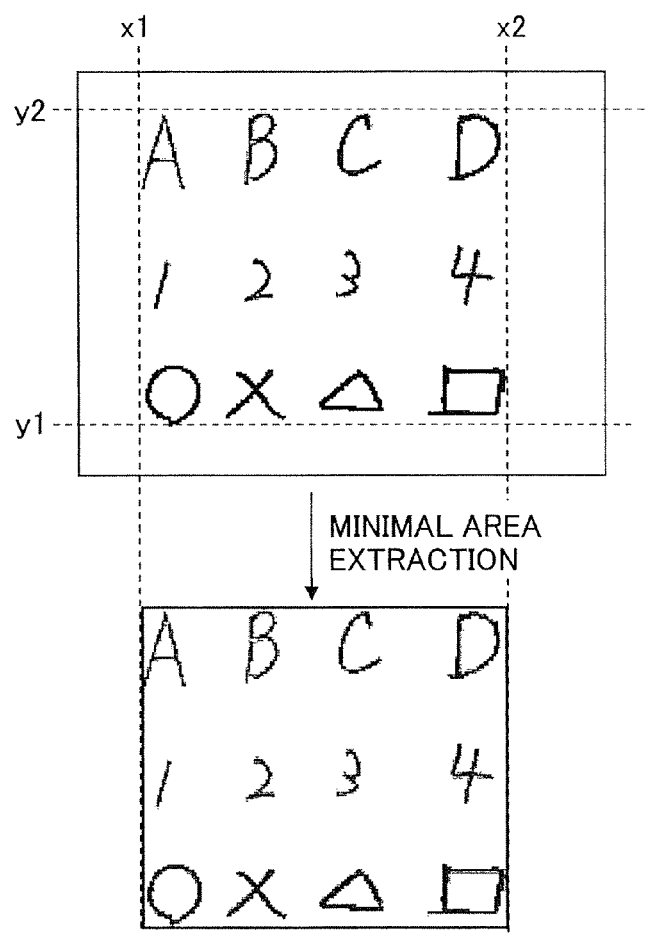
FIG. 14 is a diagram illustrating a process of extracting a minimal area of a written image by a minimal area extracting unit of the image display apparatus according to the first embodiment.

FIG. 14 is a diagram illustrating a process of extracting a written image area by the minimal area extracting unit 223 of the image display apparatus according to the first embodiment.

As is shown in this drawing, the size of the captured image data captured by the written image capturing unit 21 corresponds to the image size of the CCD camera 14, and the minimal area extracting unit 223 extracts a minimal area containing the written characters and figures.

For example, in a corrected image obtained by the correction processes performed by the shading correction unit 2222 and the color conversion unit 2223, pixels other than those corresponding to the written characters and figures are converted into white pixels. In such a case, raster scanning may be performed in a downward direction from an upper left hand side of the corrected image to determine a position x1 at which a pixel in a color other than white is first identified; raster scanning may be performed in a downward direction from the upper right hand side of the corrected image to determine a position x2 at which a pixel in a color other than white is first identified; raster scanning in the rightward direction may be performed from the upper left hand side of the corrected image to determine a position y1 at which a pixel in a color other than white is first identified; and raster scanning may be performed in the rightward direction from the lower left hand side of the corrected image to determine a position y2 at which a pixel in a color other than white is first identified.

By extracting a rectangular area with the coordinate positions (x1, y1) and (x2, y2) as the upper left hand side apex and the lower right hand side apex, a written area may be extracted according to the positions at which characters and figures are written within the writing screen 11*b*, for example.

It is noted that such a written image may subsequently be composited with a projection image generated by the projection image generating unit 24 by the image compositing unit 23.

According to an aspect of the present embodiment, image processes performed at an image display apparatus for extracting a written image may be controlled according to an external light detection value which may vary depending on the usage environment of the image display apparatus.

Thus, a written image may be accurately extracted without being influenced by external light conditions that may vary depending on the usage environment of the image display apparatus, and information of written characters and figures may be converted into electronic information.

In the following, process steps performed by the units of the written image area extracting unit 22 are described with reference to FIGS. 15-33.

FIG. 15 is a graph illustrating the brightness distribution of external light detected by the external light detection unit 221 of the image display apparatus according to the first embodiment.

The external light value detection unit 221 uses the external light value detection means 51 to calculate the brightness distribution (e.g., brightness distribution of the G component of the RGB color components) as is shown in FIG. 15 based on the blank image that is captured beforehand by the written image capturing unit 21. Then, based on the calculated brightness distribution, the external light value detection means 51 detects the peak brightness corresponding to the most frequently occurring brightness value as the external light value.

FIG. 16 is a flowchart illustrating a computation control process performed by the image processing unit 222 according to variations in external light conditions under which the image display apparatus according to the present invention is used.

In the following, process steps are described for controlling the computation processes performed by the functional units of the image processing unit 222 based on the external light value detected by the external light value detection unit 221.

The written image area extracting unit 22 uses the external light value detection means 51 of the external light value detection unit 221 to detect the external light value representing the external light conditions under the current usage environment of the image display apparatus based on the brightness distribution of the blank image captured beforehand by the written image capturing unit 21 (S11).

Then, based on the detected external light value, the background removal means 52 of the background removal unit 2221 of the image processing unit 222 sets a computation range on which an averaging filter for background removal is to be applied (S12).

Then, based on the detected external value, the noise removal means 54 of the shading correction unit 2222 of the image processing unit 222 sets a noise removal threshold value based on which a noise removal process is to be performed (S13).

Then, based on the detected external value, the color distinction means 57 of the color conversion unit 2223 of the image processing unit 222 sets a color distinction threshold value based on which a color distinction process is to be performed (S14).

Then, the background removal means 52 of the background removal unit 2221 performs the background removal process using the set computation range for background removal (S15).

Then, the noise removal means 54 of the shading correction unit 2222 performs the noise removal process based on the set noise removal threshold value (S16).

Then, the color distinction means 57 of the color conversion unit 2223 performs the color distinction process based on the set color distinction threshold value (S17).

As can be appreciated from the above descriptions, the computation processes performed by the functional units of the image processing unit 222 (e.g., background removal unit 2221, shading correction unit 2222, and color conversion unit 2223) may be controlled based on the external light value detected by the external light detection means 51 of the external light detection unit 221.

FIG. 17 is a flowchart illustrating process steps performed by the external light detection means 51 of the external light detection unit 221 of the image display apparatus according to the first embodiment.

According to FIG. 17, the external light detection means 51 secures a memory area (hist[256]) for storing information on the occurrence count numbers of brightness values of the brightness distribution, and initializes the secured memory area (hist[256]={0, . . . , 0}) (S1101).

Then, the external light detection means 51 starts pixel scanning in raster order and obtains a G value (g(i, j)) representing the G component density value of a scanned pixel of a blank image (S1102). It is noted that since a G component brightness value may be no different from a Y component value that is calculated by performing color conversion using the G component value and an RGB value, G component values of pixels are used in the present example in order to reduce the processing speed.

Based on the obtained G value (g(i, j)), the external light detection means 51 counts up the occurrence number of a corresponding brightness value (hist[(g(i, j))]++) within the brightness distribution (hist[256]) (S1103), and moves on to pixel scanning of a next pixel (S1104).

During the pixel scanning process, a determination is made as to whether a currently scanned pixel corresponds to a last pixel for pixel scanning according to the raster order (S1105), and this determination step is repeated (S1105, No) until the last pixel is scanned.

When it is determined that the currently scanned pixel corresponds to the last pixel (S1105, Yes), a variable (peak_kido) for holding the most frequently occurring brightness value (peak brightness value) within the brightness distribution and a variable (cnt) for holding the greatest occurrence number are initialized (peak_kido=0, cnt=0) (S1106).

Then, an occurrence number (hist[kido]) of a given brightness value (kido) within the brightness distribution is searched and a determination is made as to whether the occurrence number (hist[kido]) of the given brightness value (kido) is the greatest occurrence number so far (S1107).

If the occurrence number (hist[kido]) of the given brightness value (kido) is presently the greatest occurrence number (S1107, Yes), the value of the variable (peak_kido) for holding the most frequently occurring brightness value is substituted by the given brightness value (peak_kido=kido) and the variable for holding the greatest occurrence number (cnt) is substituted by the occurrence number (hist[kido]) of the given brightness value (cnt=hist[kido]) (S1108).

Then, the process moves on to searching and obtaining the occurrence number of a next brightness value (kido++) (S1109).

On the other hand, if the occurrence number (hist[kido]) obtained for the given brightness value (kido) is less than the currently set greatest occurrence number (hist[kido]<cnt; S1107, No), the process simply moves on to searching the next brightness value (S1109) without substituting the values of the variables.

In moving on to the next brightness value, a determination is made as to whether this next brightness value to be searched corresponds to the last brightness value within the density level range of the brightness distribution (S1110), and the searching of a brightness value is repeated (S1110, Yes) until reaching the last brightness value.

The present process is ended when searching of the last brightness value within the density level range is complete (S1110, No).

In this case, the last substituted brightness value (kido) that is substituted as the variable (peak_kido) for holding the most frequently occurring brightness value within the brightness distribution range at this point corresponds to the peak brightness value to be used as the external light value for controlling subsequent computation processes of the image processing unit 222.

Figure 18B:
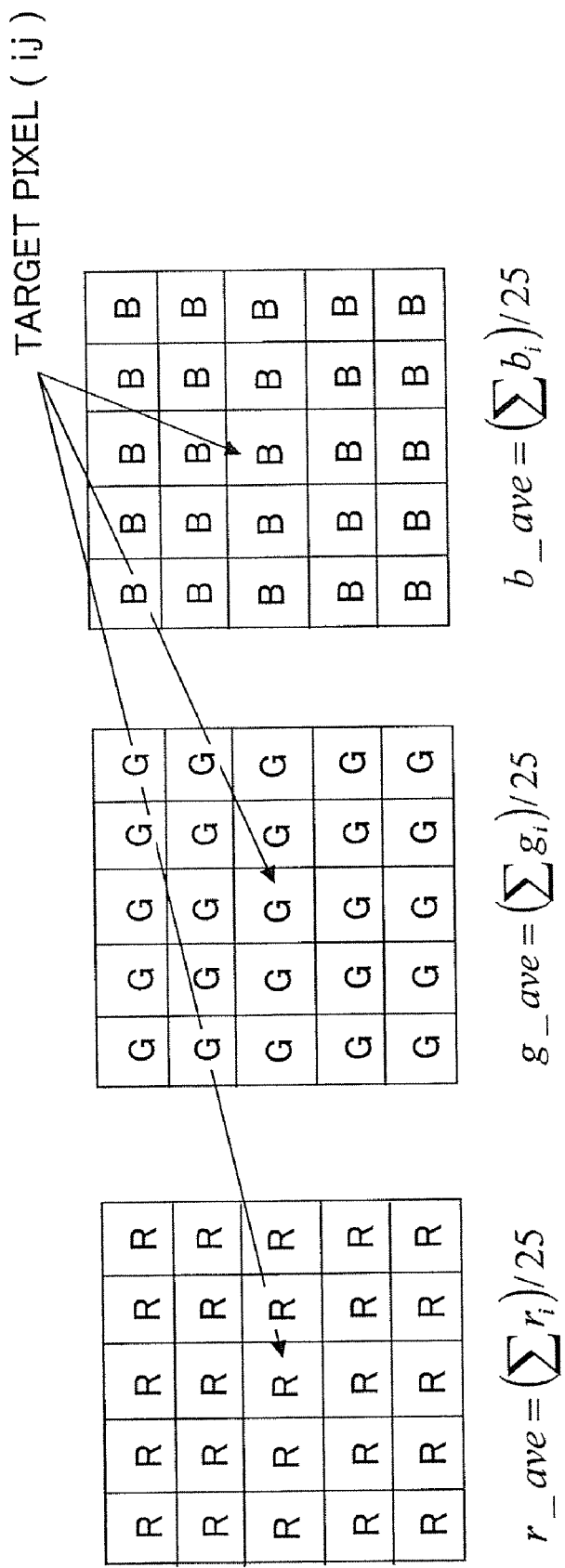
FIG. 18B is a diagram illustrating a background removal process performed on a computation range of 5×5 pixels by the background removal unit using an averaging filter.

FIGS. 18A and 18B are diagrams illustrating background removal methods implemented by the background removal unit 2221 of the image processing unit 222 using an averaging filter. Specifically, FIG. 18A illustrates a case in which the computation range is arranged to be a 3×3 pixel area, and FIG. 18B illustrates a case in which the computation range is arranged to be a 5×5 pixel area.

The background removal unit 2221 uses the background removal means 52 to set the computation range for background removal on which the averaging filter is to be applied based on the external light value detected by the external light value detection means 51 of the external light value detecting unit 221. Specifically, the background removal means 52 determines the number of pixels (m) arranged along one side of a computation range of m×m pixels.

In one example, the computation range for background removal may be set based on the external light value in the manner described below. The computation range for background removal may be arranged to be relatively small (e.g., the number of pixels arranged on one side of the computation range may be set to m=3 as is shown in FIG. 18A) when the background is relatively bright (e.g., when the external light value is above a predetermined threshold value) and the computation range for background removal may be arranged to be relatively large (the number of pixels arranged on one side of the computation range may be set to m=5 as is shown in FIG. 18B) when the background is relatively dark (e.g., when the external light value is below a predetermined threshold value). In one aspect, the computation range for background removal is preferably set within a suitable range for enabling calculation of a color component threshold value for accurately removing a background area while leaving behind the line images of written characters and figures, and when the background is bright (when the external light value is above a predetermined threshold value), the number of pixels arranged along one side of the computation range may be reduced compared to the number of pixels set for the computation range when the background is dark (when the external light value is below a predetermined threshold value).

As is shown in FIGS. 18A and 18B, average density values r_ave, g_ave, and b_ave are calculated using corresponding averaging filters for R, G, and B color components from the computation range of m×m pixels for background removal that is set based on the external light value detected by the external light detection unit 221, and the calculated average density values r_ave, g_ave, and b_ave are used as threshold values upon performing a clipping process.

Thus, when the density value r of a target pixel (i, j) is greater than the threshold value r_ave (r>r_ave), the density value g of the target pixel (i, j) is greater than the threshold value g_ave, and the density value b of the target pixel (i, j) is greater than the threshold value b_ave, the background removal means 52 determines that the target pixel (i, j) belongs to a background, shadow, or noise area and replaces the pixel value of the target pixel (i, j) with that of a white pixel (255, 255, 255). In the present example, the background removal means 52 calculates the average density values of all color components of the RGB components using corresponding averaging filters in consideration of the fact that in some cases characters and figures written by markers may not easily be identified based on their green color component values, for example. Then, the background removal means 52 compares color density values of a target pixel with corresponding color component threshold values to determine a background area and an area in which characters and figures are written based on the overall comparison results.

FIG. 19 is a flowchart illustrating process steps performed by the background removal unit 2221 of the image processing unit 222 for controlling a computation range for an averaging filter according to variations in external light conditions.

According to FIG. 19, the background removal means 52 of the background removal unit 2221 acquires the external light value (peak brightness: peak_kido) detected by the external light detection means 51 of the external light detection unit 2221 (S1201).

Then, the background removal means determines whether the acquired external light value (peak_kido) is greater than a predetermined threshold value (th_bg) (S1202).

If the external light value is greater than the predetermined threshold value (S1202, Yes), the number of pixels m on one side of the computation range of m×m pixels for the averaging filter is set to be within a value range of 3-9 (filtsize1) for setting the size of the computation range to a small size (m=filtsize1) (S1203).

On the other hand, if the external light value is less than or equal to the predetermined threshold value (S1202, No), the number of pixels m of one side of the computation range of m×m pixels for the averaging filter is set to be within a value range of 5-15 (filtsize2) for setting the computation range to a large size (m=filtsize2) (S1204).

It is noted that in this case, the values of "filtsize1" and "filtsize2" satisfy the following relationship: filtsize1<filtsize2.

In this way, the background removal means 52 of the background removal unit 2221 may set a suitable value for the number of pixels m of a side of the computational range of m×m pixels on which an averaging filter is to be applied based on the external light value detected by the external light detection means of the external light detection unit 221 so that background removal may be adequately performed in consideration of variations in external light conditions.

Figure 20A:
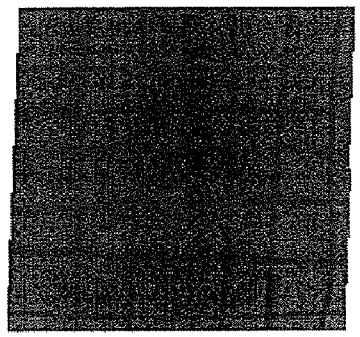
FIG. 20A is a diagram illustrating exemplary captured image data before a background removal process is performed by the background removal unit.
Figure 20B:
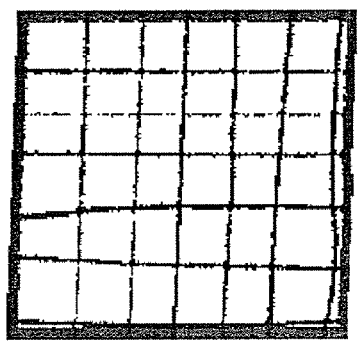
FIG. 20B is a diagram illustrating exemplary image data resulting from performing a background removal process according to the prior art.
Figure 20C:
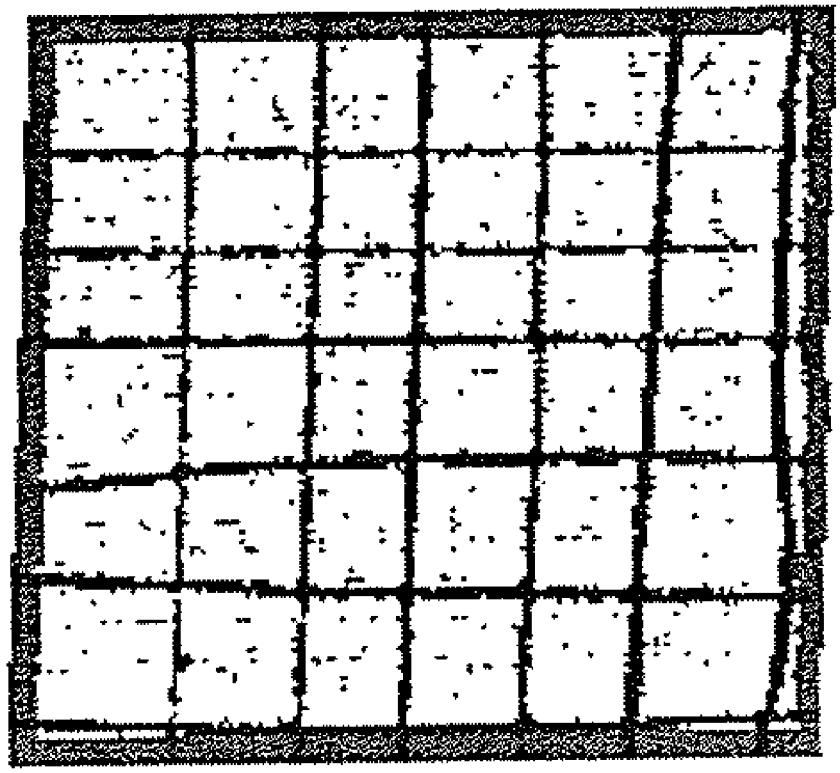
FIG. 20C is a diagram illustrating exemplary image data resulting from performing a background removal process according to an embodiment of the present invention.

FIG. 20A is a diagram illustrating exemplary image data before a background removal process is performed by the background removal unit 2221 of the image processing unit 222. FIGS. 20B and 20C illustrate exemplary image data obtained from a background removal process performed by the background removal unit 2221 of the image processing unit 222. Specifically, FIG. 20B illustrates image data obtained in a case where background removal is performed without considering the external light value as in the prior art, and FIG. 20C illustrates image data obtained in a case where the external light value is considered in performing the background removal process according to an embodiment of the present invention.

As can be appreciated by comparing FIGS. 20B and 20C, in the image data obtained by performing background removal according to the present invention, the written line images of the written characters and figures are clearer compared to the image data obtained by performing background removal according to the conventional art. It can also be appreciated that more noise remains in the image data of FIG. 20C compared to the image data of FIG. 20B. Accordingly, in the present embodiment, noise is removed from the image data of FIG. 20C by the noise removal means 54 of the shading correction unit 2222 as is described below.

Figure 21:
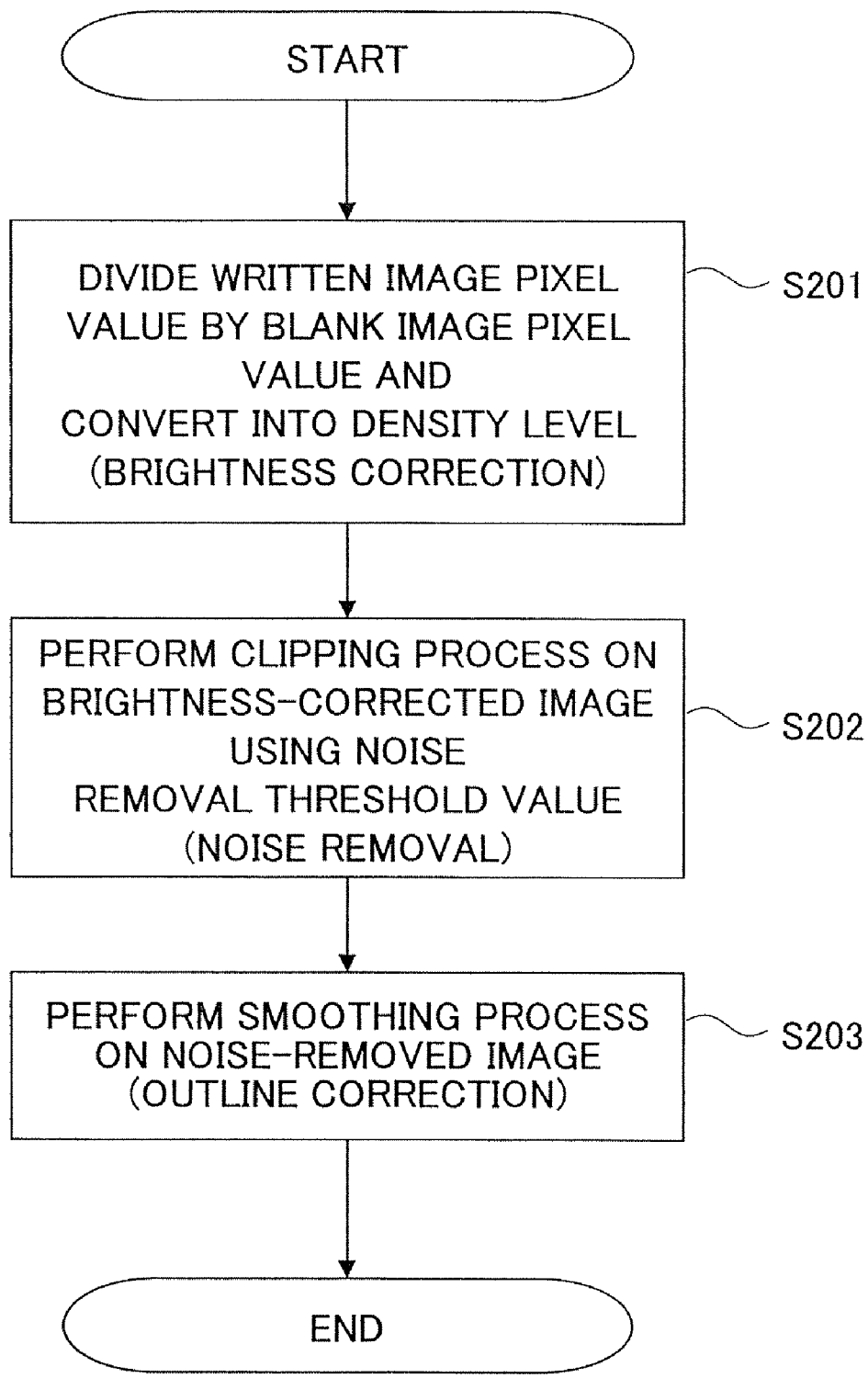
FIG. 21 is a flowchart illustrating process steps performed by the shading correction unit of the image display apparatus according to the first embodiment.

FIG. 21 is a flowchart illustrating process steps performed by the shading correction unit 2222 of the image processing unit 222.

According to FIG. 21, the shading correction unit 2222 of the image processing unit 222 uses the brightness correction means 53 to perform brightness correction by dividing a pixel value of a pixel within captured image data of a written image by a pixel value of a corresponding pixel within a blank image and converting the pixel value of the pixel within the captured image data into a density level (e.g., within a value range of 0-255 for indicating 256 different brightness levels) that is represented by the pixel (S201).

Then, the noise removal means 54 removes noise from a background area corresponding to an image area other than the written image area containing written characters and figures of the brightness-corrected image by performing a clipping process on a target pixel based on the noise removal threshold value that is set according to external light conditions (S202).

Then, the outline correction means 55 performs a smoothing process for correcting the outlines of the written characters and figures by detecting bumps and indentations in the arrangement of pixels within the noise-removed image data and adding/removing a pixel in accordance with the detected indentations and bumps. Specifically, if an indentation of one pixel is detected, a pixel may be added to fill such an indentation; and if a bump of one pixel is detected, the corresponding pixel may be removed, for example (S203).

As can be appreciated from the above descriptions, the shading correction unit 2222 may perform brightness correction using the brightness correction means 53 to planarize the brightness gradient characteristics of a captured image. Also, the shading correction unit 2222 may use the noise removal means 54 to perform noise removal on the brightness-corrected image to remove noise that has not been removed by the background removal process performed by the background removal means 52. Further, the shading correction unit 2222 may use the outline correction means 55 to perform outline correction on the noise-removed image to make the outlines of the written characters and figures more distinct.

FIG. 22 is a flowchart illustrating process steps for changing the noise removal threshold value according to external light conditions by the shading correction unit 2222 of the image processing unit 222.

According to FIG. 22, the noise removal means 54 of the shading correction unit 2222 acquires the external light value (peak brightness: peak_kido) detected by the external light detection means 51 of the external light detection unit 221 (S1301).

Then, the noise removal means 54 determines whether the acquired external light value is greater than a predetermined threshold value (th_sh) (S1302).

If the external light value is greater than the predetermined threshold value (th_sh) (S1302, Yes), the noise removal threshold value (th_shade) is set to a relatively large value within a range of 225-235 (th_shade1) (S1303).

On the other hand, if the external light value is less than the predetermined threshold value (th_sh) (S1302, No), the noise removal threshold value (th_shade) is set to a relatively small value within a range of 220-230 (th_shade2) (S1304).

It is noted that in the present example, the threshold values th_shade1 and th_shade2 are arranged to satisfy the following relationship: th_shade1>th_shade2.

By implementing the process steps according to the present example, the noise removal means 54 of the shading correction unit 2222 may set the noise removal threshold value to a suitable value based on the external light value detected by the external light value detection means 51 of the external light value detection unit 221 to adequately perform noise removal in accordance with variations in external light conditions, for example.

Figure 23A:
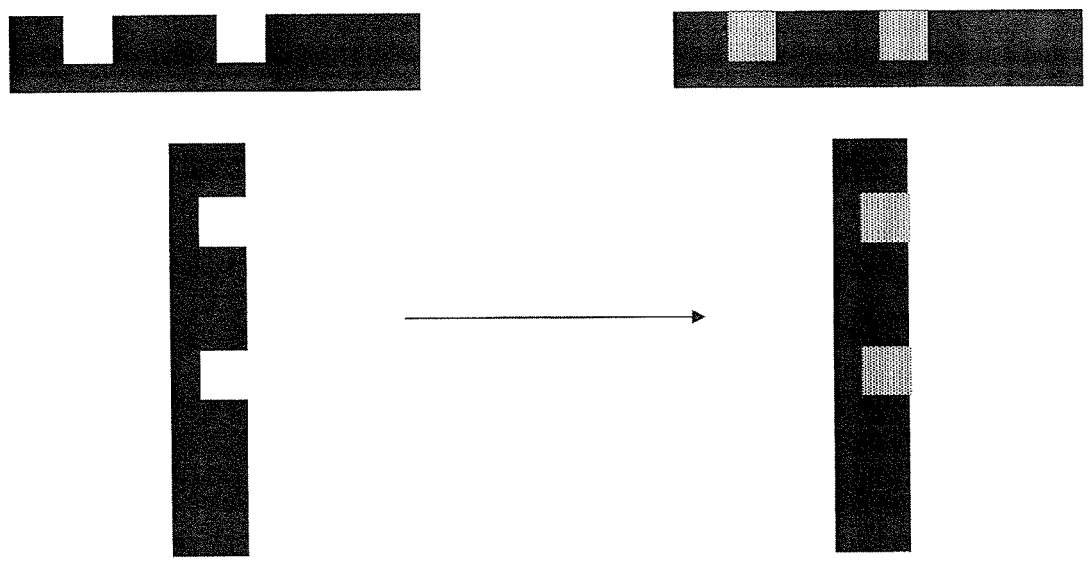
FIG. 23A is a diagram illustrating an outline correction process performed by the shading correction unit for correcting the outline of a written line having indentations.
Figure 23B:
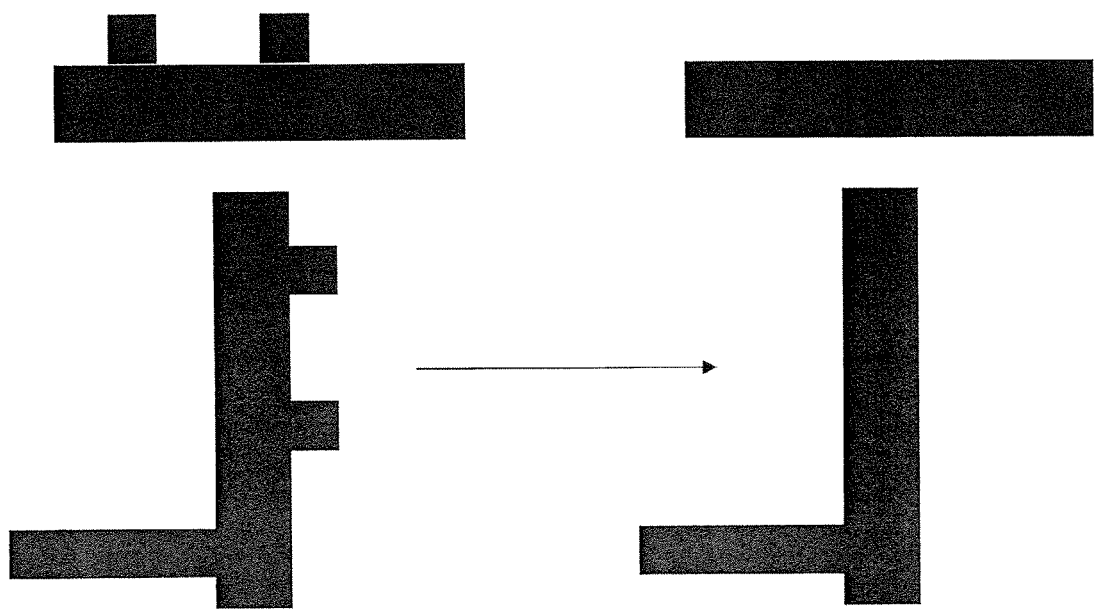
FIG. 23B is a diagram illustrating an outline correction process performed by the shading correction unit for correcting the outline of a written line having bumps.

FIGS. 23A and 23B are diagrams illustrating exemplary outline correction processes (smoothing processes) performed by the shading correction unit 2222 of the image processing unit 222. Specifically, FIG. 23A illustrates an outline correction process for filling an indentation of one pixel, and FIG. 23B illustrates an outline correction process for removing a bump of one pixel.

As is shown in FIG. 23A, when a target pixel of a noise-removed image is white (255, 255, 255) while the adjacent pixels on the right side and left side of the target pixel are not white, or when the target pixel is white while the upper and lower adjacent pixels of the target pixel are not white, the outline correction means 55 of the shading correction unit 2222 determines that the target pixel corresponds to an indentation of a written line of a written character or figure, and replaces the value of the target pixel with the average density value of its adjacent pixels to correct the outline of the written line.

As is shown in FIG. 23B, when a target pixel of a noise-removed image is not white while the adjacent pixels on the right side and left side of the target pixel are white; if the upper side, the upper right side, and the upper left side of the target pixel are not white while the lower side of the target pixel is white; or if the lower side, lower right side, and the lower left side of the target pixel is not white while the upper side of the target pixel is white; the outline correction means 55 of the shading correction unit 2222 determines that the target pixel corresponds to a bump on a written line of a written character or figure and replaces the value of the target pixel with the average density value of the left and right adjacent pixels of the target pixel to correct the outline of the written line image.

Also, when the target pixel is not white while both the upper and lower adjacent pixels of the target pixel are white; if the right side, the upper right side, and the lower right side of the target pixel are not white while the left side of the target pixel is white; or if the left side, the upper left side, and the lower left side of the target pixel is not white while the right side of the target pixel is white, the outline correction means 55 of the shading correction unit 2222 determines that the target pixel corresponds to a bump on a written line of a written character or figure and replaces the value of the target pixel with the average density value of its upper and lower adjacent pixels to correct the outline of the written line.

Figure 24:
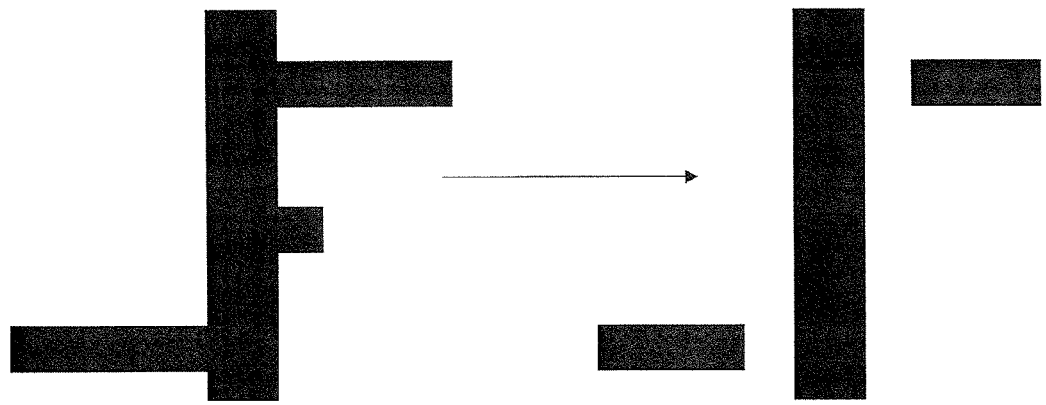
FIG. 24 a diagram illustrating an outline correction process that results in the formation of cracks in the outline-corrected image due to unnecessary removal of a pixel.

FIG. 24 is a diagram illustrating another exemplary process for correcting the outline of a written line by the shading correction unit 2222 of the image processing unit 222 in which a crack is created as a result of removing a pixel.

As is described above, in the example of FIG. 23B, after determining that a target pixel may possibly correspond to a bump (bump candidate) of a written line by referring to its adjacent pixels, a determination is made as to whether pixels at the opposite side of the outline of the written line are white in order to avoid formation of a crack as is described in FIG. 24 where a target pixel corresponding to a pixel of a written line with a line width of one pixel is mistakenly assumed to be a bump and replaced with a white pixel.

Figure 25A:
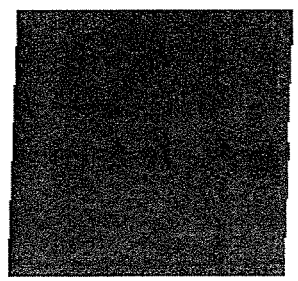
FIG. 25A is a diagram illustrating exemplary captured image data before image correction processes are performed by the shading correction unit of the image display apparatus according to the first embodiment.

FIG. 25A is a diagram illustrating exemplary captured image data before image correction by the shading correction unit 2222 of the image processing unit 222 is performed.

Figure 25B:
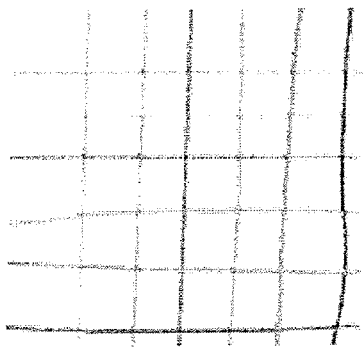
FIG. 25B is a diagram illustrating exemplary corrected image data that are obtained by performing image correction processes according to the prior art.
Figure 25C:
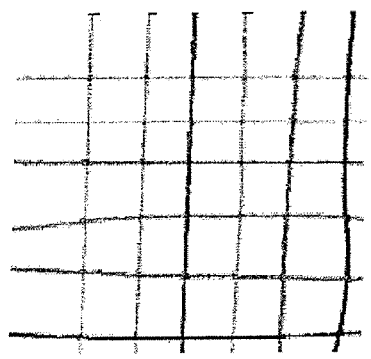
FIG. 25C is a diagram illustrating exemplary corrected image data that are obtained by performing image correction processes by the shading correction unit of the image display apparatus according to the first embodiment.

FIGS. 25B and 25C are diagrams illustrating exemplary corrected image data resulting from performing image correction processes on the image data shown in FIG. 25A. Specifically, FIG. 25B illustrates image data obtained by performing image correction according to the prior art that does not take into account the external light value, and FIG. 25C illustrates image data obtained by performing image correction according to an embodiment of the present invention taking into account the external light value.

As can be appreciated from these drawings, in the image data of FIG. 25C obtained through image correction according to an embodiment of the present invention, discontinuities and roughened portions of written lines are reduced compared to the image data of FIG. 25B obtained through image correction according to the prior art. Also, according to an embodiment of the present invention, noise still remaining in the image data even after background removal is performed by the background removal means 52 of the background removal unit 2221 may be removed by the noise removal means 54 of the shading correction unit 2222. In this way, a high quality image as is shown in FIG. 11 that is not influenced by external light conditions may be obtained for extracting a written image.

Figure 26:
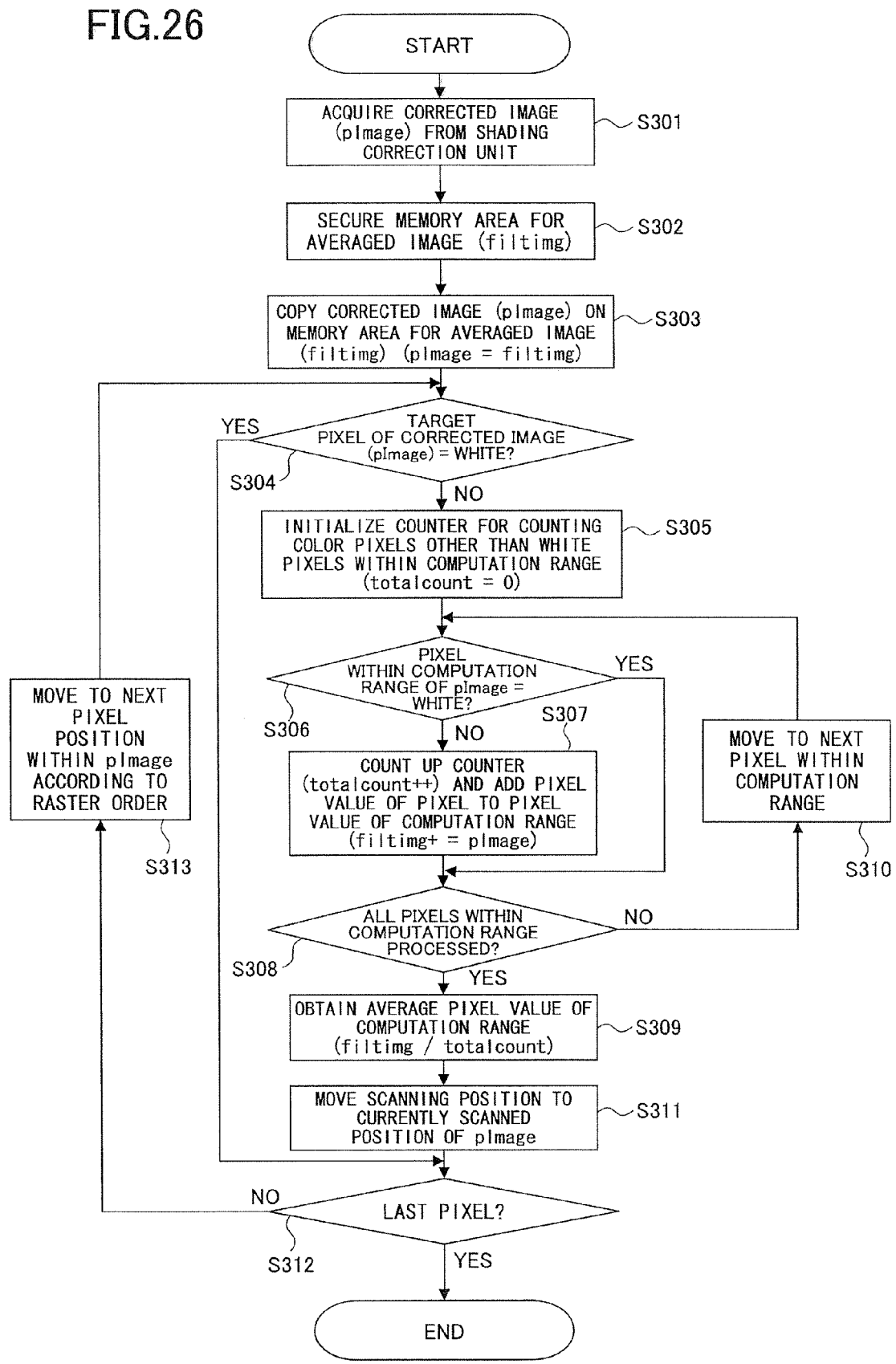
FIG. 26 is a flowchart illustrating process steps of an averaging process performed by the color conversion unit of the image display apparatus according to the first embodiment.

FIG. 26 is a flowchart illustrating process steps performed by the averaging means 56 of the color conversion unit 2223 of the image processing unit 222.

The averaging means 56 of the color conversion unit 2223 acquires the corrected image (pImage) that is corrected by the shading correction unit 2222 (S301), and secures a memory area for storing an averaged image (filtimg) (S302).

Then, the averaging means 56 copies the acquired corrected image (pImage) onto the memory area for the averaged image (filtimg) (filtimg=pImage) (S303).

Then, the averaging means 56 starts pixel scanning of the corrected image (pImage) to determine whether a currently scanned target pixel corresponds to a white pixel (S304).

When the currently scanned target pixel is not white (S304, No), a counter (totalcount) is initialized for counting the number of color pixels other than white pixels within a computation range including pixels surrounding the target pixel on which an averaging filter is to be applied (totalcount=0) (S305), and a determination is made as to whether a given pixel of the corrected image (pImage) within the computation range is a white pixel (S306).

On the other hand, when the currently scanned target pixel is white (S304, Yes), the subsequent process steps S305-S311 are not performed and the process moves on to step S312.

When a given pixel within the computation range is not white (S306, No), the pixel is determined to be a color pixel other than a white pixel, the counter is counted up (totalcount++), and the pixel value of the pixel is added to the pixel value of the computation range (filtimg+=pImage) (S307).

On the other hand, if a pixel within the computation range is a white pixel (S306, Yes), the process step S307 is not performed with respect to this pixel and the process moves on to step S308.

Then, a determination is made as to whether the determination process for determining whether a pixel is white has been performed on all the neighboring pixels of the target pixel within the computation range on which the averaging filter is to be applied (S308).

If the white/non-white pixel determination process has been performed on all the neighboring pixels within the computation range (S308, Yes), the total pixel value of the color pixels other than white pixels within the computation range is divided by the total number of color pixels other than white pixels to obtain an average pixel value of the color pixels (filtimg/totalcount) (S309).

On the other hand, if the white/non-white pixel determination process is not yet completed for all the pixels within the computation range (S308, No), the process moves on to a next pixel subject to computation within the computation range (S310).

After performing the averaging process, the pixel scanning position is returned to the position of the currently scanned target pixel (current position) (S311).

Then, a determination is made as to whether the current position corresponds to a last pixel subject to pixel scanning of the corrected image (pImage) (S312).

If the current position is not the last pixel subject to pixel scanning within the corrected image (pImage) (S312, No), the current position is moved to a next pixel position within the corrected image (pImage) according to the pixel scanning order (raster order) (S313).

If the current position corresponds to the last pixel subject to pixel scanning within the corrected image (pImage) (S312, Yes), the present process is ended.

Figure 27:
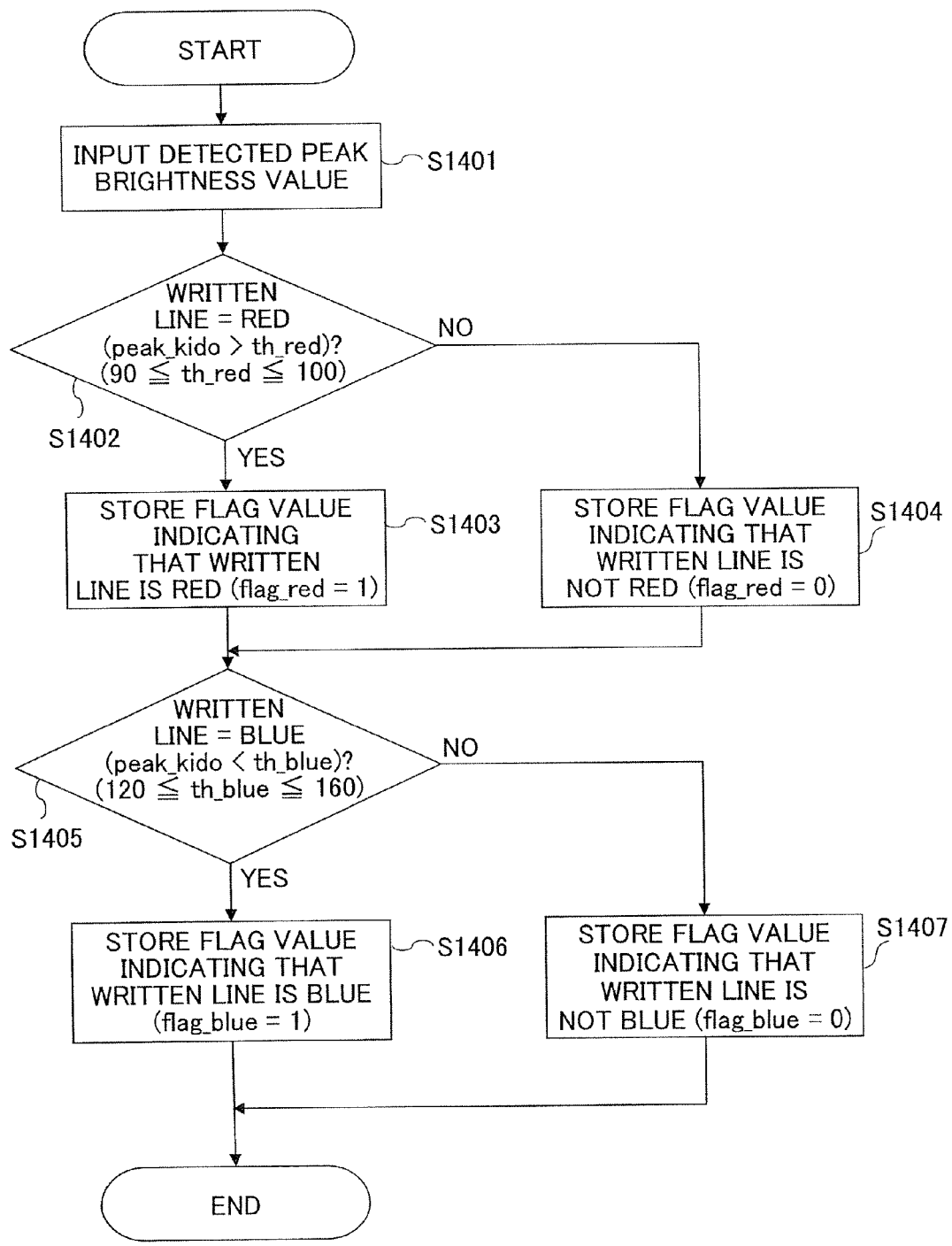
FIG. 27 is a flowchart illustrating process steps performed by the color conversion unit for adjustably setting color distinction parameters.

FIG. 27 is a flowchart illustrating process steps performed by the color conversion unit 2223 of the image processing unit 222 for adjustably setting color distinction parameters according to variations in external light conditions.

According to FIG. 27, the color distinction means 57 of the color conversion unit 2223 acquires the external light value (peak brightness: peak_kido) detected by the external light value detection means 51 of the external light detection unit 221 (S1401).

Then, the color distinction means 57 first determines whether a written line is red based on the acquired external light value and a red color distinction threshold value (th_red) that is not influenced by the external light value (peak_kido>th_red?) (S1402).

If the external light value is greater than the red color distinction threshold value (S1402, Yes), a flag (flag_red) for indicating that the written line is red is turned on (flag_red=1) (S1403).

If the external light value is less than the red color distinction threshold value (S1402, No), the flag (flag_red) for indicating that the written line is red is turned off (flag_red=0) (S1404).

Then, the color distinction means 57 determines whether a written line is blue based on the external light value and a blue color distinction threshold value (th_blue) that is not influenced by the external light value (peak_kido<th_blue?) (S1405).

If the external light value is less than the blue color distinction threshold value (S1405, Yes), a flag (flag_blue) for indicating that the written line is blue is turned on (flag_blue=1) (S1406).

If the external light value is greater than the blue color distinction threshold value (S1405, No), the flag (flag_blue) for indicating that the written line is blue is turned off (flag_blue=0) (S1407).

In this way, the color distinction means 57 of the color conversion unit 2223 may use flags to indicate whether a written line is "red", "blue", or "a color other than red and blue" based on the external light value detected by the external light value detection means 51 of the external light value detection unit 221 and temporarily store such information for use in distinguishing the color of the written line.

FIG. 28 is a flowchart illustrating process steps performed by the color distinction means 57 of the color conversion unit 2223 of the image processing unit 222.

According to FIG. 28, the color distinction means 57 of the color conversion unit 2223 acquires the averaged image (filtimg) resulting from the averaging process performed by the averaging means 56 (S401), and secures a memory area for a color-distinguished image (tmpimg) (S402).

Then, the color distinction means 57 copies the averaged image (filtimg) on the memory area for the color-distinguished image (tmpimg) (tmpimg=filtimg) (S403).

Then, the color distinction means 57 starts pixel scanning of the averaged image (filtimg) to detect the maximum brightness value (maxrgb) of the color components of the averaged image (filtimg) and the corresponding color (maxcol) with the maximum brightness value (S404), and the minimum brightness value (minrgb) of the color components of the averaged image (filtimg) and the corresponding color (mincol) with the minimum brightness value (S405).

Then, the color distinction means 57 subtracts the minimum brightness value (minrgb) from the maximum brightness value (maxrgb) to obtain a difference value (diffrgb) (diffrgb=maxrgb−minrgb) (S406)

Then, the color distinction means 57 starts pixel scanning of the color-distinguished image (tmpimg) to determine whether a target pixel that is currently scanned corresponds to a white pixel (S407).

When it is determined that a target pixel is not white, a determination is made as to whether the target pixel is blue (S408).

When it is determined that the target pixel is white, the process steps S408-S414 are omitted, and the process moves on to step S415.

In step S408, it is determined whether the target pixel is blue.

When it is determined that the target pixel is blue (S408, Yes), the pixel value of the target pixel is replaced with the pixel value of a blue pixel (0, 0, 255) (S409).

When it is determined that the target pixel is not blue (S408, No), a determination is made as to whether the target pixel is red (S410).

When it is determined that the target pixel is red (S410, Yes), the pixel value of the target pixel is replaced with the pixel value of a red pixel (255, 0, 0) (S411).

When it is determined that the target pixel is not red, a determination is made as to whether the target pixel is black (S412).

When it is determined that the target pixel is black (S412, Yes), the pixel value of the target pixel is replaced with the pixel value of a black pixel (0, 0, 0) (S413).

When it is determined that the target pixel is not black, the target pixel is determined to be in a non-distinguishable color (i.e., a color other than the representative colors, red, blue, and black, and the background color white) and the pixel value of the target pixel is corrected accordingly in the color-distinguished image (tmpimg) (tmpimg=filtimg/1.5) (S414).

Then, a determination is made as to whether the current position of a target pixel corresponds to a last pixel within the color-distinguished image (tmpimg) (S415).

If the current position is not the last pixel within the color-distinguished image (tmpimg) (S415, No), the current position is moved to a next pixel position within the color-distinguished image (tmpimg) and the averaged image (filtimg) according to the pixel scanning order (raster order) (S416).

If the current position is located at the last pixel of the color-distinguished image (tmpimg) (S415, Yes), the present process is ended.

FIG. 29A is a flowchart illustrating process steps performed by the color distinction means 57 of the color conversion unit 2223 of the image processing unit 222 for distinguishing a white pixel.

According to FIG. 29A, upon performing the white color distinction process step S407 of FIG. 28, the color distinction means 57 of the color conversion unit 2223 acquires the pixel value of the target pixel of the color-distinguished image (tmpimg) (S4071); obtains the total sum (r+g+b) of the r value, g value, and b value of the color components of the target pixel; and determines whether the total sum is greater than a value equal to three times a predetermined threshold value (th_sh) (S4072).

If the total sum of the RGB values of the color components is greater than the tripled value of the predetermined threshold value (th_sh) (S4072, Yes), it is determined that the target pixel is white and the pixel value of the target pixel is color-converted into the pixel value of a white pixel (255, 255, 255) (S4073).

If the total sum of the RGB values of the color components is less than or equal to the tripled value of the predetermined threshold value (th_sh) (S4072, No), color conversion of the target pixel is not performed.

Figure 29B:
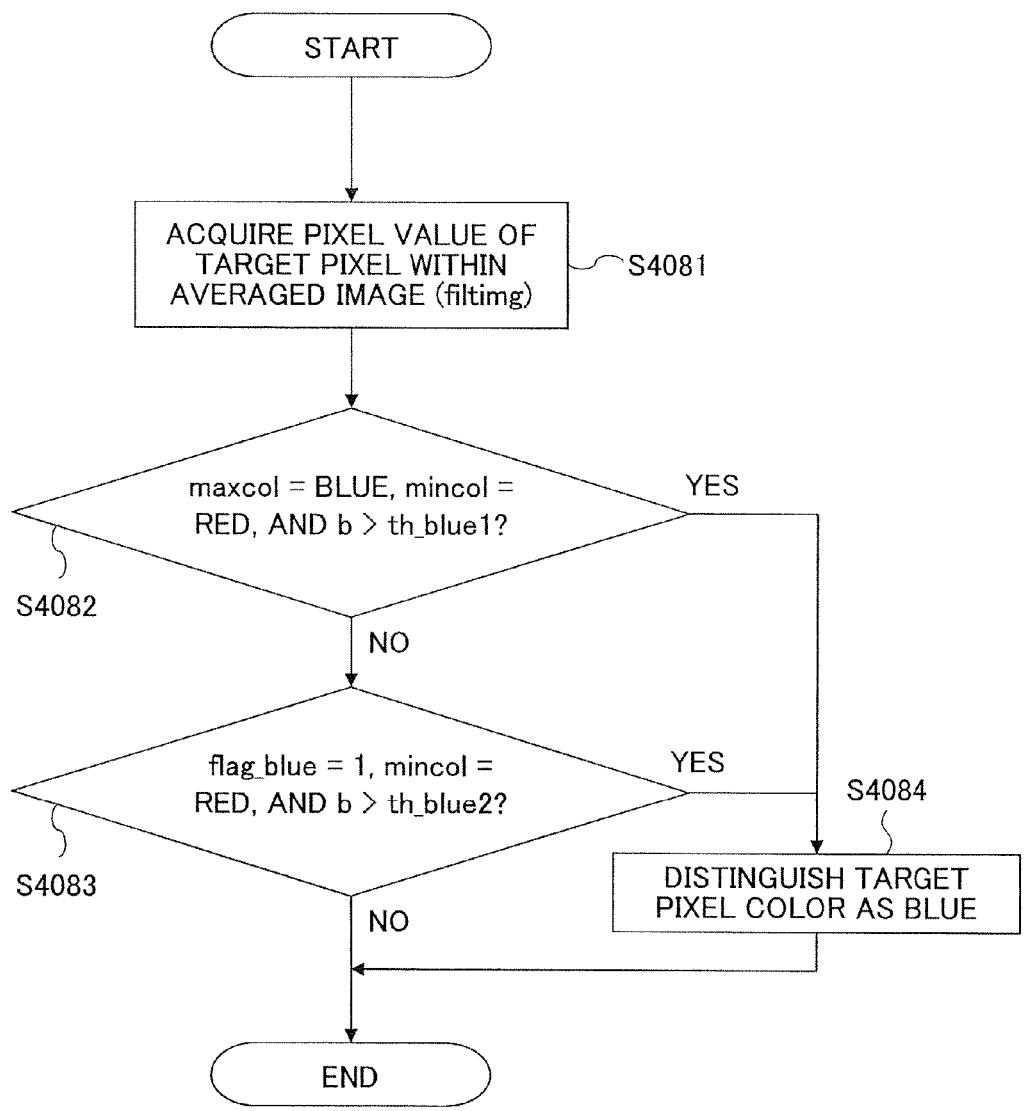
FIG. 29B is a flowchart illustrating process steps of the color distinction process for distinguishing blue.

FIG. 29B is a flowchart illustrating process steps performed by the color distinction means 57 of the color conversion unit 2223 of the image processing unit 222 for distinguishing a blue pixel.

According to FIG. 29B, upon performing the blue color distinction process step S408 of FIG. 28, the color distinction means 57 of the color conversion unit 2223 acquires the pixel value of the target pixel of the color-distinguished image (tmpimg) (S4081) and determines whether the color with the maximum density value (maxcol) of the color components of the target pixel corresponds to blue, whether the color with the minimum density value (mincol) of the color components of the target pixel corresponds to red, and whether the B component of the b value of the target pixel is greater than a blue color distinction threshold value (th_blue1) for determining that the target pixel is blue regardless of the external light value (S4082).

If positive determinations are made in step S4082, the target pixel is determined to be a blue pixel, and the pixel value of the target pixel is color-converted into the pixel value of a blue pixel (0, 0, 255) (S4084).

If one or more negative determinations are made in step S4082, it is determined whether the flag indicating that the target pixel has been distinguished as a blue pixel based on the external light value (flag_blue) is turned on, whether the color with the minimum density value (mincol) corresponds to red, and whether the b value of the B component of the target pixel is greater than a blue color distinction threshold value (th_blue2) for a case in which the external light value is low (S4083).

If positive determinations are made in step S4083, the target pixel is distinguished as blue pixel, and the pixel value of the target pixel is color-converted into the pixel value of a blue pixel (0, 0, 255) (S4084).

If one or more negative determinations are made in step S4083, color conversion of the target pixel is not performed.

In one preferred embodiment, the threshold value (th_blue1) is set to be within a value range of 150-190 and the threshold value (th_blue2) is set to be within a value range of 160-200, and the values of the two threshold values are set to satisfy the following relationship: th_blue1<th_blue2.

Figure 29C:
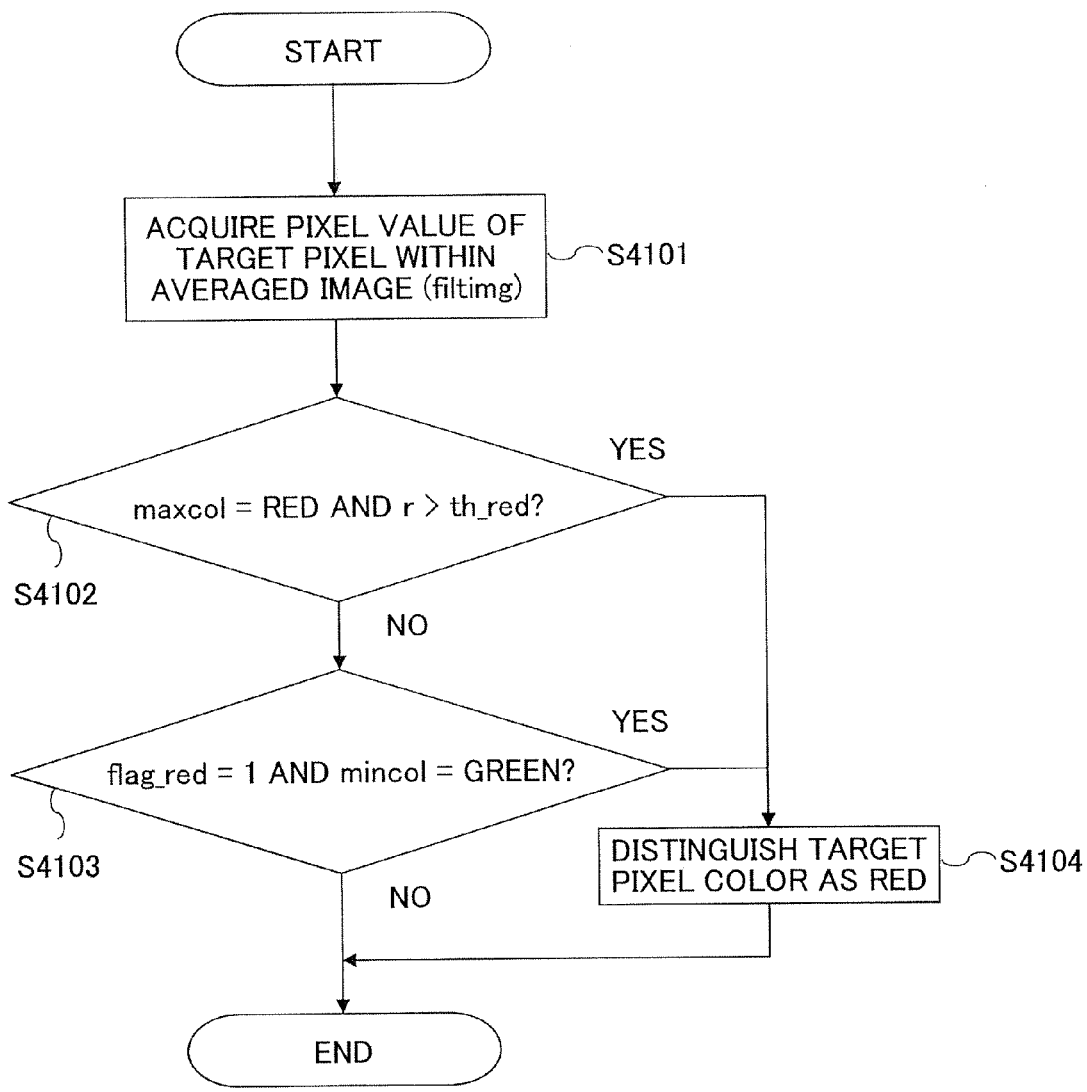
FIG. 29C is a flowchart illustrating process steps of the color distinction process for distinguishing red.

FIG. 29C is a flowchart illustrating process steps performed by the color distinction means 57 of the color conversion unit 2223 of the image processing unit 222 for distinguishing a red pixel.

According to FIG. 29C, upon performing the red color distinction process step S410 of FIG. 28, the color distinction means 57 of the color conversion unit 2223 acquires the pixel value of the target pixel of the color-distinguished image (tmpimg) (S4101) and determines whether the color with the maximum density value (maxcol) corresponds to red, and whether the r value of the R component of the target pixel is greater than a red color distinction threshold value for determining that a pixel is red regardless of external light influences (S4102).

If positive determinations are made in step S4102, the target pixel is distinguished as a red pixel and the pixel value of the target pixel is color-converted to the pixel value of a red pixel (255, 0, 0) (S4104).

If a negative determination is made in step S4103, color conversion is not performed on the target pixel.

In one preferred embodiment, the red color distinction threshold value (th_red) is set to be within a value range of 180-200 under normal external light conditions.

Figure 29D:
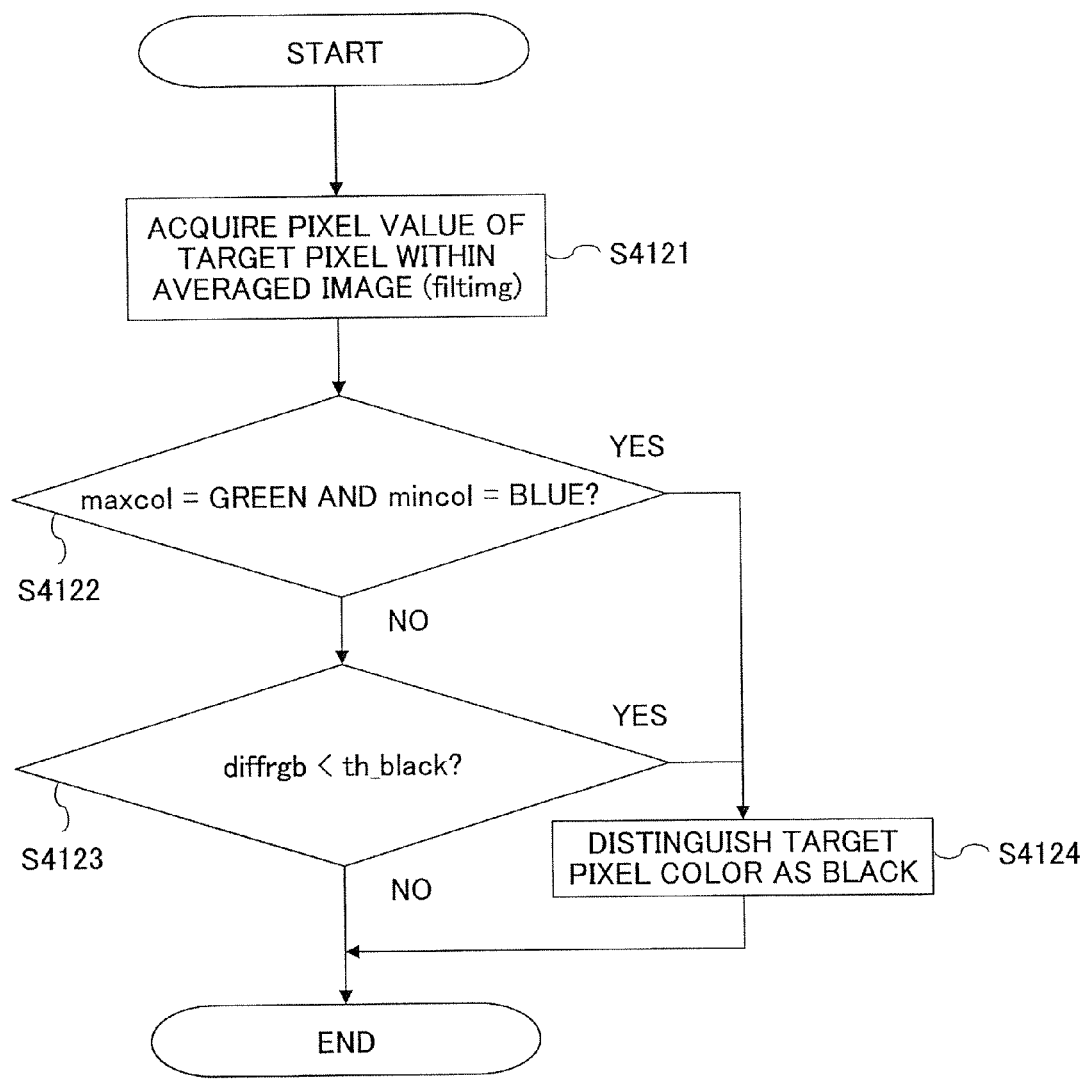
FIG. 29D is a flowchart illustrating process steps of the color distinction process for distinguishing black.

FIG. 29D is a flowchart illustrating process steps performed by the color distinction means 57 of the color conversion unit 2223 of the image processing unit 222 for distinguishing a black pixel.

According to FIG. 29D, upon performing the black color distinction process step S412 of FIG. 28, the color distinction means 57 of the color conversion unit 2223 acquires the pixel value of the target pixel of the color-distinguished image (tmpimg) and determines whether the color with the maximum density value (maxcol) of the color components of the target pixel corresponds to green, and whether the color with the minimum color density value (mincol) corresponds to blue (S4122).

If positive determinations are made in step S4122, the target pixel is distinguished as a black pixel, and the pixel value of the target pixel is color-converted to the pixel value of a black pixel (0, 0, 0).

If a negative determination is made in step S4122, it is determined whether the difference value (diffrgb) obtained by subtracting the minimum density value (minrgb) from the maximum density value (maxrgb) of the RGB values of the color components is less than a black color distinction threshold value (th_black) for determining a pixel to be black regardless of external light influences (S4123).

If positive determinations are made in step S4123, the target pixel is distinguished as a black pixel and the pixel value of the target pixel is color-converted into the pixel value of a black pixel (0, 0, 0) (S4124).

If a negative determination is made in step S4123, color conversion is not performed on the target pixel.

In one preferred embodiment, the black color distinction threshold value (th_black) is set to be within a value range of 15-30.

As can be appreciated from the above descriptions, the color distinction means 57 of the color conversion unit 2223 may set color distinction threshold values for distinguishing the color "white" of the background and typical colors of markers including "red", "blue" and "black", for example, based on the external light value detected by the external light detection means 51 of the external light detection unit 221 so that optimal color distinction processes may be performed according to variations in the external light conditions.

Figure 30A:
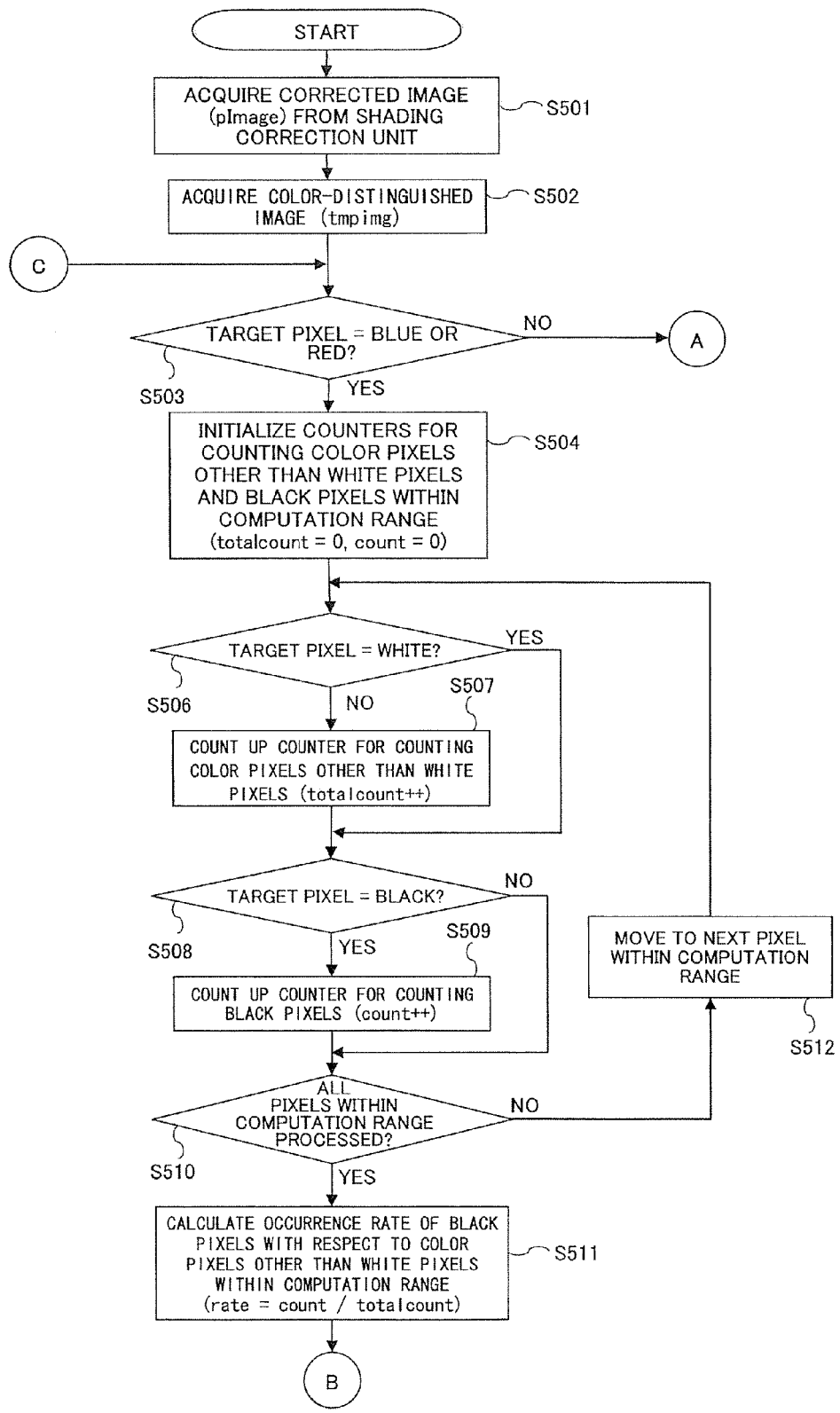
FIG. 30A is a flowchart illustrating process steps of a color distinction correction process performed by the color conversion unit.
Figure 30B:
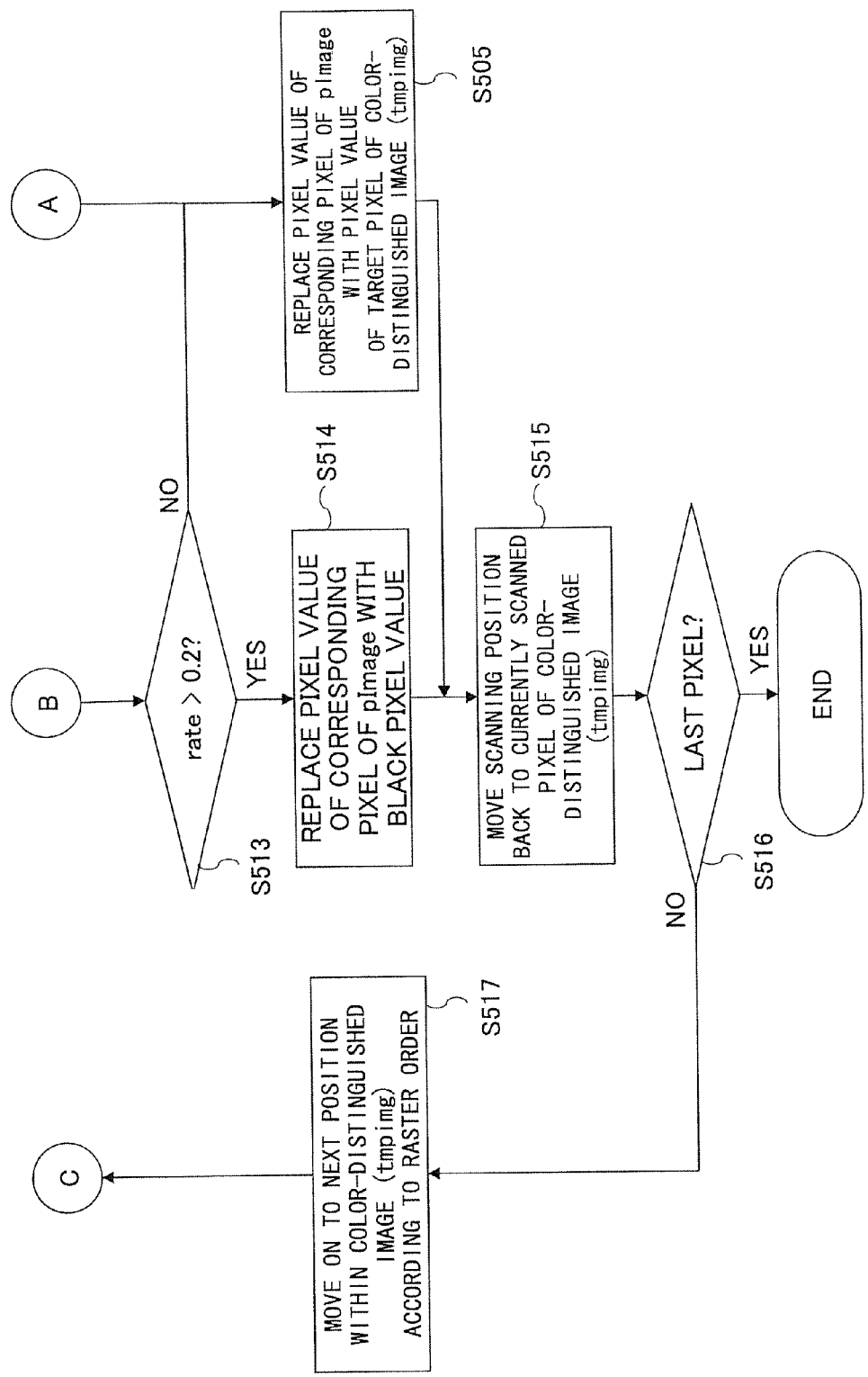
FIG. 30B is a flowchart illustrating process steps of the color distinction correction process continued from FIG. 30A.

FIGS. 30A and 30B are flowcharts illustrating process steps performed by the color distinction correction means 58 of the color conversion unit 2223 of the image processing unit 222.

According to FIGS. 30A and 30B, the color distinction correction means 58 of the color conversion unit 2223 acquires the corrected image (pImage) that is obtained by the shading correction unit 2222 (S501) and the color-distinguished image (tmpimg) (S502).

Then, the color distinction correction means 58 starts pixel scanning of the color-distinguished image (tmpimg), and determines whether a target pixel that is currently scanned corresponds to a blue pixel or a red pixel (S503).

If the target pixel is distinguished as blue or red (S503, Yes), the counter (totalcount) for counting the number of neighboring pixels other than white pixels of the target pixel that are within the correction computation range subject to an averaging process and the counter (count) for counting the number of black pixels of the above counted pixels are initialized (totalcount=0, count=0) (S504).

If the target pixel is neither blue nor red (S503, No), the pixel value of a pixel of the corrected image (pImage) located at the same coordinate position as the current scanning position according to the pixel scanning order is replaced with the pixel value of the target pixel located this current scanning position (S505).

Then, a determination is made as to whether the target pixel that is currently scanned is white (S506).

If the target pixel is not white (S506, No), the counter (totalcount) for counting the number of neighboring pixels other than white pixels is counted up (totalcount++) (S507).

If the target pixel is white (S506, Yes), step S507 is not performed and the process moves on to step S508.

In step S508, a determination is made as to whether the target pixel that is currently scanned corresponds to a black pixel.

If the target pixel is black (S508, Yes), the counter (count) for counting the number of black pixels is counted up (count++) (S509).

If the target pixel is not black (S508, No), step S509 is not performed and the process moves on to step S510.

In step S510, a determination is made as to whether the color distinction correction process has been performed on all pixels of the color-distinguished image (tmpimg) within a corresponding correction range.

When it is determined that the color distinction correction process has been performed on all pixels within the correction range (S510, Yes), the number of black pixels (count) within the correction range is divided by the number of pixels other than white (totalcount) to obtain the occurrence rate ("rate") of the black pixel with respect to the color pixels other than white pixels (S511).

If it is determined that the color distinction correction process has not yet been completed for all the pixels within the correction range (S510, No), the current position is moved to the position of a next pixel subject to the color distinction correction process (S512).

Then, a determination is made as to whether the occurrence rate of the black pixel is greater than a predetermined threshold value (e.g., 0.2 in the present example) (S513).

If the calculated black pixel occurrence rate ("rate") is greater than the predetermined value ("0.2") (S513, Yes), the pixel value of a pixel of the corrected image (pImage) located at the same coordinate position as the current scanning position of the color-distinguished image (tmpimg) according to the pixel scanning order (raster order) is replaced with the pixel value of a black pixel (0, 0, 0) (S514).

If the calculated rate ("rate") is less than or equal to the predetermined value ("0.2") (S513, No), the pixel value of a pixel of the corrected image (pImage) located at the same coordinates position as the current scanning position according to the pixel scanning order (raster order) is replaced with the pixel value of the target pixel located at the current scanning position of the color-distinguished image (tmpimg) (S505).

After the color distinction correction process, the pixel scanning position is returned to the current position on of the color-distinguished image (tmpimg) that is currently being scanned (S515).

Then, a determination is made as to whether the current position of the target pixel corresponds to the last pixel for pixel scanning of the color-distinguished image (tmpimg) (S516).

If the current position does not correspond to the last pixel of the color-distinguished image (tmpimg) for pixel scanning (S516, No), the current position is moved to a next pixel position within the color-distinguished image (tmpimg) according to the pixel scanning order (raster order) (S517).

If the current position corresponds to the last pixel of the color-distinguished image (tmpimg) for pixel scanning (S516, Yes), the process is ended.

As can be appreciated from the above descriptions, the color distinction correction means 58 of the color conversion unit 2223 may accurately correct pixels of the color-distinguished image (tmpimg) that have a high likelihood of being erroneously distinguished by the color distinction means 57.

In this way, color conversion may be accurately performed on written lines of characters and figures without being influenced by external light conditions so that distinct lines may be obtained for accurately extracting a written image.

It is noted that in one preferred embodiment, the above-described process steps may be realized by a program that is stored in a computer-readable medium.

As can be appreciated from the above descriptions, an image display apparatus according to the first embodiment of the present invention is adapted to control computation processes of the image processing unit 222 upon extracting a written image from captured image data captured by the written image capturing unit 21 using the written image area extracting unit 22 based on an external light value detected by the external light detection means 51 of the external light value detection unit 221.

In this way, the image display apparatus according to the present embodiment may accurately perform image correction on the captured image data according to variations in the external light conditions depending on the usage environment of the image display apparatus so that a high quality written image may be extracted.

Also, in the image display apparatus according to the first embodiment, the background removal means 52 of the image processing unit 222 performs an averaging process for each color component within a predetermined computation range including a target pixel and its neighboring pixels, determines that the target pixel corresponds to a background pixel when the averaged brightness value of the target pixel is greater than a predetermined background removal threshold value, and replaces the pixel value of the target pixel with the pixel value of a white pixel. In this case, the background removal means 52 is adapted to adjust (enlarge or reduce) the computation range for the averaging process to an optimal range based on the external light value detected by the external light detection means 51 of the external light detection unit 221.

In this way, the image display apparatus according to the present embodiment may perform a background removal process on captured image data according to variations in external light conditions so that accuracy may be improved in determining the image background and the written image area with written characters and figures.

Also, in the image display apparatus according to the first embodiment, the noise removal means 54 of the image processing unit 222 removes noise from an image that is corrected by the brightness correction means 53 through planarizing an uneven distribution of light caused by external light conditions (brightness gradient) based on a predetermined noise removal threshold value. In this case, the noise removal means 54 adjusts the predetermined noise removal threshold value based on the external light value detected by the external light value detection means 51 of the external light value detection unit 221.

In this way, the image display apparatus according to the present embodiment may perform noise removal on captured image data according to variations in external light conditions so that a high quality corrected image may be obtained without being influenced by external light conditions.

Also, in the image display apparatus according to the first embodiment, the color distinction means 57 of the color conversion unit 2223 of the image processing unit 222 performs a color distinction process on pixel values of an image corrected by the shading correction unit 2222 based on a predetermined color distinction threshold value to distinguish the color of written lines of written characters and figures included in the image. In this case, the color distinction means 57 adjusts the predetermined color distinction threshold value based on the external light value detected by the external light value detection means 51 of the external light value detection unit 221.

In this way, the image display apparatus according to the present embodiment may perform accurate color distinction without being influenced by external light conditions.

Figure 31A:
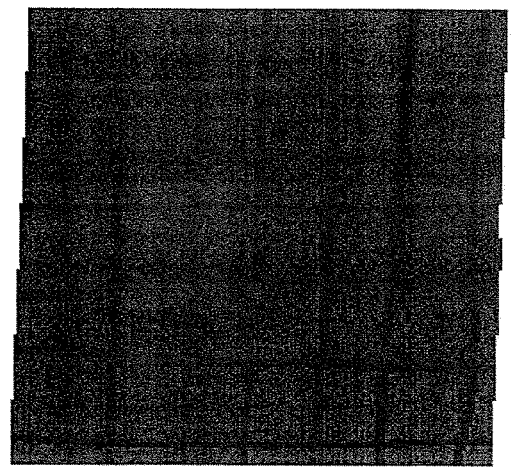
FIG. 31A is a diagram illustrating exemplary captured image data captured under a dark external light environment.

FIG. 31A is a diagram illustrating captured image data captured under a dark external light environment that are to be corrected by the image processing unit 222 of the image display apparatus according to the first embodiment.

Figure 31B:
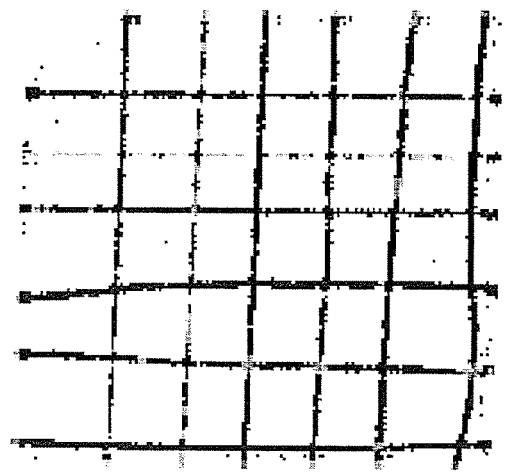
FIG. 31B is a diagram illustrating exemplary corrected image data obtained by performing image correction processes according to the prior art on the captured image data of FIG. 31A.
Figure 31C:
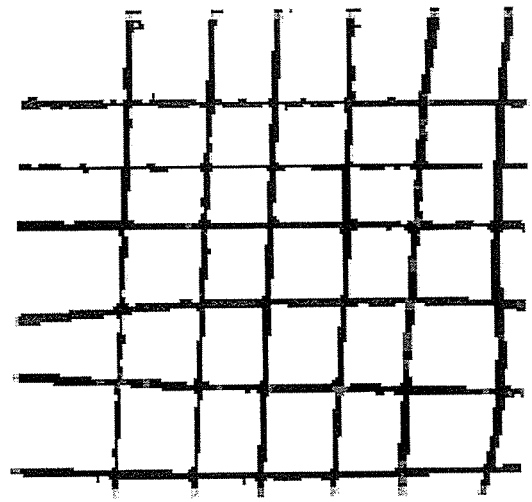
FIG. 31C is a diagram illustrating exemplary corrected image data obtained by performing image correction processes according to an embodiment of the present invention.

FIG. 31B is a diagram illustrating image data obtained by correcting the captured image data of FIG. 31A according to a conventional image correction scheme that does not take external light conditions into account, and FIG. 31C is a diagram illustrating image data obtained by correcting the captured image data of FIG. 31A according to an image correction scheme of an embodiment of the present invention using the image processing unit 222.

Figure 32A:
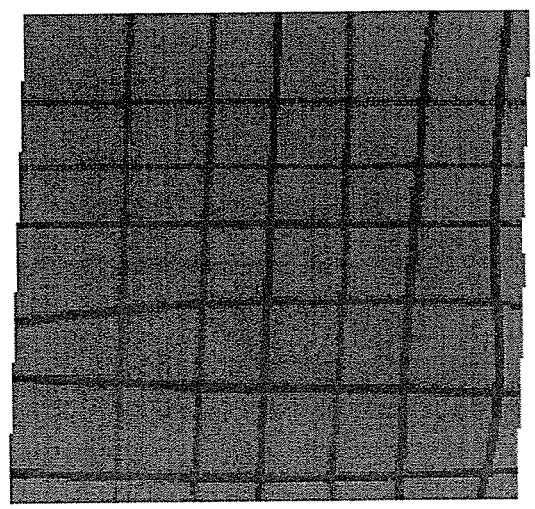
FIG. 32A is a diagram illustrating exemplary captured image data captured under a normal external light environment.

FIG. 32A is a diagram illustrating captured image data captured under a normal external light environment that are to be corrected by the image processing unit 222 of the image display apparatus according to the first embodiment.

Figure 32B:
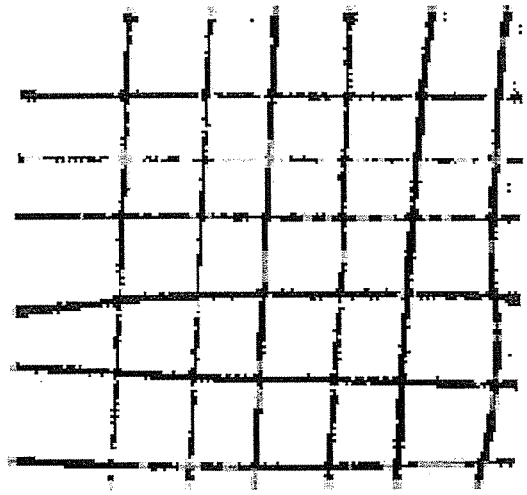
FIG. 32B is a diagram illustrating exemplary corrected image data obtained by performing image correction processes according to the prior art on the captured image data of FIG. 32A.
Figure 32C:
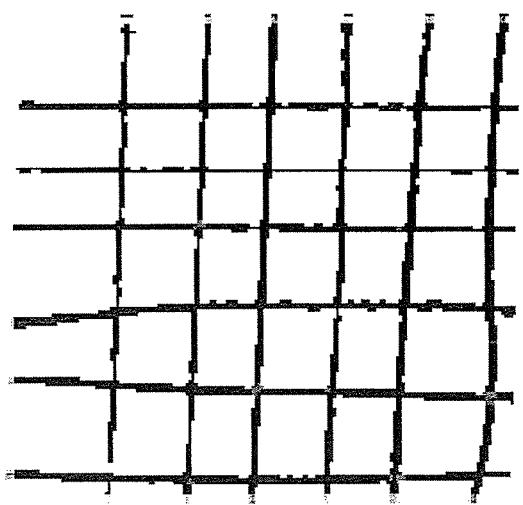
FIG. 32C is a diagram illustrating exemplary corrected image data obtained by performing image correction processes according to an embodiment of the present invention on the captured image data of FIG. 32A.

FIG. 32B is a diagram illustrating image data obtained by correcting the captured image data of FIG. 32A according to a conventional image correction scheme that does not take external light conditions into account, and FIG. 32C is a diagram illustrating image data obtained by correcting the captured image data of FIG. 32A according to an image correction scheme of an embodiment of the present invention using the image processing unit 222.

Figure 33A:
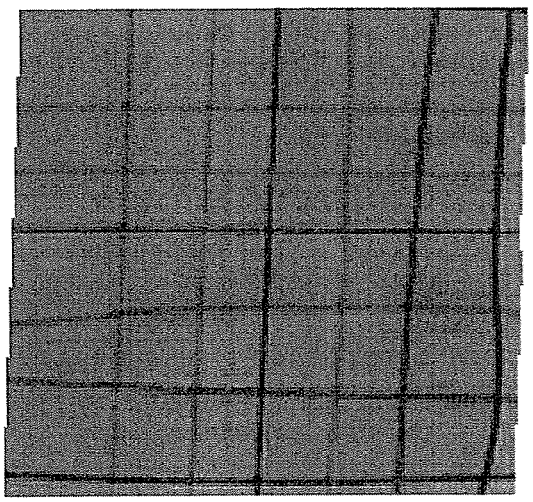
FIG. 33A is a diagram illustrating exemplary captured image data captured under a bright external light environment.

FIG. 33A is a diagram illustrating captured image data captured under a bright external light environment that are to be corrected by the image processing unit 222 of the image display apparatus according to the first embodiment.

Figure 33B:
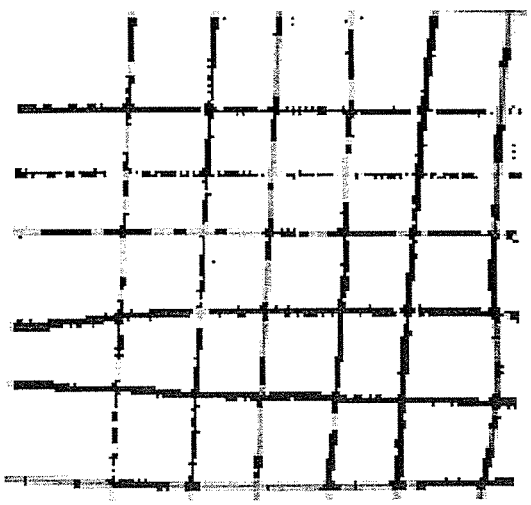
FIG. 33B is a diagram illustrating exemplary corrected image data obtained by performing image correction processes according to the prior art on the captured image data of FIG. 33A.
Figure 33C:
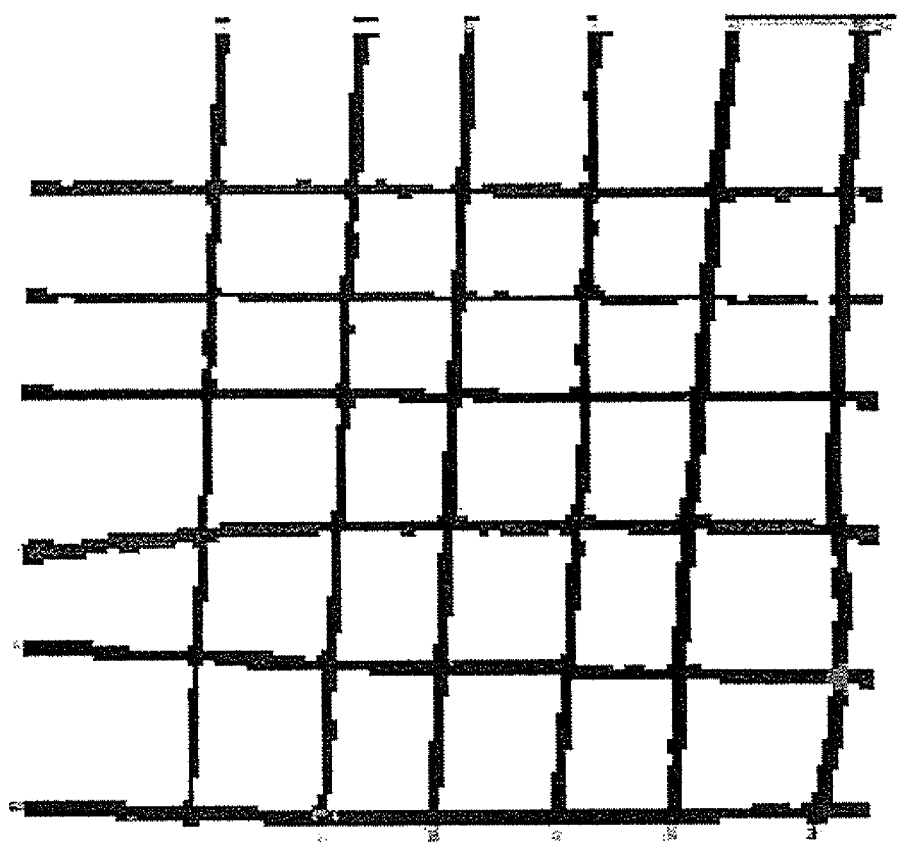
FIG. 33C is a diagram illustrating exemplary corrected image data obtained by performing image correction processes according to an embodiment of the present invention on the captured image data of FIG. 33A.

FIG. 33B is a diagram illustrating image data obtained by correcting the captured image data of FIG. 33A according to a conventional image correction scheme that does not take external light conditions into account, and FIG. 33C is a diagram illustrating image data obtained by correcting the captured image data of FIG. 33A according to an image correction scheme of an embodiment of the present invention using the image processing unit 222.

It is noted that FIGS. 31A-33C show image data of lines written on the writing screen 11b of the image display apparatus of the first embodiment using a marker with a width of approximately 1 mm, for example, in which case color distinction of the written lines may be rather difficult.

As can be appreciated from these drawings, the image correction scheme according to the present embodiment that takes external light conditions into account enables extraction of a higher quality written image compared to the case of using the conventional image correction scheme. Specifically, by implementing the image correction scheme according to the present embodiment, a written image may be stably extracted from captured image data even when the written image includes fine lines of which color may be difficult to distinguish and even when external light conditions may vary depending on the usage environment of the image display apparatus, for example.

In this way, an image display apparatus according to the first embodiment of the present invention may accurately extract a written image from captured image data without being influenced by external light conditions to thereby obtain high grade electronic information of written characters and figures of the written image.

Embodiment 2

In the following, a second embodiment of the present invention is described that involves removing an isolated dot surrounded by white pixels of the background that has not been removed by image correction processes such as the background removal process of the first embodiment to further improve the image quality of the extracted written image.

It is noted that aside from having the additional function of removing an isolated dot, the second embodiment is substantially identical to the first embodiment. Thus, hardware components, functional elements, and process steps of the second embodiment that are identical to those of the first embodiment are given the same numerical references and their descriptions may be omitted.

Figure 34:
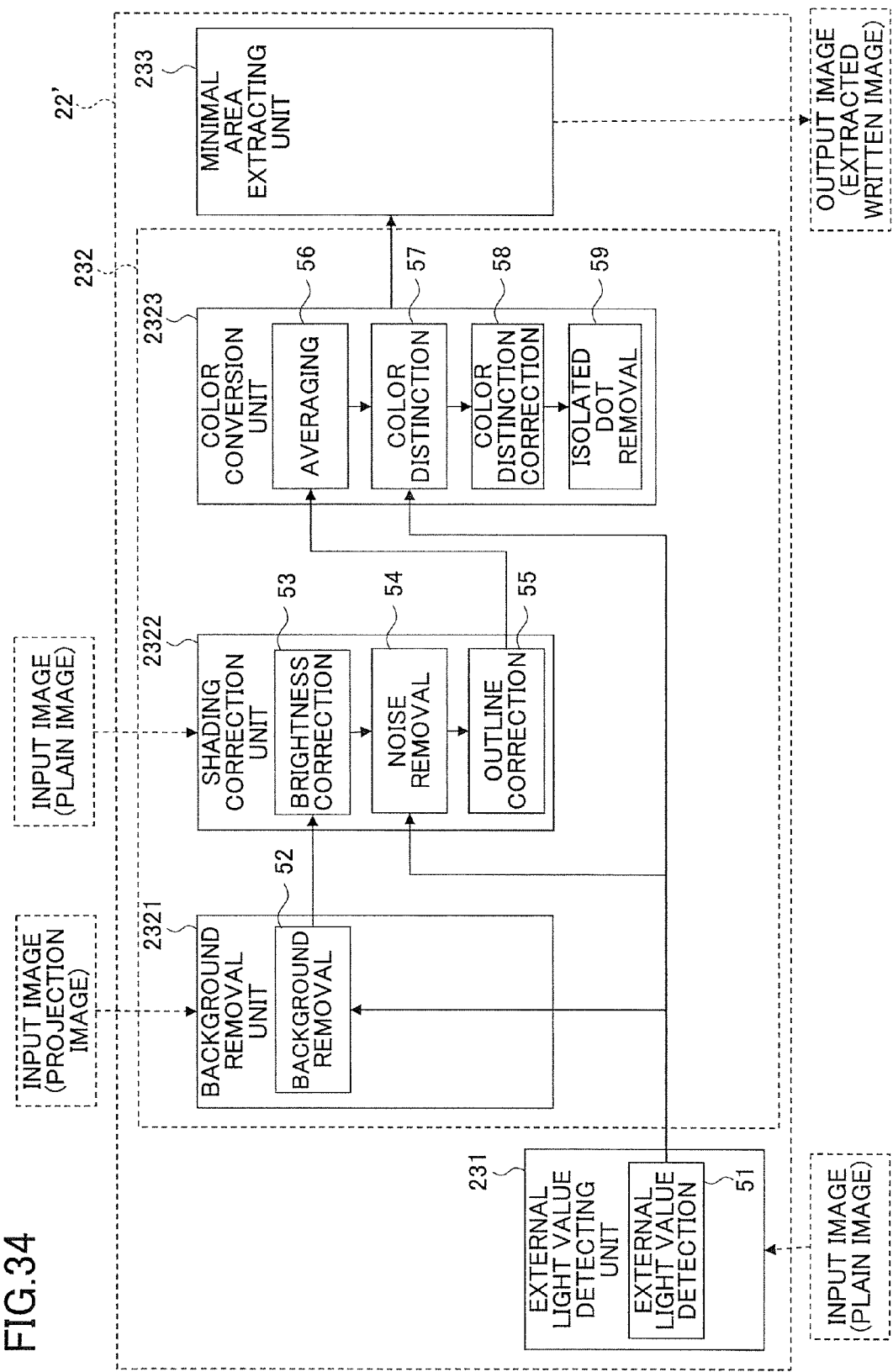
FIG. 34 is a block diagram showing a functional configuration of a written image extracting unit of an image display apparatus according to a second embodiment of the present invention.

FIG. 34 is a block diagram showing an exemplary configuration of a written image area extracting unit of an image display apparatus according to a second embodiment of the present invention.

As is shown in this drawing, the isolated dot removing function of the second embodiment is realized by isolated dot removal means 59 of a color conversion unit 2323 of an image processing unit 232 included in the written image area extracting unit 22' of the second embodiment.

The isolated dot removal means 59 inputs an image corrected by the color distinction correction means 58 and performs pixel scanning on the input image to determine whether each target pixel corresponds to an isolated dot and replace the pixel value of the target pixel that is determined to be an isolated dot with the pixel value of a white pixel.

The isolated dot removal means 59 is provided in view of the fact that an isolated dot that is relatively inconspicuous in an image obtained from image correction by a shading correction unit 2322 of the written image extracting unit 22' may subsequently become conspicuous after performing image correction by the color conversion unit 2323, and such a conspicuous isolated dot is preferably removed in order to extract a high quality written image.

In the following, the manner in which an isolated dot is removed is described with reference to FIG. 35.

Figure 35:
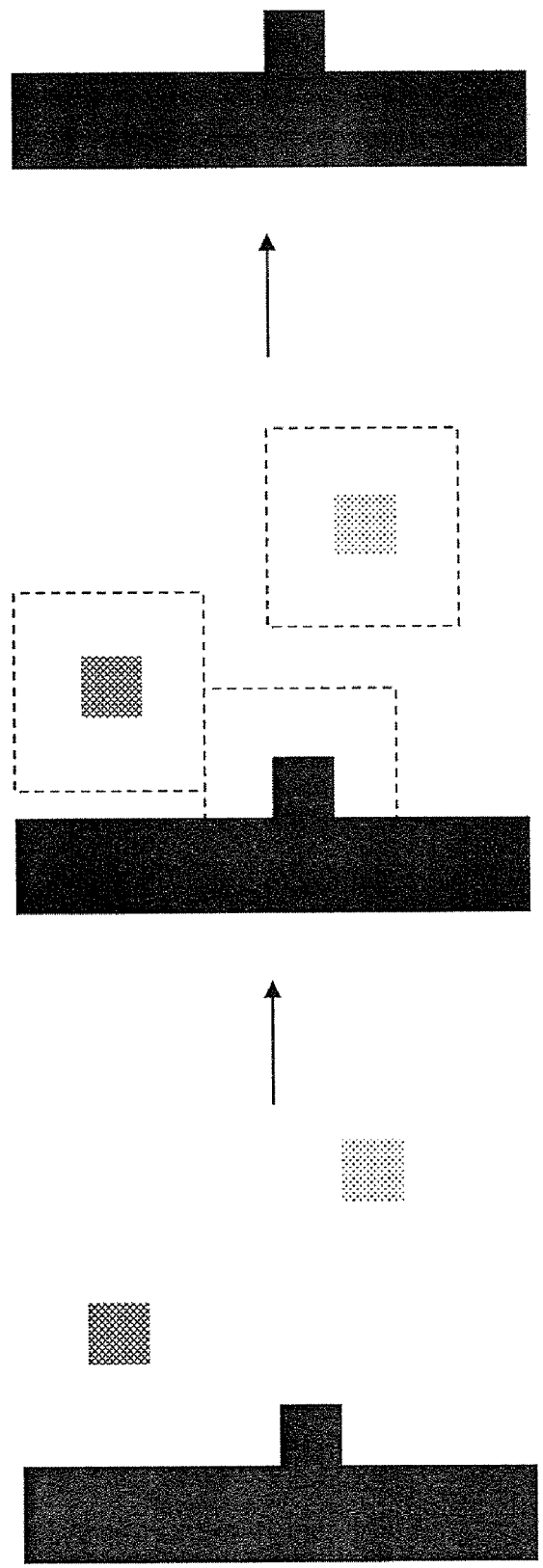
FIG. 35 is a diagram illustrating an isolated dot removal process that is performed by a color conversion unit of the image display apparatus according to the second embodiment of the present invention.

FIG. 35 is a diagram illustrating an exemplary isolated dot removal process performed by the color conversion unit 2323 of the image processing unit 232 of the image display apparatus according to the second embodiment.

According to the example of FIG. 35, the isolated dot removal means 59 performs pixel scanning on an input image, and determines whether a target pixel is a color pixel other than a white pixel. Upon determining that the target pixel is a color pixel other than a white pixel, the isolated dot removal means 59 refers to surrounding pixels of the target pixel (pixel area defined by hatched lines in FIG. 35). If all the pixels surrounding the target pixel have pixel values of white pixels, the target pixel is determined to be an isolated dot and the pixel value of the target pixel is replaced with the pixel value of a white pixel (255, 255, 255).

In this way, the isolated dot removal means 59 performs image correction on a color-distinguished image to determine whether all surrounding pixels of a target pixel are white and replace the pixel value of the target pixel with the pixel value of a white pixel depending on the determination result so that an isolated dot that has become conspicuous as a result of performing a color distinction process may be removed.

As can be appreciated from the above descriptions, in the image display apparatus according to the second embodiment of the present invention, an isolated dot that has become conspicuous as a result of performing a color distinction process may be removed by the isolated dot removal means 59 so that a high quality written image may be extracted.

In the following, exemplary advantages realized by embodiments of the present invention are described.

According to one aspect of the present invention, image processes performed in an image display apparatus for extracting a written image may be controlled according to an external light detection value that may vary depending on the usage environment of the image display apparatus. By taking the external light detection value into account in controlling the image processes, a written image may be accurately extracted regardless of external light conditions, for example.

According to another aspect of the present invention, in a background removal process involving averaging each color component of pixels within a predetermined range (computation range for averaging) of a captured image to obtain an averaged pixel value (brightness value) of a target pixel, determining whether the averaged pixel value is greater than a background removal threshold value, distinguishing the target pixel as a background pixel the pixel value of the target pixel is greater than the background threshold value, and replacing the pixel value of the target pixel with a white pixel value, by adjustably setting (reducing or enlarging) the predetermined range (computation range) for averaging based on the detected external light value, the background removal process may be performed on the captured image taking into account variations in the external light conditions. By performing a background removal process according to external light conditions in the manner described above, accuracy may be improved in distinguishing a background from written characters and figures, for example.

According to another aspect of the present invention, in a noise removal process for removing noise from a brightness-corrected image based on a noise removal threshold value, by adjustably setting the noise removal threshold value according to the detected external light value, the noise removal process may be performed taking into account variations in the external light conditions. By controlling image processes according to variations in the external light in the manner described above, a high quality corrected image may be obtained without being influenced by external light conditions, for example.

According to another aspect of the present invention, in a color distinction process for distinguishing the color of a written line by comparing the pixel values of a corrected image with relevant color distinction threshold values, by adjustably setting the color distinction threshold values according to the detected external light value, accurate color distinction of the written line may be performed without being influenced by external light conditions, for example.

According to another aspect of the present invention, by controlling image processes for extracting a written image according to the detected external light value, a written image may be accurately extracted without being influenced by external light conditions so that high grade electronic information of written characters and figures of the written image may be obtained, for example.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

Figure 36:
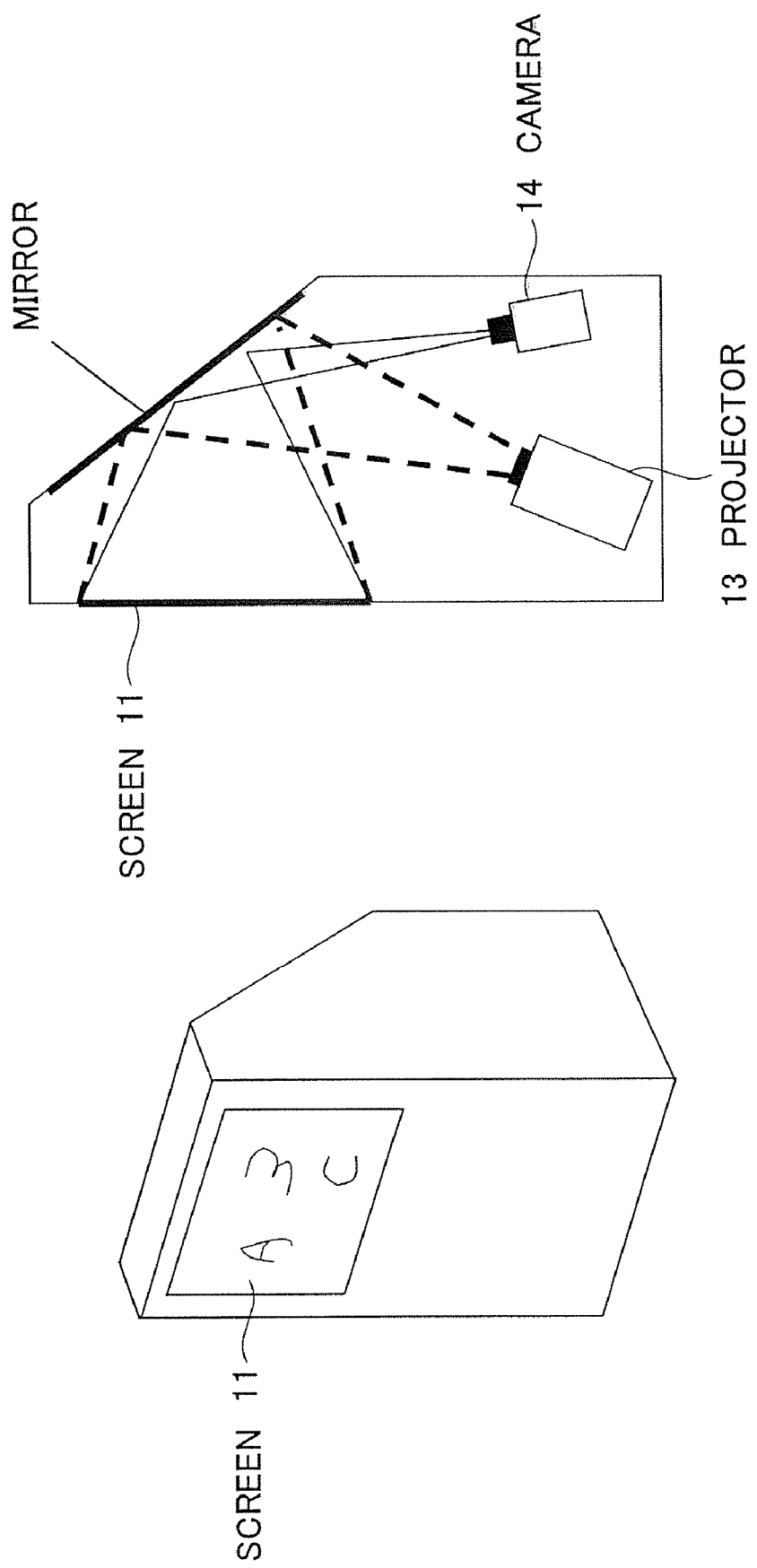
FIG. 36 is a diagram showing another exemplary hardware configuration of an image display apparatus according to a modified embodiment.

For example, the hardware configuration of an image display apparatus according to an embodiment of the present invention is not limited to that illustrated in FIGS. 1A and 1B, and other hardware configurations are possible such as that shown in FIG. 36 where the screen 11 is positioned vertically.

Figure 4:
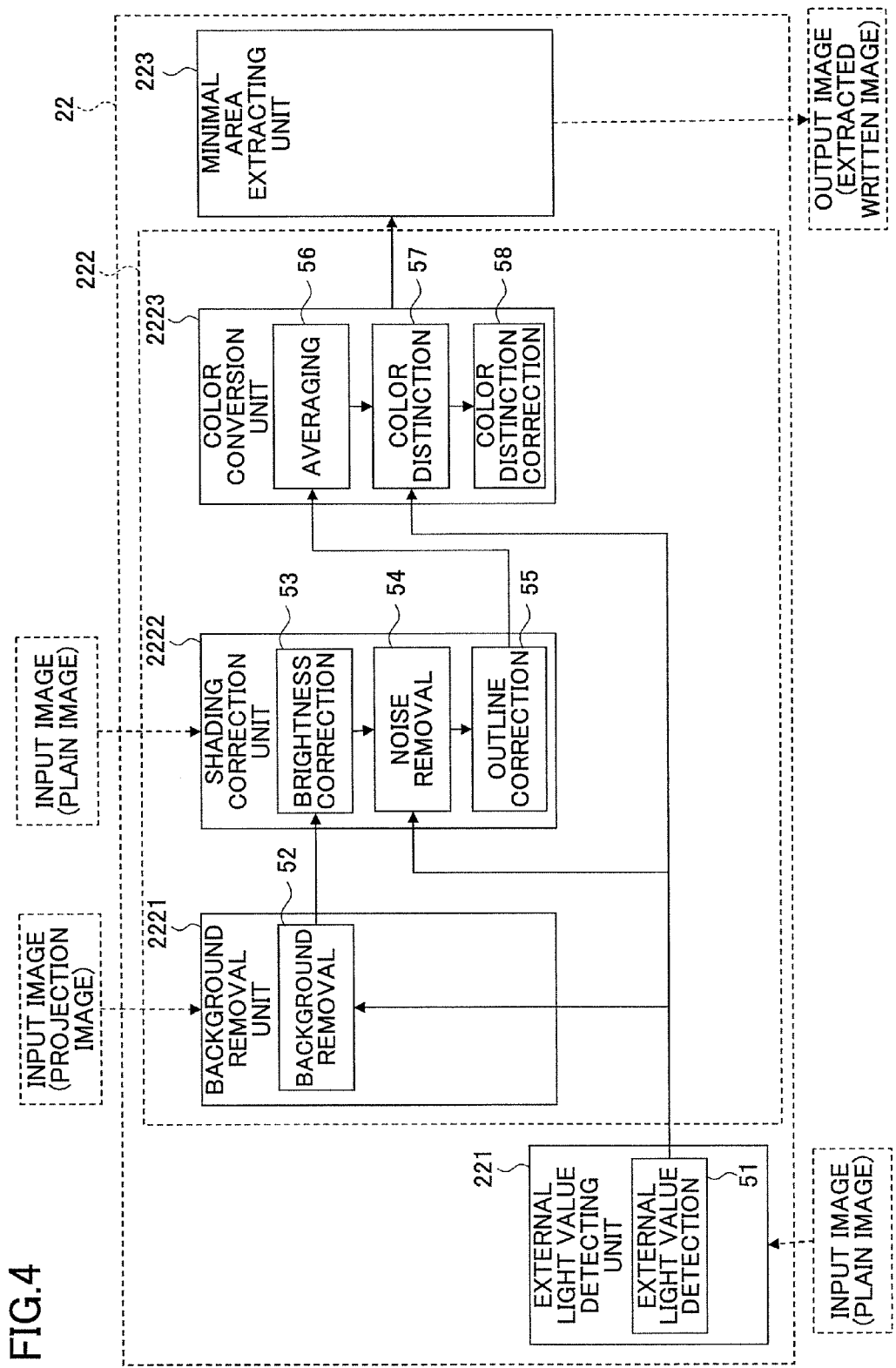
FIG. 4 is a block diagram showing an exemplary functional configuration of a written image extracting unit of the image display apparatus according to the first embodiment.

Also, the functional configuration of an image display apparatus according to an embodiment of the present invention is not limited to those illustrated in FIGS. 2, 4, and 34, and in other examples, the functional elements may be combined in a different manner or combined with other additional elements.

Further, it is noted that the functional elements of the image display apparatus according to an embodiment of the present invention may comprise hardware, software, or combinations thereof. When one or more of the functional elements comprise software in the form of computer-readable program code, for example, they may be embodied in any computer-readable medium for carrying or having computer-executable instructions or data structures stored thereon. By way of example, and not limitation, such computer-readable medium may be a physical medium such as a RAM, a ROM, an EEPROM, a CD-ROM, or some other type of storage device, or any other medium which can be accessed by a computer and used to carry or store desired program code means in the form of computer-executable instructions or data structures.

Also, it is noted that the thresholding method used by the background removal unit 2221 for adjustably setting the variable background removal threshold value that involves calculating the average density value of a target pixel and its neighboring pixels within a predetermined computation range is merely one illustrative method for calculating the variable threshold value, and the present invention is not limited to such a method.

Specifically, in certain alternative examples, the present invention may use other thresholding methods such as the mode method, the p-tile method, and the differential histogram method to calculate a background removal threshold value for a computation range of neighboring pixels surrounding a target pixel. Also, it is noted that since an enormous amount of computation capacity is needed to actually perform the above-described threshold calculation processes on all the pixels of a processing image and the processing speed may be sacrificed as a result, in a preferred embodiment, the threshold calculation process may be performed on representative pixels while the threshold values for the other pixels may be obtained through interpolation, for example.

Also, in the above-described embodiment, a pixel is arranged to have a pixel value range (brightness value range) of 256 levels in which case a pixel may represent 256 different density levels. However, the present invention is not limited to such an arrangement, and in other alternative examples, a pixel value may be represented by 7 bits to realize a pixel value range (brightness value range) of 128 levels, or a pixel value may be represented by 9 bits to realize a pixel value range (brightness value range) of 512 levels.

Also, in the above-described embodiment of the present invention, the external light detection means 51 determines the most frequently occurring brightness value based on the brightness distribution characteristics of the G component of the RGB components in calculating the external light value. However, the present invention is not limited to using such a calculation method for obtaining the external light value.

For example, the Y component may be calculated from the RGB component and the most frequently occurring brightness value based on the Y component distribution characteristics may be determined as the external light value. However, since the G component brightness distribution characteristics is substantially identical to the Y component distribution characteristics, the G component brightness distribution characteristics may preferably be referred to in determining the external light value in consideration of the processing speed, for example.

Further, it is noted that the present invention is not limited to the illustrated structures of the above-described embodiments, and various modified structures such as combinations with other elements are also possible.

That is, the present invention may be adapted for a variety of applications and modifications may be made accordingly within the scope of the present invention.

The present application is based on and claims the benefit of the earlier filing date of Japanese Patent Application No. 2006-209264 filed on Jul. 31, 2006, the entire contents of which are hereby incorporated by reference.

What is claimed is:

1. An image display apparatus, comprising:
an image projecting unit that projects a projection image on a projection screen;
a written image capturing unit that captures a written image of a writing screen that is arranged opposite the projection screen;
a written image area extracting unit that extracts a written image area from the captured written image captured by the written image capturing unit; and
an image compositing unit that composites the written image area extracted by the written image area extracting unit and the projection image projected by the image projecting unit; and wherein the written image area extracting unit includes an external light value detecting unit that detects an external light value, and an image processing unit that performs an image correction process on the captured written image based on the external light value detected by the external light detecting unit; and wherein said apparatus includes a color distinction unit that performs a color distinction process for distinguishing a color of a pixel of an averaged image obtained by an averaging unit based on one or more color distinction threshold values that are adjustably set according to the external light value detected by the external light value detecting unit; and a color distinction correction unit that performs a color distinction correction process on the image corrected by a brightness correction unit, a noise removal unit, and an outline correction unit, which color distinction correction process involves calculating a rate at which a neighboring pixel of a target pixel within a predetermined correction range of said corrected image is black based on the color-distinguished image obtained by the color distinction unit, determining whether the calculated rate is greater than a predetermined value, and replacing a pixel value of the target pixel of said corrected image with a black pixel value if the calculated rate is greater than the predetermined value.

2. The image display apparatus as claimed in claim 1, wherein the written image capturing unit captures a blank image of the writing screen when the writing screen is blank; and the external light value detecting unit detects the external light value by determining a most frequently occurring brightness value based on a brightness distribution of the blank image.

3. The image display apparatus as claimed in claim 1, wherein the image processing unit includes a background removal unit that performs a background removal process on the captured written image by averaging pixel values of a target pixel and neighboring pixels within a predetermined range of the captured written image, which predetermined range is adjustably set based on the external light value detected by the external light detecting unit, obtaining an averaged pixel value of the target pixel of the captured written image, determining whether the averaged pixel value of the target pixel is greater than a background removal threshold value, distinguishing the target pixel as a background pixel if the averaged pixel value is greater than the background removal threshold value, and replacing the averaged pixel value of the target pixel with a white pixel value.

4. The image display apparatus as claimed in claim 1, wherein the image processing unit includes the brightness correction unit, which performs a brightness correction process on the captured written image by dividing a pixel value of a pixel of the captured written image by a corresponding pixel value of a corresponding pixel of the blank image and replacing the pixel value of the pixel of the captured written image with a value indicating a density level represented by said pixel; the noise removal unit, which performs a noise removal process on the brightness-corrected image by determining whether a pixel value of a target pixel of the brightness-corrected image is greater than a noise removal threshold value, which is adjustably set based on the external light value detected by the external light detecting unit, distinguishing the target pixel as a noise pixel if the pixel value of the target pixel is greater than the noise removal threshold value, and replacing the pixel value of the target pixel with a white pixel value; and the outline correction unit, which performs an outline correction process on the noise-removed image.

5. An image display apparatus, comprising:
an image projecting unit that projects a projection image on a projection screen;
a written image capturing unit that captures a written image of a writing screen that is arranged opposite the projection screen;
a written image area extracting unit that extracts a written image area from the captured written image captured by the written image capturing unit; and
an image compositing unit that composites the written image area extracted by the written image area extracting unit and the projection image projected by the image projecting unit;
wherein the written image area extracting unit includes an external light value detecting unit that detects an external light value, and an image processing unit that performs an image correction process on the captured written image based on the external light value detected by the external light detecting unit;
wherein the image processing unit includes a brightness correction unit that performs a brightness correction process on the captured written image by dividing a pixel value of a pixel of the captured written image by a corresponding pixel value of a corresponding pixel of the blank image and replacing the pixel value of the pixel of the captured written image with a value indicating a density level represented by said pixel; a noise removal unit that performs a noise removal process on the brightness-corrected image by determining whether a pixel value of a target pixel of the brightness-corrected image is greater than a noise removal threshold value, which is adjustably set based on the external light value detected by the external light detecting unit, distinguishing the target pixel as a noise pixel if the pixel value of the target pixel is greater than the noise removal threshold value, and replacing the pixel value of the target pixel with a white pixel value; and an outline correction unit that performs an outline correction process on the noise-removed image; and
wherein the image processing unit includes an averaging unit that performs an averaging process on the image corrected by the brightness correction unit, the noise removal unit, and the outline correction unit, which averaging process involves obtaining an average pixel value of pixels within a predetermined range of said corrected image; a color distinction unit that performs a color distinction process for distinguishing a color of a pixel of the averaged image obtained by the averaging unit based on one or more color distinction threshold values that are adjustably set according to the external light value detected by the external light value detecting unit; and a color distinction correction unit that performs a color distinction correction process on the image corrected by the brightness correction unit, the noise removal unit, and the outline correction unit, which color distinction correction process involves calculating a rate at which a neighboring pixel of a target pixel within a predetermined correction range of said corrected image is black based on the color-distinguished image obtained by the color distinction unit, determining whether the calculated rate is greater than a predetermined value, and replacing a pixel value of the target pixel of said corrected image with a black pixel value if the calculated rate is greater than the predetermined value.

6. The image display apparatus as claimed in claim 5, wherein the color distinction unit adjusts a blue color distinction threshold value for distinguishing blue of the color distinction threshold values to increase in value in accordance with an increase in the external light value detected by the external light detecting unit.

7. The image display apparatus as claimed in claim 5, wherein the color distinction unit adjusts a red color distinction threshold value for distinguishing red of the color distinction threshold values to decrease in value in accordance with an increase in the external light value detected by the external light detecting unit.

8. The image display apparatus as claimed in claim 5, wherein the color distinction unit adjusts a black color distinction threshold value for distinguishing black of the color distinction threshold values to increase in value in accordance with an increase in the external light value detected by the external light detecting unit.

9. The image display apparatus as claimed in claim 5, wherein the image processing unit includes an isolated dot removal unit that performs an isolated dot removal process on the image color-converted by the processed of the averaging unit, the color distinction unit, and the color distinction correction unit, which isolated dot removal process involves determining whether all adjacent pixels of a target pixel of the color-converted image are white and replacing a pixel value of the target pixel of the color-converted image with a white pixel value if all the adjacent pixels are white.

10. An image display method, comprising the steps of:
providing a projection screen;
providing a writing screen arranged opposite said projection screen;
projecting a projection image on said projection screen;
capturing a written image of said writing screen that is arranged opposite the projection screen;
extracting a written image area from the captured written image; and
compositing the extracted written image area and the projection image; and
wherein the written image area extracting step involves detecting an external light value and performing an image correction process on the captured written image based on the detected external light value; and
wherein said method includes a color distinction process that involves distinguishing a color of a pixel of an averaged image obtained by an averaging process based on one or more color distinction threshold values that are adjustably set according to the detected external light value; and a color distinction correction process to be performed on the image corrected by a brightness correction process, a noise removal process, and an outline correction process, which color distinction correction process involves calculating a rate at which a neighboring pixel of a target pixel within a predetermined correction range of said corrected image is black based on the color-distinguished image obtained by the color distinction process, determining whether the calculated rate is greater than a predetermined value, and replacing a pixel value of the target pixel of said corrected image with a black pixel value if the calculated rate is greater than the predetermined value.

11. The image display method as claimed in claim 10, further comprising: capturing a blank image of the writing screen when the writing screen is blank; wherein the step of detecting the external light value involves determining a most frequently occurring brightness value based on a brightness distribution of the blank image.

12. The image display method as claimed in claim 10, wherein the image correction process includes a background removal process that involves averaging pixel values of a target pixel and neighboring pixels within a predetermined range of the captured written image which predetermined range is adjustably set based on the detected external light value, obtaining an averaged pixel value of the target pixel of the captured written image, determining whether the averaged pixel value of the target pixel is greater than a background removal threshold value, distinguishing the target pixel as a background pixel if the averaged pixel value is greater than the background removal threshold value, and replacing the averaged pixel value of the target pixel with a white pixel value.

13. The image display method as claimed in claim 10, wherein the brightness correction process involves dividing a pixel value of a pixel of the captured written image by a corresponding pixel value of a corresponding pixel of the blank image and replacing the pixel value of the pixel of the captured written image with a value indicating a density level represented by said pixel; the noise removal process involves determining whether a pixel value of a target pixel of the brightness-corrected image is greater than a noise removal threshold value which noise removal threshold value is adjustably set based on the detected external light value, distinguishing the target pixel as a noise pixel if the pixel value of the target pixel is greater than the noise removal threshold value, and replacing the pixel value of the target pixel with a white pixel value; and the outline correction process involves correcting an outline of the noise-removed image.

14. An image display method, comprising the steps of
providing a projection screen;
providing a writing screen arranged opposite said projection screen;
projecting a projection image on said projection screen;
capturing a written image of said writing screen that is arranged opposite the projection screen;
extracting a written image area from the captured written image; and
compositing the extracted written image area and the projection image;
wherein the written image area extracting step involves detecting an external light value and performing an image correction process on the captured written image based on the detected external light value;
wherein the image correction process includes a brightness correction process that involves dividing a pixel value of a pixel of the captured written image by a corresponding pixel value of a corresponding pixel of the blank image and replacing the pixel value of the pixel of the captured written image with a value indicating a density level represented by said pixel; a noise removal process that involves determining whether a pixel value of a target pixel of the brightness-corrected image is greater than a noise removal threshold value which noise removal threshold value is adjustably set based on the detected external light value, distinguishing the target pixel as a noise pixel if the pixel value of the target pixel is greater than the noise removal threshold value, and replacing the pixel value of the target pixel with a white pixel value; and an outline correction process that involves correcting an outline of the noise-removed image; and
wherein the image correction process includes an averaging process to be performed on the image corrected by the brightness correction process, the noise removal process, and the outline correction process, which averaging process involves obtaining an average pixel value of pixels within a predetermined range of said corrected image; a color distinction process that involves distinguishing a color of a pixel of the averaged image obtained by the averaging process based on one or more color distinction threshold values that are adjustably set according to the detected external light value; and a color distinction correction process to be performed on the image corrected by the brightness correction process, the noise removal process, and the outline correction process, which color distinction correction process involves calculating a rate at which a neighboring pixel of a target pixel within a predetermined correction range of said corrected image is black based on the color-distinguished image obtained by the color distinction process, determining whether the calculated rate is greater than a predetermined value, and replacing a pixel value of the target pixel of said corrected image with a black pixel value if the calculated rate is greater than the predetermined value.

15. The image display method as claimed in claim 14, wherein the color distinction process involves adjusting a blue color distinction threshold value for distinguishing blue of the color distinction threshold values to increase in value in accordance with an increase in the detected external light value.

16. The image display method as claimed in claim 14, wherein the color distinction process involves adjusting a red color distinction threshold value for distinguishing red of the color distinction threshold values to decrease in value in accordance with an increase in the detected external light value.

17. The image display method as claimed in claim 14, wherein the color distinction process involves adjusting a black color distinction threshold value for distinguishing black of the color distinction threshold values to increase in value in accordance with an increase in the detected external light value.

18. The image display method as claimed in claim 14, wherein the image correction process includes an isolated dot removal process to be performed on the image color-converted by the averaging process, the color distinction process, and the color distinction correction process, which isolated dot removal process involves determining whether all adjacent pixels of a target pixel of the color-converted image are white and replacing a pixel value of the target pixel of the color-converted image with a white pixel value if all the adjacent pixels are white.

19. A non-transitory computer-readable medium containing a computer-readable program for displaying an image which program is run on a computer and is executed by the computer to perform the steps of:

projecting a projection image on a projection screen;

capturing a written image of a writing screen that is arranged opposite the projection screen;

extracting a written image area from the captured written image; and compositing the extracted written image area and the projection image; and wherein the written image area extracting step involves detecting an external light value and performing an image correction process on the captured written image based on the detected external light value; and wherein said steps include a color distinction process that involves distinguishing a color of a pixel of an averaged image obtained by an averaging process based on one or more color distinction threshold values that are adjustably set according to the detected external light value; and a color distinction correction process to be performed on the image corrected by a brightness correction process, a noise removal process, and an outline correction process, which color distinction correction process involves calculating a rate at which a neighboring pixel of a target pixel within a predetermined correction range of said corrected image is black based on the color-distinguished image obtained by the color distinction process, determining whether the calculated rate is greater than a predetermined value, and replacing a pixel value of the target pixel of said corrected image with a black pixel value if the calculated rate is greater than the predetermined value.

* * * * *